(12) United States Patent
Singh et al.

(10) Patent No.: US 10,339,181 B1
(45) Date of Patent: Jul. 2, 2019

(54) TECHNIQUES FOR VISUALIZING CLUSTERED DATASETS

(71) Applicant: SAS Institute Inc., Cary, NC (US)

(72) Inventors: Rajendra Prasad Singh, Durham, NC (US); Jordan Riley Benson, Ellerbe, NC (US); Xiangxiang Meng, Morrisville, NC (US); David James Caira, Chapel Hill, NC (US)

(73) Assignee: SAS INSTITUTE INC., Cary, NC (US)

( * ) Notice: Subject to any disclaimer, the term of this patent is extended or adjusted under 35 U.S.C. 154(b) by 0 days.

(21) Appl. No.: 16/233,302

(22) Filed: Dec. 27, 2018

Related U.S. Application Data

(60) Provisional application No. 62/662,746, filed on Apr. 25, 2018.

(51) Int. Cl.
| | | |
|---|---|---|
| *G06F 7/00* | (2006.01) | |
| *G06F 17/30* | (2006.01) | |
| *G06F 16/904* | (2019.01) | |
| *G06T 11/00* | (2006.01) | |
| *G06F 16/9038* | (2019.01) | |
| *G06F 16/906* | (2019.01) | |
| *G06F 17/00* | (2019.01) | |

(52) U.S. Cl.
CPC .......... *G06F 16/904* (2019.01); *G06F 16/906* (2019.01); *G06F 16/9038* (2019.01); *G06T 11/001* (2013.01)

(58) Field of Classification Search
CPC .. G06F 16/904; G06F 16/9038; G06F 16/906; G06T 11/001
See application file for complete search history.

(56) References Cited

U.S. PATENT DOCUMENTS

| | | |
|---|---|---|
| 9,449,408 B2 | 9/2016 | Benson et al. |
| 9,870,629 B2 | 1/2018 | Cardno et al. |
| 2012/0163681 A1 | 6/2012 | Lohse et al. |

(Continued)

OTHER PUBLICATIONS

Zhao et al., "Advanced Heat Map and Clustering Analysis Using Heatmap3", Jul. 16, 2014, Hindawi Publishing Corporation, BioMed Research International.

(Continued)

*Primary Examiner* — Kannan Shanmugasundaram

(57) ABSTRACT

Various embodiments are generally directed to techniques for visualizing clustered datasets, such as by utilizing multiple colors and multiple color gradients to represent data from different clustered datasets, for instance. Some embodiments are particularly directed to using different colors associated with each cluster of data to visualize which cluster is dominant in each cell of a heat map. Further, in many embodiments, a color gradient may be used among different heat map cells of a common color that correspond to a common cluster to visualize data distributions within each cluster of data represented in the heat map. In multiple embodiments, colors and color gradients may be utilized in conjunction with visualizing clustered datasets to enable identification of useful patterns and relationships among a collection of clustered datasets. In several embodiments, heat maps and/or heat map matrices may be generated and presented via a user interface (UI).

30 Claims, 38 Drawing Sheets
(16 of 38 Drawing Sheet(s) Filed in Color)

(56) References Cited

U.S. PATENT DOCUMENTS

2016/0092530 A1   3/2016   Jakubiak et al.

OTHER PUBLICATIONS

Liu et al., "imMens: Real-time Visual Querying of Big Data", Eurographics Conference on Visualization (EuroVis) 2013, vol. 32.
Wang, Bing., "Innovations in High Dimensional Data Exploration, Representation and Generation", Aug. 2016.
Kamaleswaran et al., "PhysioEx: Visual Analysis of Physiological Event Streams", Eurographics Conference on Visualization (EuroVis) 2016, vol. 35.
Mayorga, Adrian and Gleicher, Michael., "Splatterplots: Overcoming Overdraw in Scatter Plots", National Institute of Health, Sep. 1, 2014.

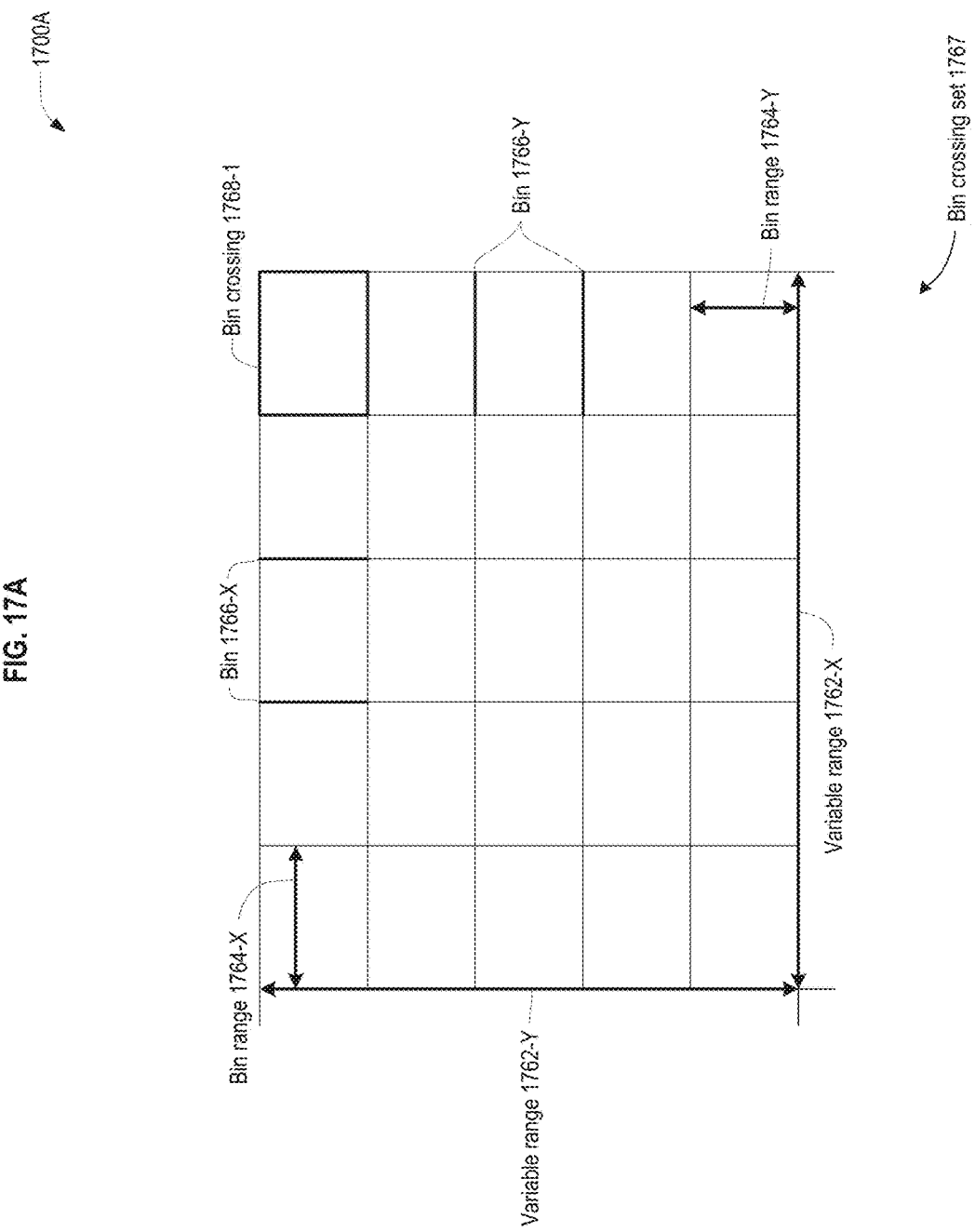

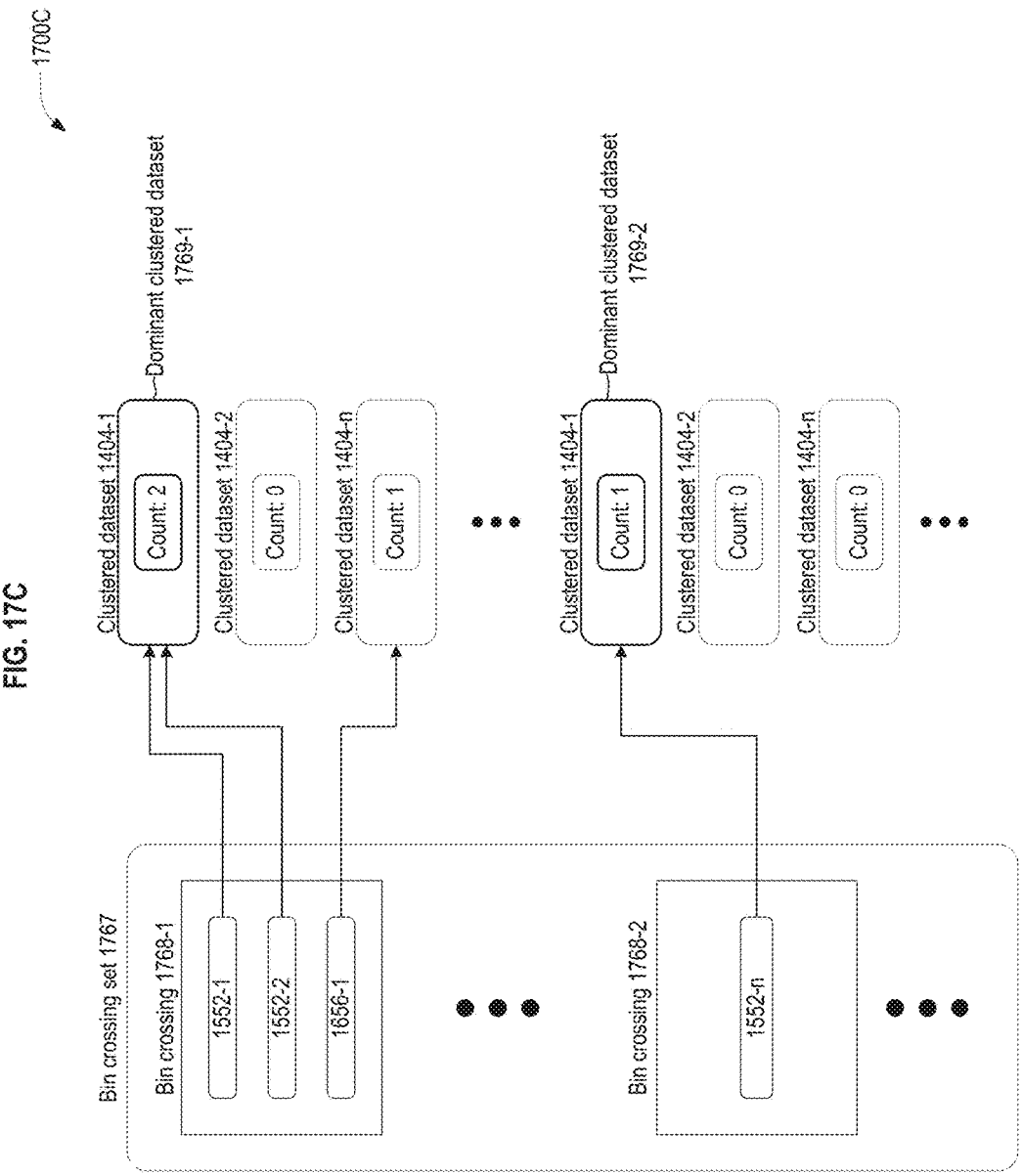

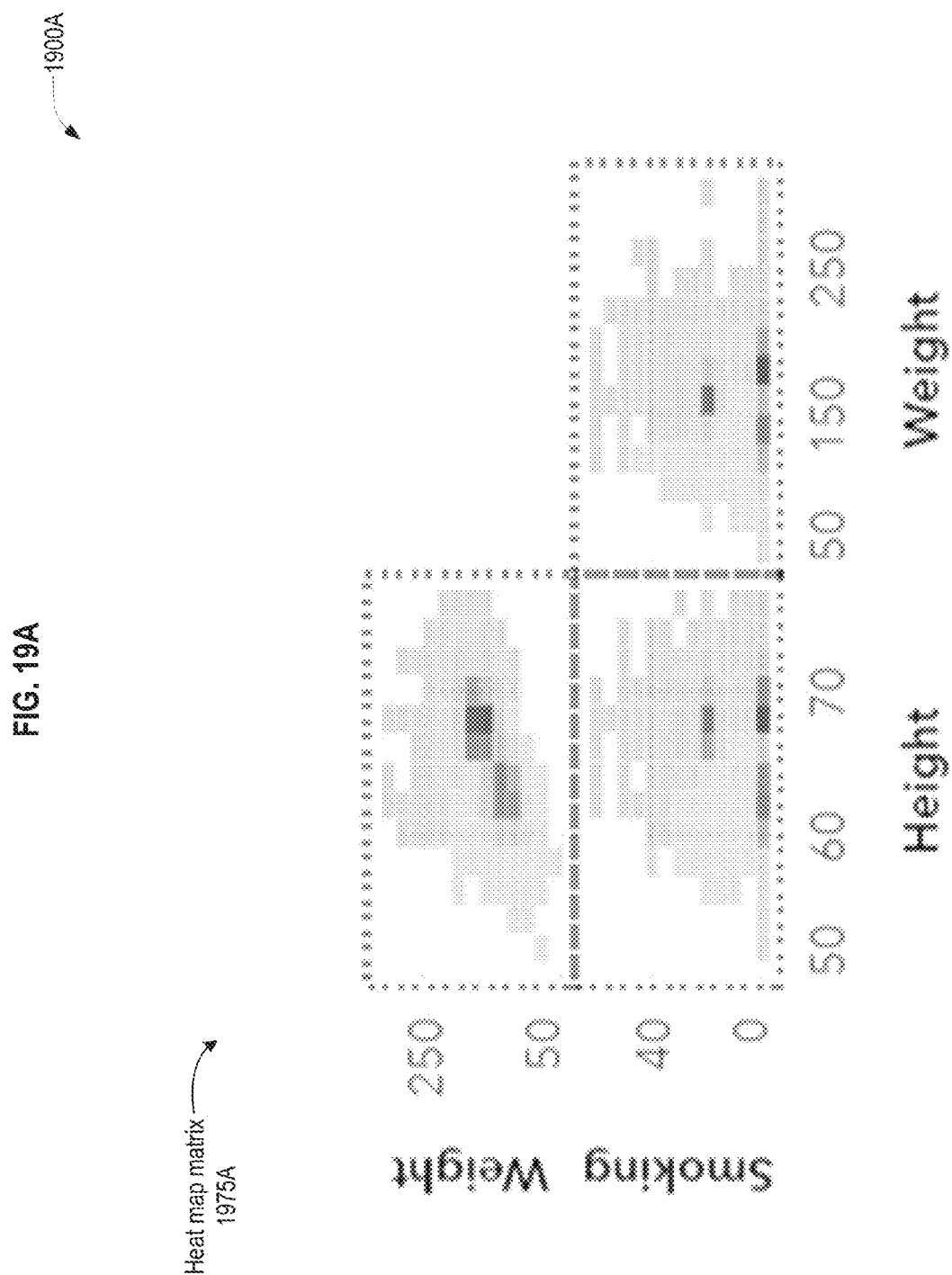

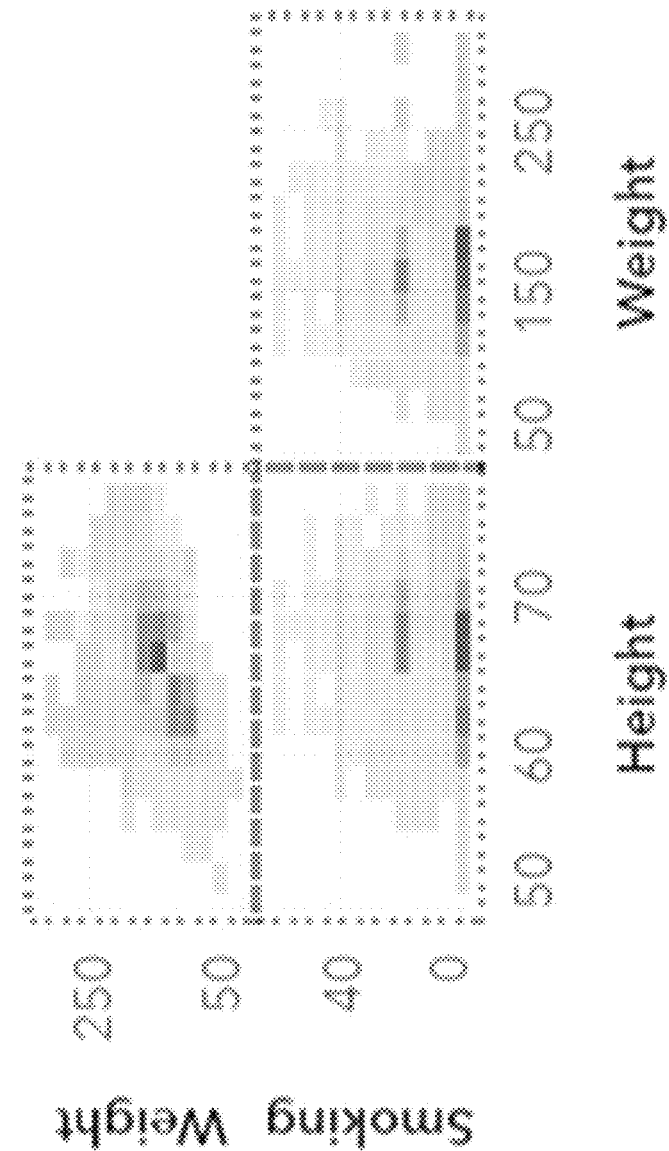

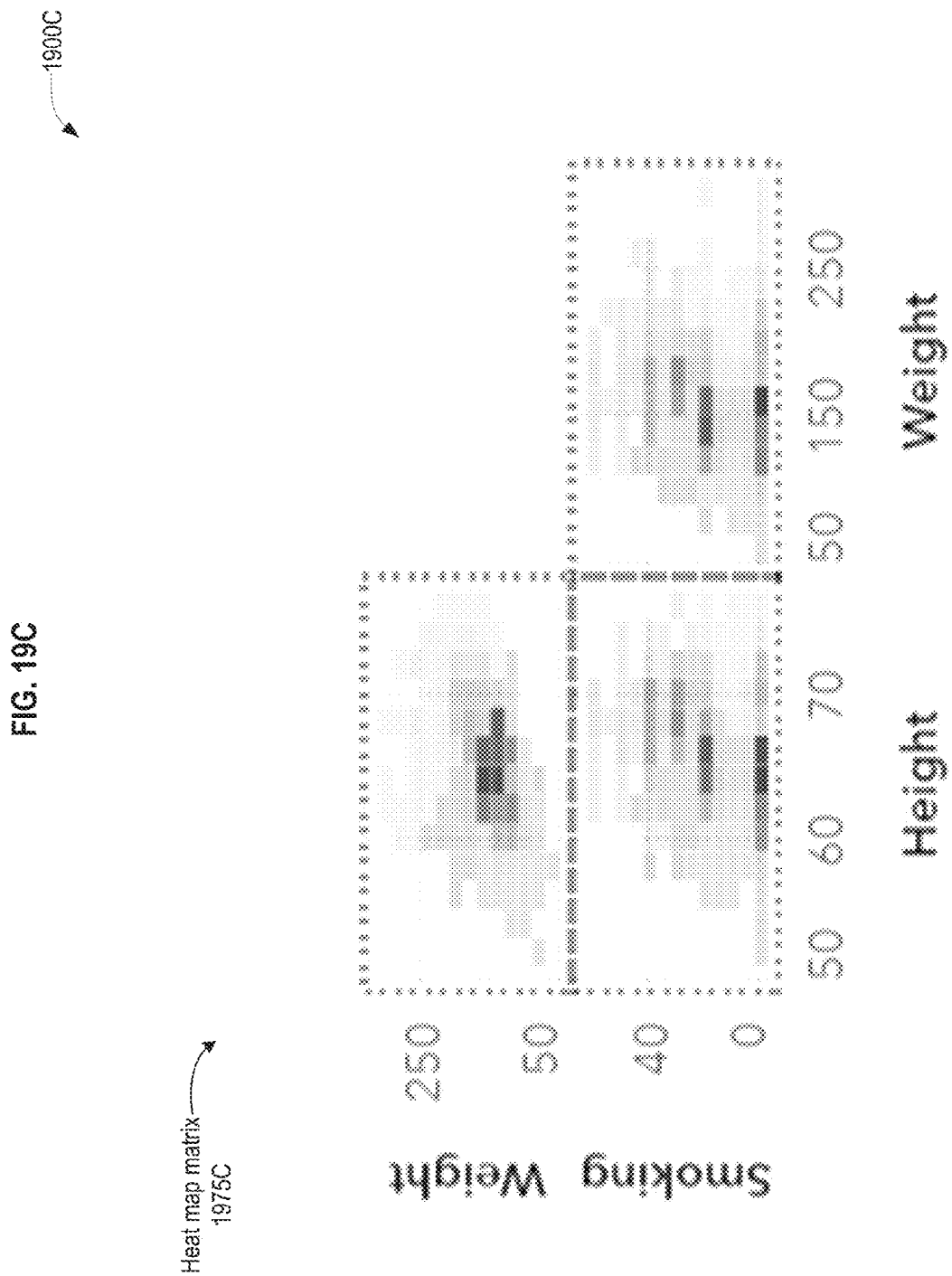

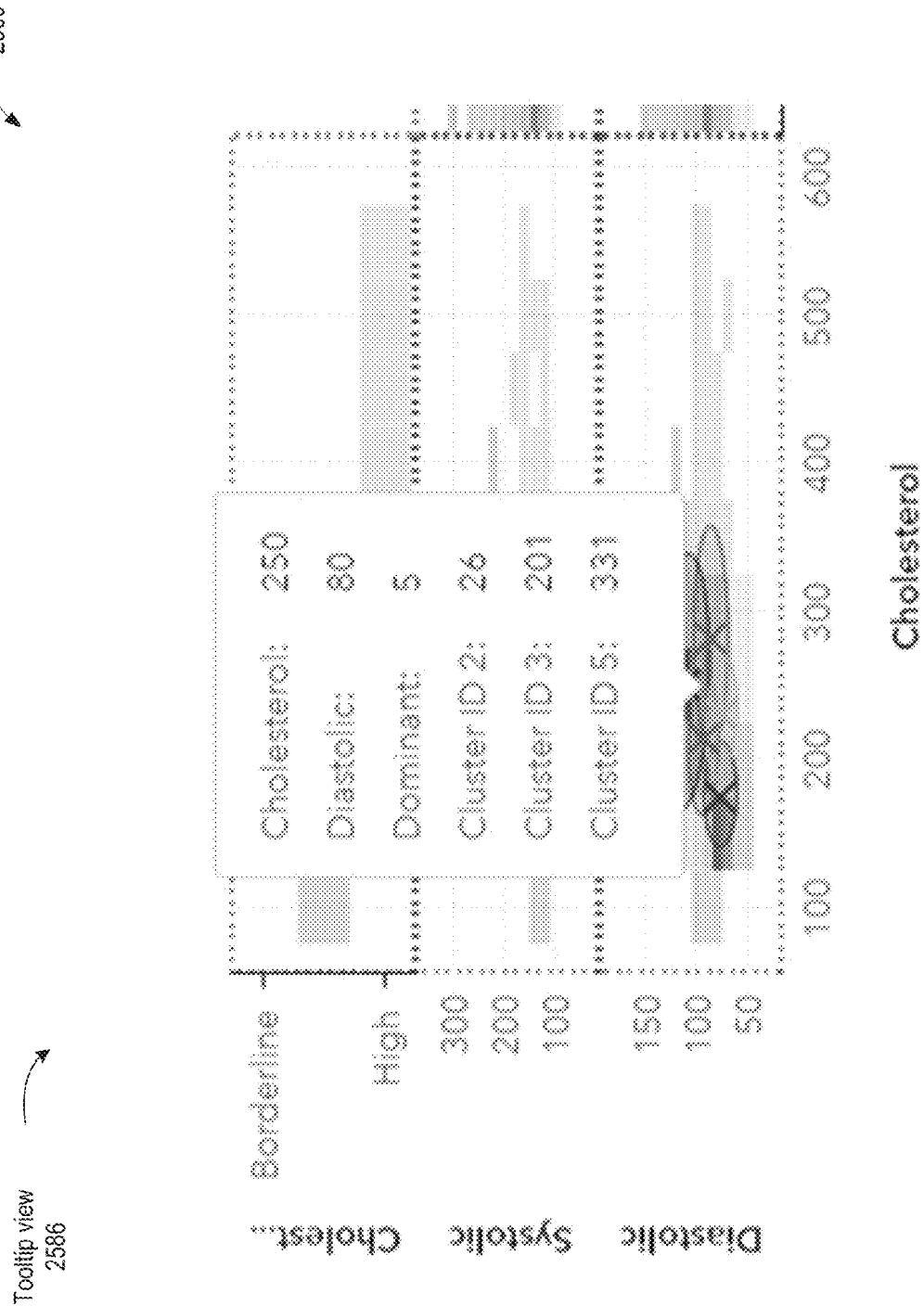

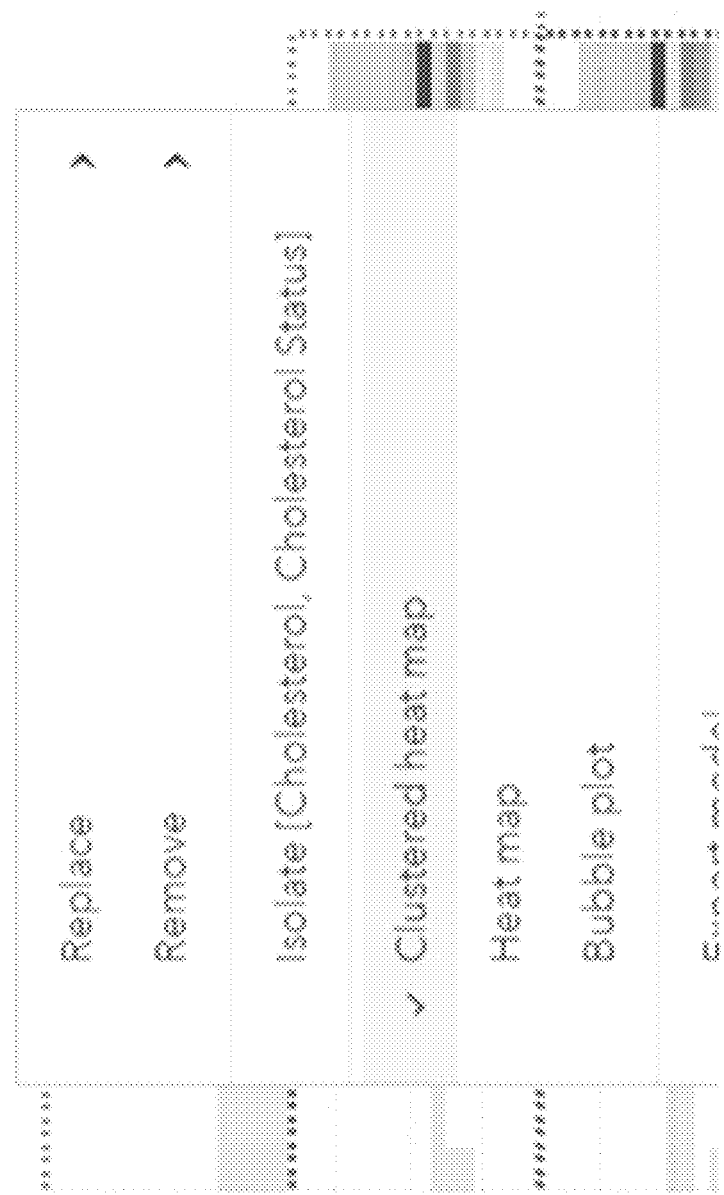

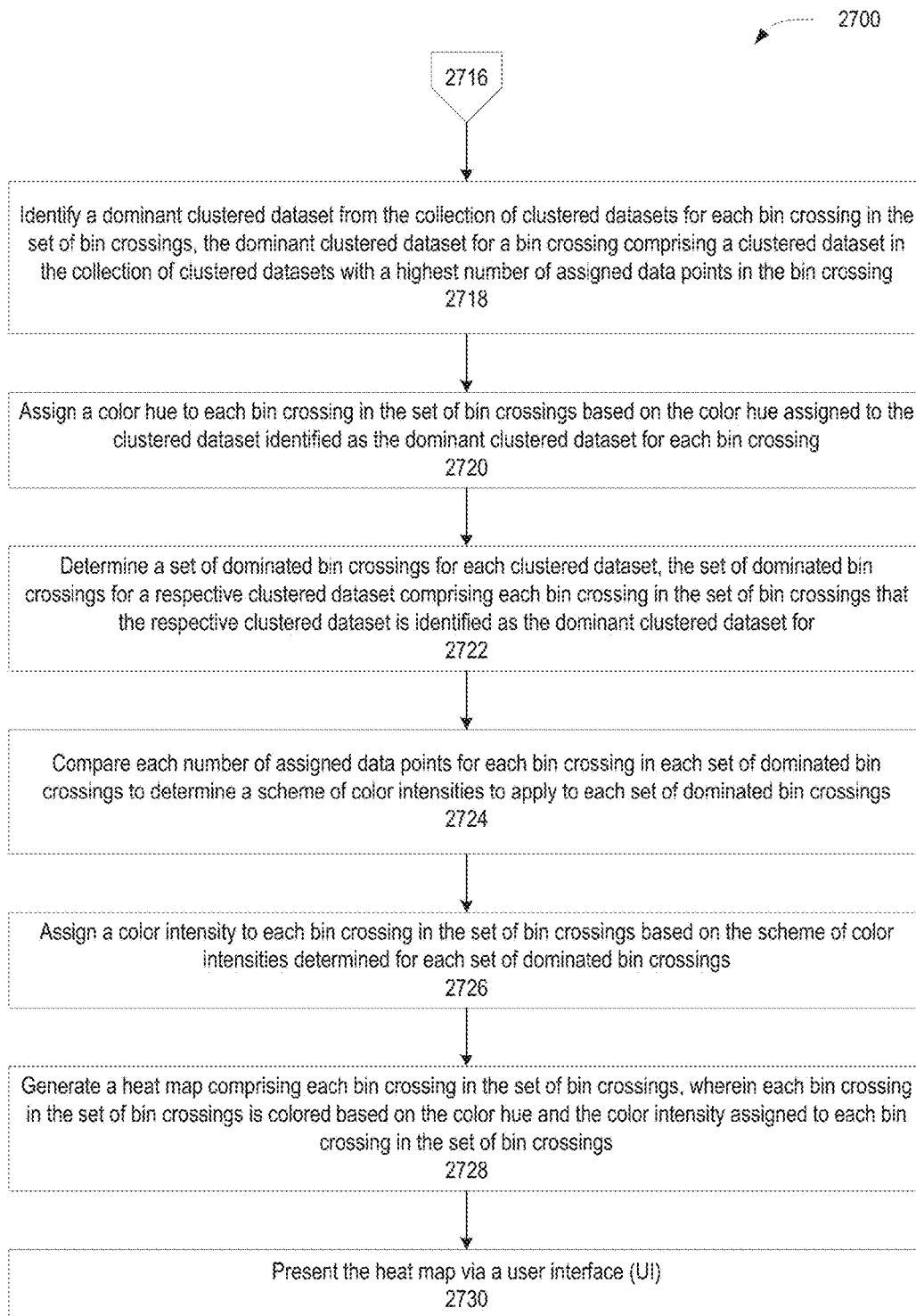

TECHNIQUES FOR VISUALIZING CLUSTERED DATASETS

CROSS-REFERENCE TO RELATED APPLICATIONS

This application claims the benefit of priority under 35 U.S.C. § 119(e) to U.S. Provisional Application Ser. No. 62/662,746 filed Apr. 25, 2018, the entirety of which is incorporated herein by reference.

SUMMARY

This summary is not intended to identify only key or essential features of the described subject matter, nor is it intended to be used in isolation to determine the scope of the described subject matter. The subject matter should be understood by reference to appropriate portions of the entire specification of this patent, any or all drawings, and each claim.

Various embodiments described herein may include an apparatus comprising a processor and a storage to store instructions that, when executed by the processor, cause the processor to perform operations comprising one or more of: identify a collection of clustered datasets, each clustered dataset in the collection of clustered datasets comprising a plurality of correlated samples, wherein each sample in the plurality of correlated samples includes a value for each variable in a group of variables; assign a different color hue to each clustered dataset in the collection of clustered datasets; identify a pair of variables in the group of variables, the pair of variables comprising a first variable and a second variable; identify plotting data comprising a data point for each sample in each clustered dataset in the collection of clustered datasets, wherein each data point comprises a value corresponding to each variable in the pair of variables from a respective sample in the plurality of correlated samples; determine a set of bin crossings for the plotting data based on one or more binning parameters, wherein each bin crossing includes a first range of values for the first variable and a second range of values for the second variable; assign each data point in the plotting data to one bin crossing in the set of bin crossings;

determine, for each bin crossing, a number of assigned data points corresponding to each clustered dataset; identify a dominant clustered dataset from the collection of clustered datasets for each bin crossing in the set of bin crossings, the dominant clustered dataset for a bin crossing comprising a clustered dataset in the collection of clustered datasets with a highest number of assigned data points in the bin crossing; assign a color to each bin crossing in the set of bin crossings based on the color assigned to the clustered dataset identified as the dominant clustered dataset for each bin crossing; determine a set of dominated bin crossings for each clustered dataset, the set of dominated bin crossings for a respective clustered dataset comprising each bin crossing in the set of bin crossings that the respective clustered dataset is identified as the dominant clustered dataset for; compare each number of assigned data points for each bin crossing in each set of dominated bin crossings to determine a scheme of color intensities to apply to each set of dominated bin crossings; assign a color intensity to each bin crossing in the set of bin crossings based on the scheme of color intensities determined for each set of dominated bin crossings; generate a heat map comprising each bin crossing in the set of bin crossings, wherein each bin crossing in the set of bin crossings is colored based on the color and the color intensity assigned to each bin crossing in the set of bin crossings; and present the heat map via a user interface (UI).

In some embodiments, the processor is caused to perform operations comprising determine the scheme of color intensities to apply to each set of dominated bin crossings to cause a highest number of assigned data points among a respective set of dominated bin crossings is assigned a highest color intensity among the respective set of dominated bin crossings. In some such embodiments, the processor is caused to perform operations comprising determine the scheme of color intensities to apply to each set of dominated bin crossings to cause a lowest number of assigned data points among the respective set of dominated bin crossings is assigned a lowest color intensity among the respective set of dominated bin crossings.

In one or more embodiments, each color intensity corresponds to luminosity in a Hue-Saturation-Luminosity (HSL) color model and the different color assigned to each clustered dataset in the collection of clustered datasets corresponds to a different hue in the HSL color model.

In various embodiments, the processor is caused to perform operations comprising generate a heat map matrix comprising the heat map, a second heat map generated based on a second pair of variables from the group of variables, and a third heat map generated based on a third pair of variables, wherein the second pair of variables comprises the first variable and a third variable and the third pair of variables comprises the second variable and a fourth variable.

In many embodiments, the processor is caused to perform operations comprising present the heat map matrix via the UI. In several such embodiments, the processor is caused to perform operations comprising present a detailed view of the heat map when the heat map is selected via the UI, wherein the detailed view of the heat map includes a representation of each color assigned to each clustered dataset that includes one or more assigned data points in each bin crossing in the set of bin crossings. In various such embodiments, the processor is caused to perform operations comprising present a tooltip view of a first bin crossing in the heat map when the first bin crossing is identified via the UI, wherein the tooltip view of the first bin crossing in the heat map includes numerical values for the first and second variables. In further such embodiments, the tooltip view of the first bin crossing in the heat map may include numerical values for two or more clustered datasets in the collection of clustered datasets.

In one or more embodiments, the processor is caused to perform operations comprising generate a parallel coordinates plot based on the collection of clustered datasets and the group of variables, the parallel coordinates plot to include a line for each clustered data set that passes through a set of values for each variable in the group of variables, wherein each line is colored according to the different color assigned to the corresponding clustered data set.

Various embodiments described herein may include a computer-implemented method, comprising one or more of: identifying a collection of clustered datasets, each clustered dataset in the collection of clustered datasets comprising a plurality of correlated samples, wherein each sample in the plurality of correlated samples includes a value for each variable in a group of variables; assigning a different color hue to each clustered dataset in the collection of clustered datasets; identifying a pair of variables in the group of variables, the pair of variables comprising a first variable and a second variable; identifying plotting data comprising a data point for each sample in each clustered dataset in the collection of clustered datasets, wherein each data point comprises a value corresponding to each variable in the pair of variables from a respective sample in the plurality of correlated samples; determining a set of bin crossings for the plotting data based on one or more binning parameters, wherein each bin crossing includes a first range of values for the first variable and a second range of values for the second variable; assign each data point in the plotting data to one bin crossing in the set of bin crossings; determining, for each bin crossing, a number of assigned data points corresponding to each clustered dataset; identifying a dominant clustered dataset from the collection of clustered datasets for each bin crossing in the set of bin crossings, the dominant clustered dataset for a bin crossing comprising a clustered dataset in the collection of clustered datasets with a highest number of assigned data points in the bin crossing; assigning a color to each bin crossing in the set of bin crossings based on the color assigned to the clustered dataset identified as the dominant clustered dataset for each bin crossing; determining a set of dominated bin crossings for each clustered dataset, the set of dominated bin crossings for a respective clustered dataset comprising each bin crossing in the set of bin crossings that the respective clustered dataset is identified as the dominant clustered dataset for; comparing each number of assigned data points for each bin crossing in each set of dominated bin crossings to determine a scheme of color intensities to apply to each set of dominated bin crossings; assigning a color intensity to each bin crossing in the set of bin crossings based on the scheme of color intensities determined for each set of dominated bin crossings; generating a heat map comprising each bin crossing in the set of bin crossings, wherein each bin crossing in the set of bin crossings is colored based on the color and the color intensity assigned to each bin crossing in the set of bin crossings; and presenting the heat map via a user interface (UI).

In many embodiments, the computer-implemented method comprises determining the scheme of color intensities to apply to each set of dominated bin crossings to cause a highest number of assigned data points among a respective set of dominated bin crossings is assigned a highest color intensity among the respective set of dominated bin crossings. In many such embodiments, the computer-implemented method comprises determining the scheme of color intensities to apply to each set of dominated bin crossings to cause a lowest number of assigned data points among the respective set of dominated bin crossings is assigned a lowest color intensity among the respective set of dominated bin crossings.

In one or more embodiments, each color intensity corresponds to luminosity in a Hue-Saturation-Luminosity (HSL) color model and the different color assigned to each clustered dataset in the collection of clustered datasets corresponds to a different hue in the HSL color model.

In several embodiments, the computer-implemented method comprises generating a heat map matrix comprising the heat map, a second heat map generated based on a second pair of variables from the group of variables, and a third heat map generated based on a third pair of variables, wherein the second pair of variables comprises the first variable and a third variable and the third pair of variables comprises the second variable and a fourth variable.

In various embodiments, the computer-implemented method comprises presenting the heat map matrix via the UI. In some such embodiments, the computer-implemented method comprises presenting a detailed view of the heat map when the heat map is selected via the UI, wherein the detailed view of the heat map includes a representation of each color assigned to each clustered dataset that includes one or more assigned data points in each bin crossing in the set of bin crossings. In many such embodiments, the computer-implemented method comprises presenting a tooltip view of a first bin crossing in the heat map when the first bin crossing is identified via the UI, wherein the tooltip view of the first bin crossing in the heat map includes numerical values for the first and second variables. In further such embodiments, the tooltip view of the first bin crossing in the heat map includes numerical values for two or more clustered datasets in the collection of clustered datasets.

In some embodiments, the computer-implemented method comprises generating a parallel coordinates plot based on the collection of clustered datasets and the group of variables, the parallel coordinates plot to include a line for each clustered data set that passes through a set of values for each variable in the group of variables, wherein each line is colored according to the different color assigned to the corresponding clustered data set.

Some embodiments described herein may include a computer-program product tangibly embodied in a non-transitory machine-readable storage medium, the computer-program product including instructions operable to cause a processor to perform operations comprising one or more of: identify a collection of clustered datasets, each clustered dataset in the collection of clustered datasets comprising a plurality of correlated samples, wherein each sample in the plurality of correlated samples includes a value for each variable in a group of variables; assign a different color hue to each clustered dataset in the collection of clustered datasets; identify a pair of variables in the group of variables, the pair of variables comprising a first variable and a second variable; identify plotting data comprising a data point for each sample in each clustered dataset in the collection of clustered datasets, wherein each data point comprises a value corresponding to each variable in the pair of variables from a respective sample in the plurality of correlated samples; determine a set of bin crossings for the plotting data based on one or more binning parameters, wherein each bin crossing includes a first range of values for the first variable and a second range of values for the second variable; assign each data point in the plotting data to one bin crossing in the set of bin crossings; determine, for each bin crossing, a number of assigned data points corresponding to each clustered dataset; identify a dominant clustered dataset from the collection of clustered datasets for each bin crossing in the set of bin crossings, the dominant clustered dataset for a bin crossing comprising a clustered dataset in the collection of clustered datasets with a highest number of assigned data points in the bin crossing; assign a color to each bin crossing in the set of bin crossings based on the color assigned to the clustered dataset identified as the dominant clustered dataset for each bin crossing; determine a set of dominated bin crossings for each clustered dataset, the set of dominated bin crossings for a respective clustered dataset comprising each bin crossing in the set of bin crossings that the respective clustered dataset is identified as the dominant clustered dataset for; compare each number of assigned data points for each bin crossing in each set of dominated bin crossings to determine a scheme of color intensities to apply to each set of dominated bin crossings; assign a color intensity to each bin crossing in the set of bin crossings based on the scheme of color intensities determined for each set of dominated bin crossings; generate a heat map comprising each bin crossing in the set of bin crossings, wherein each bin crossing in the set of bin crossings is colored based on the color and the color intensity assigned to each bin crossing in the set of bin crossings; and present the heat map via a user interface (UI).

In many embodiments, the computer-program product includes instructions operable to cause a processor to perform operations comprising determine the scheme of color intensities to apply to each set of dominated bin crossings to cause a highest number of assigned data points among a respective set of dominated bin crossings is assigned a highest color intensity among the respective set of dominated bin crossings. In many such embodiments, the computer-program product includes instructions operable to cause a processor to perform operations comprising determine the scheme of color intensities to apply to each set of dominated bin crossings to cause a lowest number of assigned data points among the respective set of dominated bin crossings is assigned a lowest color intensity among the respective set of dominated bin crossings.

In various embodiments, each color intensity corresponds to luminosity in a Hue-Saturation-Luminosity (HSL) color model and the different color assigned to each clustered dataset in the collection of clustered datasets corresponds to a different hue in the HSL color model.

In one or more embodiments, embodiments, the computer-program product includes instructions operable to cause a processor to perform operations comprising generate a heat map matrix comprising the heat map, a second heat map generated based on a second pair of variables from the group of variables, and a third heat map generated based on a third pair of variables, wherein the second pair of variables comprises the first variable and a third variable and the third pair of variables comprises the second variable and a fourth variable.

In several embodiments, embodiments, the computer-program product includes instructions operable to cause a processor to perform operations comprising present the heat map matrix via the UI. In many such embodiments, the computer-program product includes instructions operable to cause a processor to perform operations comprising present a detailed view of the heat map when the heat map is selected via the UI, wherein the detailed view of the heat map includes a representation of each color assigned to each clustered dataset that includes one or more assigned data points in each bin crossing in the set of bin crossings. In various such embodiments, the computer-program product includes instructions operable to cause a processor to perform operations comprising present a tooltip view of a first bin crossing in the heat map when the first bin crossing is identified via the UI, wherein the tooltip view of the first bin crossing in the heat map includes numerical values for the first and second variables. In further such embodiments, the tooltip view of the first bin crossing in the heat map includes numerical values for two or more clustered datasets in the collection of clustered datasets.

In some embodiments, the computer-program product includes instructions operable to cause a processor to perform operations comprising generate a parallel coordinates plot based on the collection of clustered datasets and the group of variables, the parallel coordinates plot to include a line for each clustered data set that passes through a set of values for each variable in the group of variables, wherein each line is colored according to the different color assigned to the corresponding clustered data set.

The foregoing, together with other features and embodiments, will become more apparent upon referring to the following specification, claims, and accompanying drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The present disclosure is described in conjunction with the appended figures:

FIGS. 17A-17D illustrate various aspects of heat map generation, according to some embodiments of the present technology.

FIGS. 19A-19C illustrate various aspects of exemplary heat map matrices, according to some embodiments of the present disclosure.

FIG. 25 illustrates various aspects of exemplary menu options, according to some embodiments of the present disclosure.

FIG. 26 illustrates various aspects of an exemplary tooltip view, according to some embodiments of the present disclosure.

FIGS. 27A and 27B illustrate an exemplary logic flow, according to some embodiments of the present technology.

DETAILED DESCRIPTION

Figure 1:
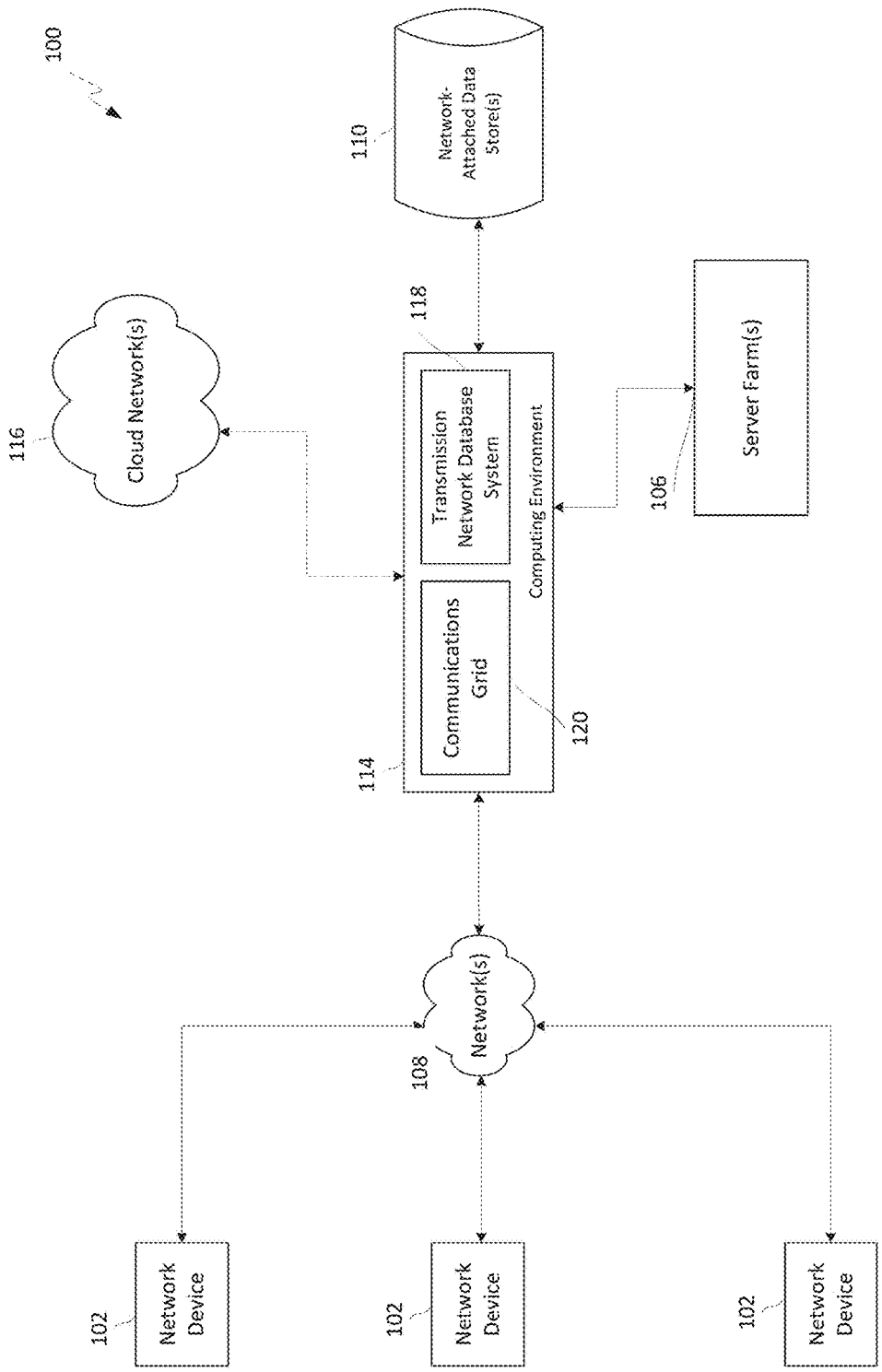
FIG. 1 illustrates a block diagram that provides an illustration of the hardware components of a computing system, according to some embodiments of the present technology.

Various embodiments are generally directed to techniques for visualizing clustered datasets, such as by utilizing multiple colors (e.g., multiple color hues) and multiple color gradients to represent data from different clustered datasets, for instance. Some embodiments are particularly directed to using different colors associated with each cluster of data to visualize which cluster is dominant in each cell of a heat map. Further, in many embodiments, a color gradient may be used among different heat map cells of a common color that correspond to a common cluster to visualize data distributions within each cluster of data represented in the heat map. In multiple embodiments, colors and color gradients may be utilized in conjunction with visualizing clustered datasets to enable identification of useful patterns and relationships among a collection of clustered datasets. In several embodiments, heat maps and/or heat map matrices may be generated and presented via a user interface (UI). In several such embodiments, the UI may enable a plurality of different ways for visualizing and interacting with the heat maps and/or heat map matrices to facilitate interpretation of a collection of clustered datasets. These and other embodiments are described and claimed.

Some challenges facing visualizing clustered datasets include the inability to present the clustered datasets in a comprehensible or useful manner. For instance, it may be difficult or impossible to glean inferences or gain insights associated with the clustering of datasets in a collection of data. These challenges may result from the fact that clustering algorithms may divide data into a collection of clustered datasets without providing any intelligible reasoning behind why data was clustered the way it was. Adding further complexity, clustered datasets may be generated from large volumes of data. This can cause visualizations generated from the clustered datasets to be cluttered and confusing, resulting in useful information, such as patterns, being lost or buried. These and other factors may result in clustered data visualizations with a limited ability to convey relevant information measurement. Such limitations can drastically reduce the usability and applicability of the data visualizations and/or clustering algorithms, contributing to hidden insights and undetected patterns in data.

Various embodiments described herein include a clustered data visualizer that can present clustered datasets in a manner that enables valuable conclusions and insights to be intuitively drawn. In various such embodiments, the conclusions and insights enabled by the clustered visualizer may improve the usefulness and applicability of clustering algorithms. For example, general patterns across multiple variables may be discovered via application of the clustered data visualizer to a collection of clustered datasets. In many embodiments, heat maps or matrices of heat maps may be generated based on data that is separated into a collection of clustered datasets, such as by a clustering algorithm. In many such embodiments, the heat maps or matrices of heat maps may utilize colors and color gradients in conjunction with clustered datasets to enable useful patterns and/or correlations in the data to be identified and interpreted. For example, multiple color gradients or color ramps may be used to distinguish between different clusters or groups of data and their concentrations. In some embodiments, multiple visualizations may be simultaneously presented to facilitate data interpretation. For instance, a heat map matrix may be presented in conjunction with a parallel coordinates plot. In various embodiments, heat maps may be presented via a UI that enables the granularity of data presented to be readily adjusted. For instance, a heat map matrix may be used to clearly and efficiently present an overview of a collection of clustered datasets and selecting or identifying various portions or features of the heat map matrix may cause finer grained data to be presented. In some embodiments, a tooltip view of data may be presented that provides numerical values for an identified portion of a heat map. In various embodiments, a detailed view of a selected portion of a heat map may be presented via the UI. In several embodiments, menu options may be accessed via the UI to customize data visualizations.

In these and other ways the clustered data visualizer can enable the extraction of meaningful, actionable, and valuable information from clustered datasets in an intuitive, efficient, and on demand manner, resulting in several technical effects, advantages, and advances over conventional computer technology. In various embodiments, the clustered data visualizer may be implemented in a practical application via one or more computing devices, and thereby provide additional and useful functionality to the one or more computing devices, resulting in more capable, better functioning, and improved computing devices. In many embodiments, the clustered data visualizer may make data and patterns therein more accessible by providing familiar, user-friendly interface objects, such as heat maps, matrices, plots, tooltip views, and menu options. In several embodiments, clustered data visualizer may provide specific and particular manners of navigating and presenting data in two or more dimensions, such as via one or more heat maps and/or heat map matrices described herein. In one or more embodiments, the clustered data visualizer may be implemented as a set of rules that improve computer-related technology by allowing a function not previously performable by a computer that enables an improved technological result to be achieved. In one or more such embodiments, the function may include encoding a collection of clustered datasets with colors and/or color gradients to realize insightful and intelligible data visualizations as an improved technological result. In some embodiments, the clustered data visualizer may enable a computing device to reduce network traffic and/or increase rendering speed by efficiently condensing data for transmission and/or presentation without unduly compromising the content of the data.

With general reference to notations and nomenclature used herein, portions of the detailed description that follows may be presented in terms of program procedures executed by a processor of a machine or of multiple networked machines. These procedural descriptions and representations are used by those skilled in the art to most effectively convey the substance of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic or optical communications capable of being stored, transferred, combined, compared, and otherwise manipulated. It proves convenient at times, principally for reasons of common usage, to refer to what is communicated as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include machines selectively activated or configured by a routine stored within that is written in accordance with the teachings herein, and/or include apparatus specially constructed for the required purpose. Various embodiments also relate to apparatus or systems for performing these operations. These apparatuses may be specially constructed for the required purpose or may include a general-purpose computer. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives within the scope of the claims.

Systems depicted in some of the figures may be provided in various configurations. In some embodiments, the systems may be configured as a distributed system where one or more components of the system are distributed across one or more networks in a cloud computing system and/or a fog computing system.

FIG. 1 is a block diagram that provides an illustration of the hardware components of a data transmission network 100, according to embodiments of the present technology. Data transmission network 100 is a specialized computer system that may be used for processing large amounts of data where a large number of computer processing cycles are required.

Data transmission network 100 may also include computing environment 114. Computing environment 114 may be a specialized computer or other machine that processes the data received within the data transmission network 100. Data transmission network 100 also includes one or more network devices 102. Network devices 102 may include client devices that attempt to communicate with computing environment 114. For example, network devices 102 may send data to the computing environment 114 to be processed, may send signals to the computing environment 114 to control different aspects of the computing environment or the data it is processing, among other reasons. Network devices 102 may interact with the computing environment 114 through a number of ways, such as, for example, over one or more networks 108. As shown in FIG. 1, computing environment 114 may include one or more other systems. For example, computing environment 114 may include a database system 118 and/or a communications grid 120.

Figure 8:
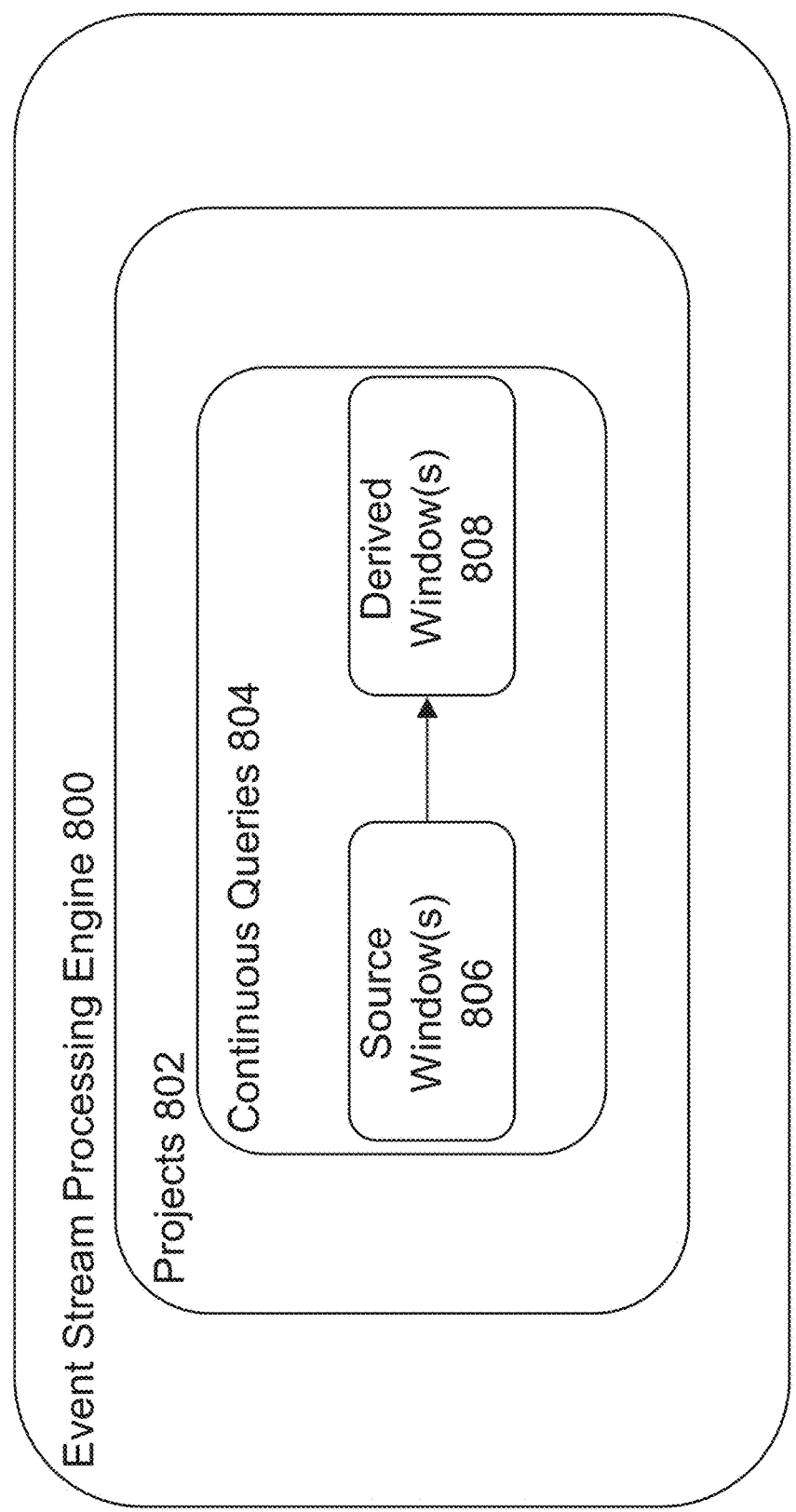
FIG. 8 illustrates a block diagram including components of an Event Stream Processing Engine (ESPE), according to embodiments of the present technology.
Figure 9:
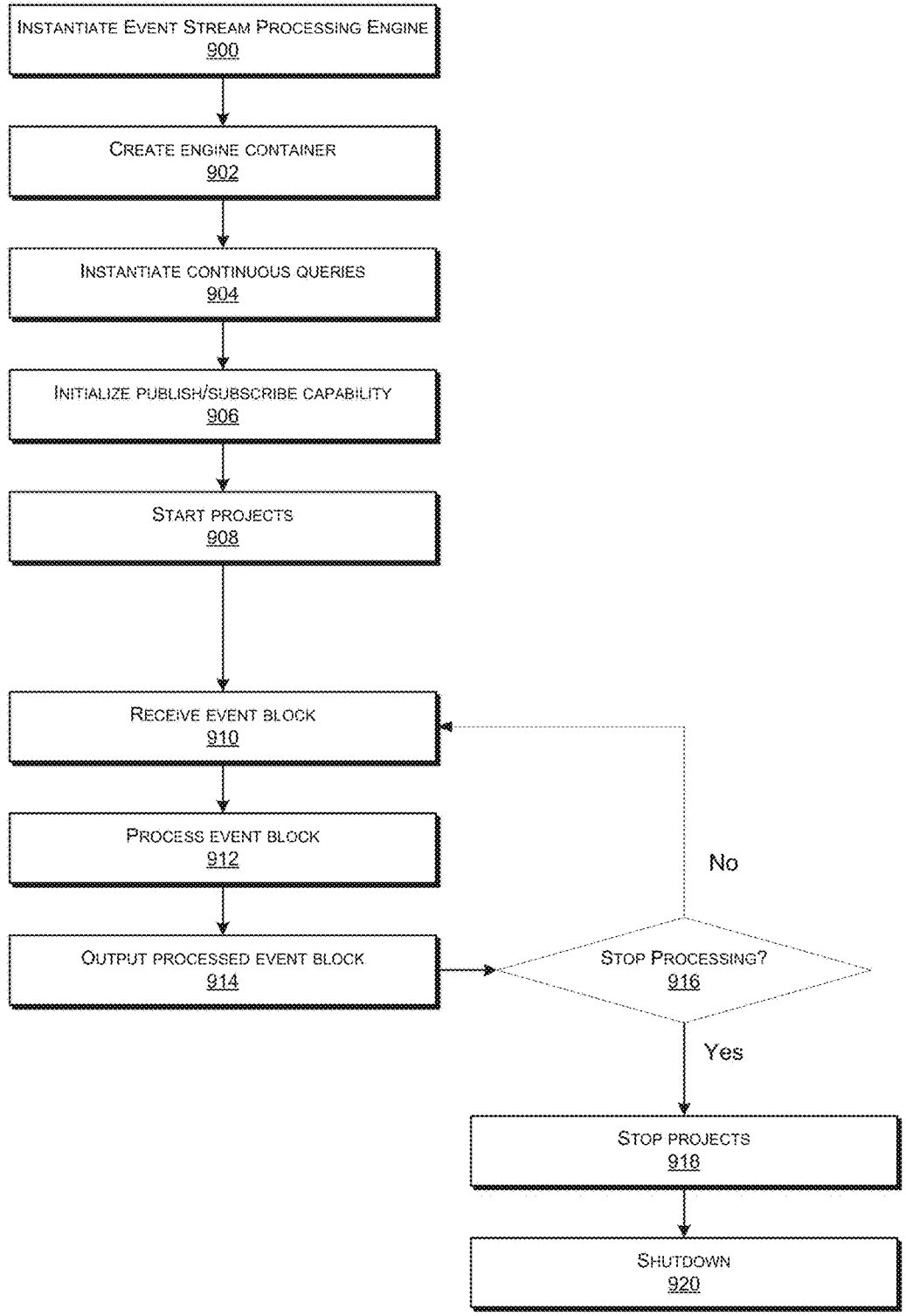
FIG. 9 illustrates a flow chart showing an example process including operations performed by an event stream processing engine, according to some embodiments of the present technology.
Figure 10:
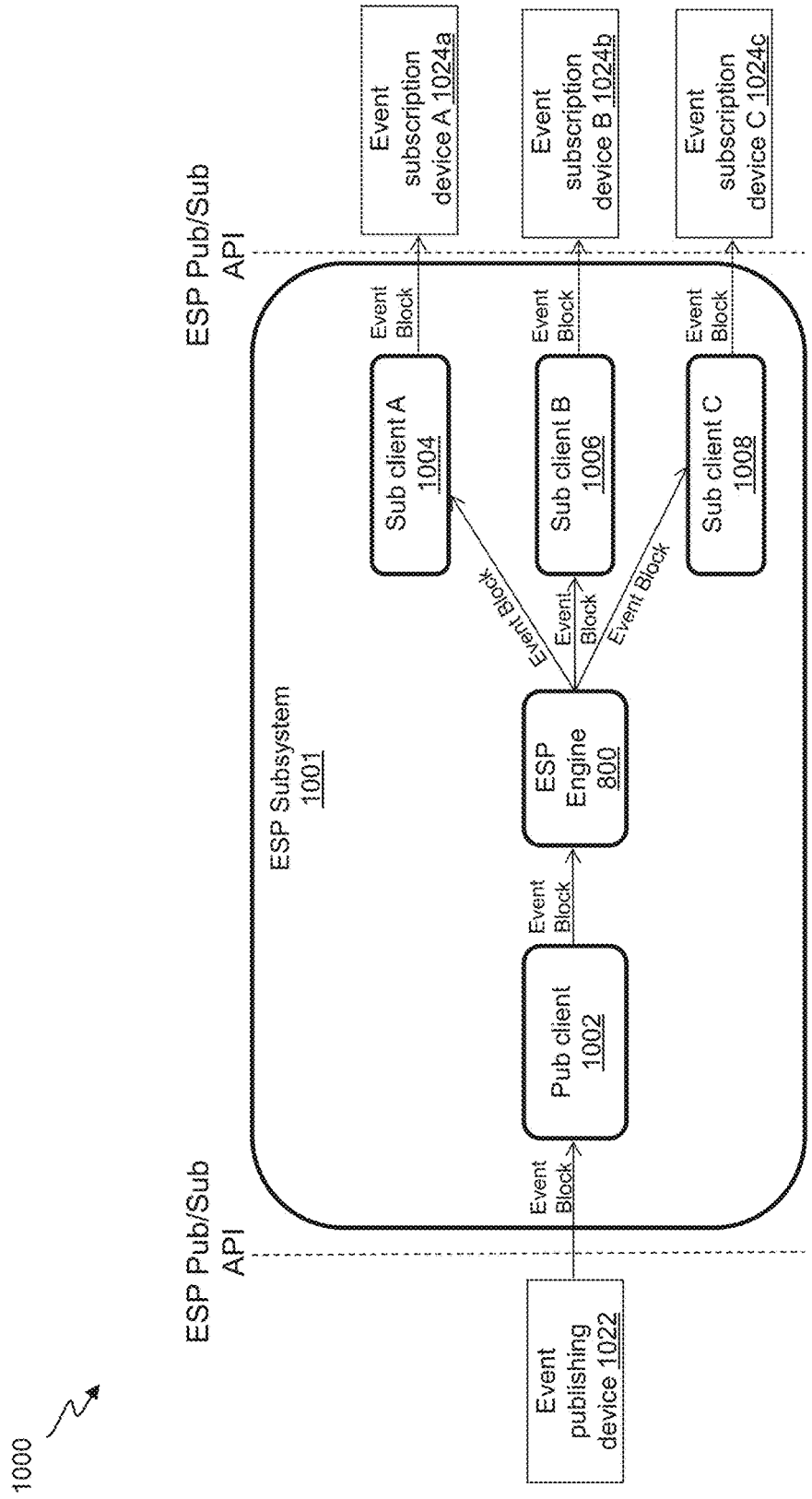
FIG. 10 illustrates an ESP system interfacing between a publishing device and multiple event subscribing devices, according to embodiments of the present technology.

In other embodiments, network devices may provide a large amount of data, either all at once or streaming over a period of time (e.g., using event stream processing (ESP), described further with respect to FIGS. 8-10), to the computing environment 114 via networks 108. For example, network devices 102 may include network computers, sensors, databases, or other devices that may transmit or otherwise provide data to computing environment 114. For example, network devices may include local area network devices, such as routers, hubs, switches, or other computer networking devices. These devices may provide a variety of stored or generated data, such as network data or data specific to the network devices themselves. Network devices may also include sensors that monitor their environment or other devices to collect data regarding that environment or those devices, and such network devices may provide data they collect over time. Network devices may also include devices within the internet of things, such as devices within a home automation network. Some of these devices may be referred to as edge devices, and may involve edge computing circuitry. Data may be transmitted by network devices directly to computing environment 114 or to network-attached data stores, such as network-attached data stores 110 for storage so that the data may be retrieved later by the computing environment 114 or other portions of data transmission network 100.

Data transmission network 100 may also include one or more network-attached data stores 110. Network-attached data stores 110 are used to store data to be processed by the computing environment 114 as well as any intermediate or final data generated by the computing system in non-volatile memory. However, in certain embodiments, the configuration of the computing environment 114 allows its operations to be performed such that intermediate and final data results can be stored solely in volatile memory (e.g., RAM), without a requirement that intermediate or final data results be stored to non-volatile types of memory (e.g., disk). This can be useful in certain situations, such as when the computing environment 114 receives ad hoc queries from a user and when responses, which are generated by processing large amounts of data, need to be generated on-the-fly. In this non-limiting situation, the computing environment 114 may be configured to retain the processed information within memory so that responses can be generated for the user at different levels of detail as well as allow a user to interactively query against this information.

Network-attached data stores may store a variety of different types of data organized in a variety of different ways and from a variety of different sources. For example, network-attached data storage may include storage other than primary storage located within computing environment 114 that is directly accessible by processors located therein.

Network-attached data storage may include secondary, tertiary or auxiliary storage, such as large hard drives, servers, virtual memory, among other types. Storage devices may include portable or non-portable storage devices, optical storage devices, and various other mediums capable of storing, containing data. A machine-readable storage medium or computer-readable storage medium may include a non-transitory medium in which data can be stored and that does not include carrier waves and/or transitory electronic signals. Examples of a non-transitory medium may include, for example, a magnetic disk or tape, optical storage media such as compact disk or digital versatile disk, flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, among others. Furthermore, the data stores may hold a variety of different types of data. For example, network-attached data stores 110 may hold unstructured (e.g., raw) data, such as manufacturing data (e.g., a database containing records identifying products being manufactured with parameter data for each product, such as colors and models) or product sales databases (e.g., a database containing individual data records identifying details of individual product sales).

The unstructured data may be presented to the computing environment 114 in different forms such as a flat file or a conglomerate of data records, and may have data values and accompanying time stamps. The computing environment 114 may be used to analyze the unstructured data in a variety of ways to determine the best way to structure (e.g., hierarchically) that data, such that the structured data is tailored to a type of further analysis that a user wishes to perform on the data. For example, after being processed, the unstructured time stamped data may be aggregated by time (e.g., into daily time period units) to generate time series data and/or structured hierarchically according to one or more dimensions (e.g., parameters, attributes, and/or variables). For example, data may be stored in a hierarchical data structure, such as a ROLAP OR MOLAP database, or may be stored in another tabular form, such as in a flat-hierarchy form.

Data transmission network 100 may also include one or more server farms 106. Computing environment 114 may route select communications or data to the one or more sever farms 106 or one or more servers within the server farms. Server farms 106 can be configured to provide information in a predetermined manner. For example, server farms 106 may access data to transmit in response to a communication. Server farms 106 may be separately housed from each other device within data transmission network 100, such as computing environment 114, and/or may be part of a device or system.

Server farms 106 may host a variety of different types of data processing as part of data transmission network 100. Server farms 106 may receive a variety of different data from network devices, from computing environment 114, from cloud network 116, or from other sources. The data may have been obtained or collected from one or more sensors, as inputs from a control database, or may have been received as inputs from an external system or device. Server farms 106 may assist in processing the data by turning raw data into processed data based on one or more rules implemented by the server farms. For example, sensor data may be analyzed to determine changes in an environment over time or in real-time.

Data transmission network 100 may also include one or more cloud networks 116. Cloud network 116 may include a cloud infrastructure system that provides cloud services. In certain embodiments, services provided by the cloud network 116 may include a host of services that are made available to users of the cloud infrastructure system on demand. Cloud network 116 is shown in FIG. 1 as being connected to computing environment 114 (and therefore having computing environment 114 as its client or user), but cloud network 116 may be connected to or utilized by any of the devices in FIG. 1. Services provided by the cloud network can dynamically scale to meet the needs of its users. The cloud network 116 may comprise one or more computers, servers, and/or systems. In some embodiments, the computers, servers, and/or systems that make up the cloud network 116 are different from the user's own on-premises computers, servers, and/or systems. For example, the cloud network 116 may host an application, and a user may, via a communication network such as the Internet, on demand, order and use the application.

While each device, server and system in FIG. 1 is shown as a single device, it will be appreciated that multiple devices may instead be used. For example, a set of network devices can be used to transmit various communications from a single user, or remote server 140 may include a server stack. As another example, data may be processed as part of computing environment 114.

Each communication within data transmission network 100 (e.g., between client devices, between servers 106 and computing environment 114 or between a server and a device) may occur over one or more networks 108. Networks 108 may include one or more of a variety of different types of networks, including a wireless network, a wired network, or a combination of a wired and wireless network. Examples of suitable networks include the Internet, a personal area network, a local area network (LAN), a wide area network (WAN), or a wireless local area network (WLAN). A wireless network may include a wireless interface or combination of wireless interfaces. As an example, a network in the one or more networks 108 may include a short-range communication channel, such as a Bluetooth or a Bluetooth Low Energy channel. A wired network may include a wired interface. The wired and/or wireless networks may be implemented using routers, access points, bridges, gateways, or the like, to connect devices in the network 114, as will be further described with respect to FIG. 2. The one or more networks 108 can be incorporated entirely within or can include an intranet, an extranet, or a combination thereof. In one embodiment, communications between two or more systems and/or devices can be achieved by a secure communications protocol, such as secure sockets layer (SSL) or transport layer security (TLS). In addition, data and/or transactional details may be encrypted.

Some aspects may utilize the Internet of Things (IoT), where things (e.g., machines, devices, phones, sensors) can be connected to networks and the data from these things can be collected and processed within the things and/or external to the things. For example, the IoT can include sensors in many different devices, and high value analytics can be applied to identify hidden relationships and drive increased efficiencies. This can apply to both big data analytics and real-time (e.g., ESP) analytics. This will be described further below with respect to FIG. 2.

As noted, computing environment 114 may include a communications grid 120 and a transmission network database system 118. Communications grid 120 may be a grid-based computing system for processing large amounts of data. The transmission network database system 118 may be for managing, storing, and retrieving large amounts of data that are distributed to and stored in the one or more network-attached data stores 110 or other data stores that reside at different locations within the transmission network database system 118. The compute nodes in the grid-based computing system 120 and the transmission network database system 118 may share the same processor hardware, such as processors that are located within computing environment 114.

Figure 2:
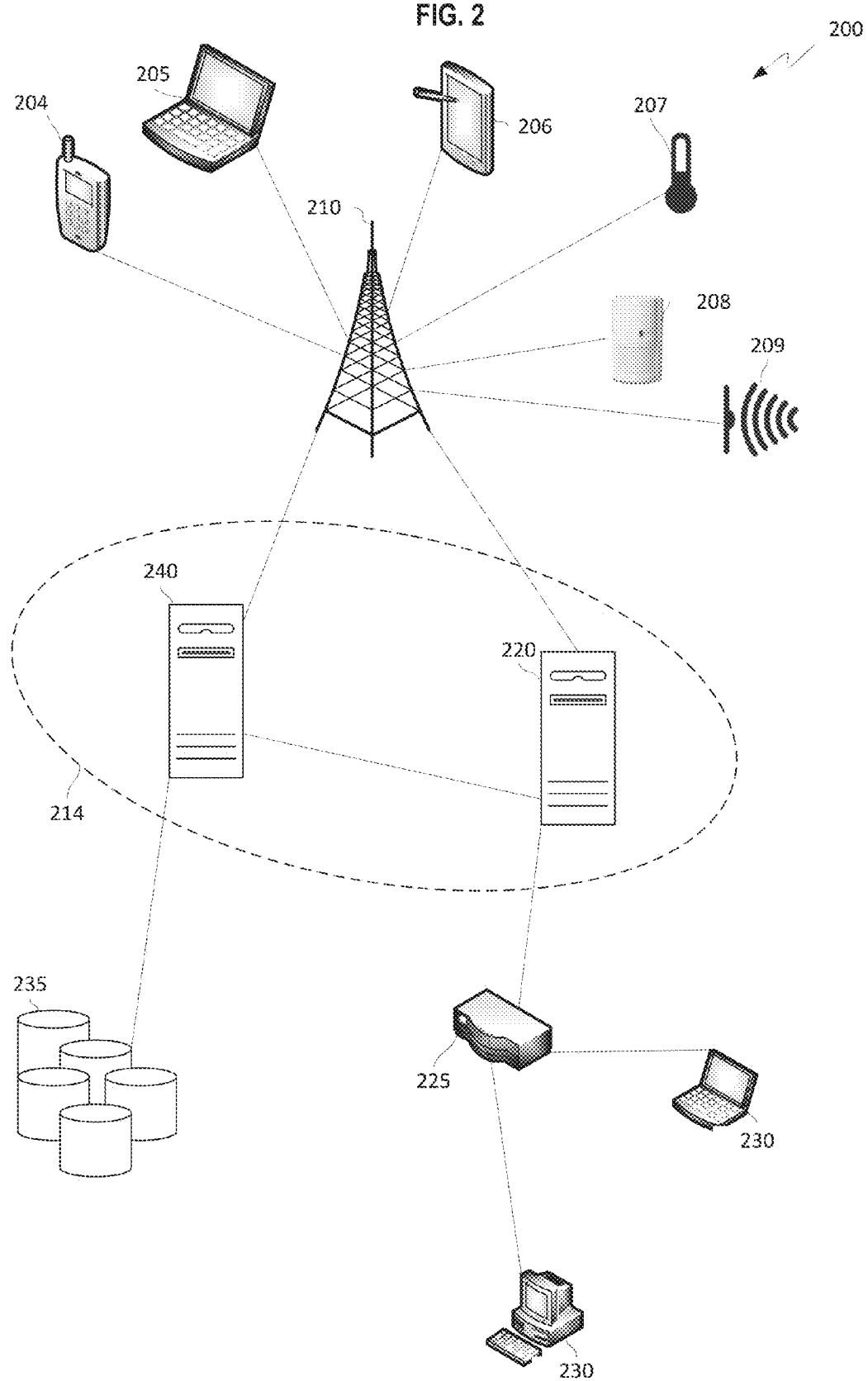
FIG. 2 illustrates an example network including an example set of devices communicating with each other over an exchange system and via a network, according to some embodiments of the present technology.

FIG. 2 illustrates an example network including an example set of devices communicating with each other over an exchange system and via a network, according to embodiments of the present technology. As noted, each communication within data transmission network 100 may occur over one or more networks. System 200 includes a network device 204 configured to communicate with a variety of types of client devices, for example client devices 230, over a variety of types of communication channels.

As shown in FIG. 2, network device 204 can transmit a communication over a network (e.g., a cellular network via a base station 210). The communication can be routed to another network device, such as network devices 205-209, via base station 210. The communication can also be routed to computing environment 214 via base station 210. For example, network device 204 may collect data either from its surrounding environment or from other network devices (such as network devices 205-209) and transmit that data to computing environment 214.

Although network devices 204-209 are shown in FIG. 2 as a mobile phone, laptop computer, tablet computer, temperature sensor, motion sensor, and audio sensor respectively, the network devices may be or include sensors that are sensitive to detecting aspects of their environment. For example, the network devices may include sensors such as water sensors, power sensors, electrical current sensors, chemical sensors, optical sensors, pressure sensors, geographic or position sensors (e.g., GPS), velocity sensors, acceleration sensors, flow rate sensors, among others. Examples of characteristics that may be sensed include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, electrical current, among others. The sensors may be mounted to various components used as part of a variety of different types of systems (e.g., an oil drilling operation). The network devices may detect and record data related to the environment that it monitors, and transmit that data to computing environment 214.

As noted, one type of system that may include various sensors that collect data to be processed and/or transmitted to a computing environment according to certain embodiments includes an oil drilling system. For example, the one or more drilling operation sensors may include surface sensors that measure a hook load, a fluid rate, a temperature and a density in and out of the wellbore, a standpipe pressure, a surface torque, a rotation speed of a drill pipe, a rate of penetration, a mechanical specific energy, etc. and downhole sensors that measure a rotation speed of a bit, fluid densities, downhole torque, downhole vibration (axial, tangential, lateral), a weight applied at a drill bit, an annular pressure, a differential pressure, an azimuth, an inclination, a dog leg severity, a measured depth, a vertical depth, a downhole temperature, etc. Besides the raw data collected directly by the sensors, other data may include parameters either developed by the sensors or assigned to the system by a client or other controlling device. For example, one or more drilling operation control parameters may control settings such as a mud motor speed to flow ratio, a bit diameter, a predicted formation top, seismic data, weather data, etc. Other data may be generated using physical models such as an earth model, a weather model, a seismic model, a bottom hole assembly model, a well plan model, an annular friction model, etc. In addition to sensor and control settings, predicted outputs, of for example, the rate of penetration, mechanical specific energy, hook load, flow in fluid rate, flow out fluid rate, pump pressure, surface torque, rotation speed of the drill pipe, annular pressure, annular friction pressure, annular temperature, equivalent circulating density, etc. may also be stored in the data warehouse.

In another example, another type of system that may include various sensors that collect data to be processed and/or transmitted to a computing environment according to certain embodiments includes a home automation or similar automated network in a different environment, such as an office space, school, public space, sports venue, or a variety of other locations. Network devices in such an automated network may include network devices that allow a user to access, control, and/or configure various home appliances located within the user's home (e.g., a television, radio, light, fan, humidifier, sensor, microwave, iron, and/or the like), or outside of the user's home (e.g., exterior motion sensors, exterior lighting, garage door openers, sprinkler systems, or the like). For example, network device 102 may include a home automation switch that may be coupled with a home appliance. In another embodiment, a network device can allow a user to access, control, and/or configure devices, such as office-related devices (e.g., copy machine, printer, or fax machine), audio and/or video related devices (e.g., a receiver, a speaker, a projector, a DVD player, or a television), media-playback devices (e.g., a compact disc player, a CD player, or the like), computing devices (e.g., a home computer, a laptop computer, a tablet, a personal digital assistant (PDA), a computing device, or a wearable device), lighting devices (e.g., a lamp or recessed lighting), devices associated with a security system, devices associated with an alarm system, devices that can be operated in an automobile (e.g., radio devices, navigation devices), and/or the like. Data may be collected from such various sensors in raw form, or data may be processed by the sensors to create parameters or other data either developed by the sensors based on the raw data or assigned to the system by a client or other controlling device.

In another example, another type of system that may include various sensors that collect data to be processed and/or transmitted to a computing environment according to certain embodiments includes a power or energy grid. A variety of different network devices may be included in an energy grid, such as various devices within one or more power plants, energy farms (e.g., wind farm, solar farm, among others) energy storage facilities, factories, homes and businesses of consumers, among others. One or more of such devices may include one or more sensors that detect energy gain or loss, electrical input or output or loss, and a variety of other efficiencies. These sensors may collect data to inform users of how the energy grid, and individual devices within the grid, may be functioning and how they may be made more efficient.

Network device sensors may also perform processing on data it collects before transmitting the data to the computing environment 114, or before deciding whether to transmit data to the computing environment 114. For example, network devices may determine whether data collected meets certain rules, for example by comparing data or values computed from the data and comparing that data to one or more thresholds. The network device may use this data and/or comparisons to determine if the data should be transmitted to the computing environment 214 for further use or processing.

Computing environment 214 may include machines 220 and 240. Although computing environment 214 is shown in FIG. 2 as having two machines, 220 and 240, computing environment 214 may have only one machine or may have more than two machines. The machines that make up computing environment 214 may include specialized computers, servers, or other machines that are configured to individually and/or collectively process large amounts of data. The computing environment 214 may also include storage devices that include one or more databases of structured data, such as data organized in one or more hierarchies, or unstructured data. The databases may communicate with the processing devices within computing environment 214 to distribute data to them. Since network devices may transmit data to computing environment 214, that data may be received by the computing environment 214 and subsequently stored within those storage devices. Data used by computing environment 214 may also be stored in data stores 235, which may also be a part of or connected to computing environment 214.

Computing environment 214 can communicate with various devices via one or more routers 225 or other inter-network or intra-network connection components. For example, computing environment 214 may communicate with devices 230 via one or more routers 225. Computing environment 214 may collect, analyze and/or store data from or pertaining to communications, client device operations, client rules, and/or user-associated actions stored at one or more data stores 235. Such data may influence communication routing to the devices within computing environment 214, how data is stored or processed within computing environment 214, among other actions.

Notably, various other devices can further be used to influence communication routing and/or processing between devices within computing environment 214 and with devices outside of computing environment 214. For example, as shown in FIG. 2, computing environment 214 may include a web server 240. Thus, computing environment 214 can retrieve data of interest, such as client information (e.g., product information, client rules, etc.), technical product details, news, current or predicted weather, and so on.

In addition to computing environment 214 collecting data (e.g., as received from network devices, such as sensors, and client devices or other sources) to be processed as part of a big data analytics project, it may also receive data in real time as part of a streaming analytics environment. As noted, data may be collected using a variety of sources as communicated via different kinds of networks or locally. Such data may be received on a real-time streaming basis. For example, network devices may receive data periodically from network device sensors as the sensors continuously sense, monitor and track changes in their environments. Devices within computing environment 214 may also perform pre-analysis on data it receives to determine if the data received should be processed as part of an ongoing project. The data received and collected by computing environment 214, no matter what the source or method or timing of receipt, may be processed over a period of time for a client to determine results data based on the client's needs and rules.

Figure 3:
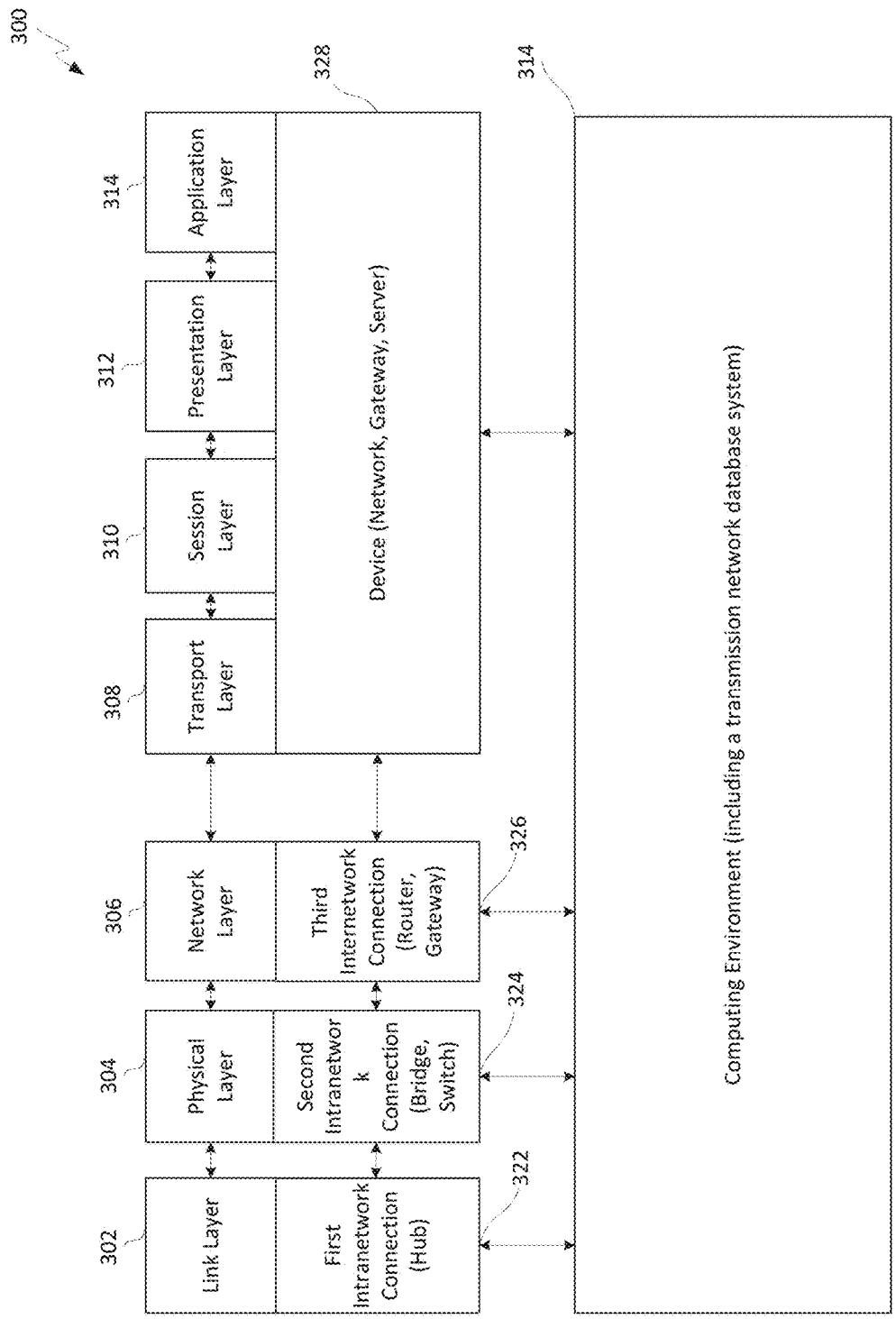
FIG. 3 illustrates a representation of a conceptual model of a communications protocol system, according to some embodiments of the present technology.

FIG. 3 illustrates a representation of a conceptual model of a communications protocol system, according to embodiments of the present technology. More specifically, FIG. 3 identifies operation of a computing environment in an Open Systems Interaction model that corresponds to various connection components. The model 300 shows, for example, how a computing environment, such as computing environment 314 (or computing environment 214 in FIG. 2) may communicate with other devices in its network, and control how communications between the computing environment and other devices are executed and under what conditions.

The model can include layers 302-314. The layers are arranged in a stack. Each layer in the stack serves the layer one level higher than it (except for the application layer, which is the highest layer), and is served by the layer one level below it (except for the physical layer, which is the lowest layer). The physical layer is the lowest layer because it receives and transmits raw bites of data, and is the farthest layer from the user in a communications system. On the other hand, the application layer is the highest layer because it interacts directly with a software application.

As noted, the model includes a physical layer 302. Physical layer 302 represents physical communication, and can define parameters of that physical communication. For example, such physical communication may come in the form of electrical, optical, or electromagnetic signals. Physical layer 302 also defines protocols that may control communications within a data transmission network.

Link layer 304 defines links and mechanisms used to transmit (i.e., move) data across a network. The link layer manages node-to-node communications, such as within a grid computing environment. Link layer 304 can detect and correct errors (e.g., transmission errors in the physical layer 302). Link layer 304 can also include a media access control (MAC) layer and logical link control (LLC) layer.

Network layer 306 defines the protocol for routing within a network. In other words, the network layer coordinates transferring data across nodes in a same network (e.g., such as a grid computing environment). Network layer 306 can also define the processes used to structure local addressing within the network.

Transport layer 308 can manage the transmission of data and the quality of the transmission and/or receipt of that data. Transport layer 308 can provide a protocol for transferring data, such as, for example, a Transmission Control Protocol (TCP). Transport layer 308 can assemble and disassemble data frames for transmission. The transport layer can also detect transmission errors occurring in the layers below it.

Session layer 310 can establish, maintain, and manage communication connections between devices on a network. In other words, the session layer controls the dialogues or nature of communications between network devices on the network. The session layer may also establish checkpointing, adjournment, termination, and restart procedures.

Presentation layer 312 can provide translation for communications between the application and network layers. In other words, this layer may encrypt, decrypt and/or format data based on data types and/or encodings known to be accepted by an application or network layer.

Application layer 314 interacts directly with software applications and end users, and manages communications between them. Application layer 314 can identify destinations, local resource states or availability and/or communication content or formatting using the applications.

Intra-network connection components 322 and 324 are shown to operate in lower levels, such as physical layer 302 and link layer 304, respectively. For example, a hub can operate in the physical layer, a switch can operate in the physical layer, and a router can operate in the network layer. Inter-network connection components 326 and 328 are shown to operate on higher levels, such as layers 306-314. For example, routers can operate in the network layer and network devices can operate in the transport, session, presentation, and application layers.

As noted, a computing environment 314 can interact with and/or operate on, in various embodiments, one, more, all or any of the various layers. For example, computing environment 314 can interact with a hub (e.g., via the link layer) so as to adjust which devices the hub communicates with. The physical layer may be served by the link layer, so it may implement such data from the link layer. For example, the computing environment 314 may control which devices it will receive data from. For example, if the computing environment 314 knows that a certain network device has turned off, broken, or otherwise become unavailable or unreliable, the computing environment 314 may instruct the hub to prevent any data from being transmitted to the computing environment 314 from that network device. Such a process may be beneficial to avoid receiving data that is inaccurate or that has been influenced by an uncontrolled environment. As another example, computing environment 314 can communicate with a bridge, switch, router or gateway and influence which device within the system (e.g., system 200) the component selects as a destination. In some embodiments, computing environment 314 can interact with various layers by exchanging communications with equipment operating on a particular layer by routing or modifying existing communications. In another embodiment, such as in a grid computing environment, a node may determine how data within the environment should be routed (e.g., which node should receive certain data) based on certain parameters or information provided by other layers within the model.

As noted, the computing environment 314 may be a part of a communications grid environment, the communications of which may be implemented as shown in the protocol of FIG. 3. For example, referring to FIG. 2, one or more of machines 220 and 240 may be part of a communications grid computing environment. A gridded computing environment may be employed in a distributed system with non-interactive workloads where data resides in memory on the machines, or compute nodes. In such an environment, analytic code, instead of a database management system, controls the processing performed by the nodes. Data is co-located by pre-distributing it to the grid nodes, and the analytic code on each node loads the local data into memory. Each node may be assigned a particular task such as a portion of a processing project, or to organize or control other nodes within the grid.

Figure 4:
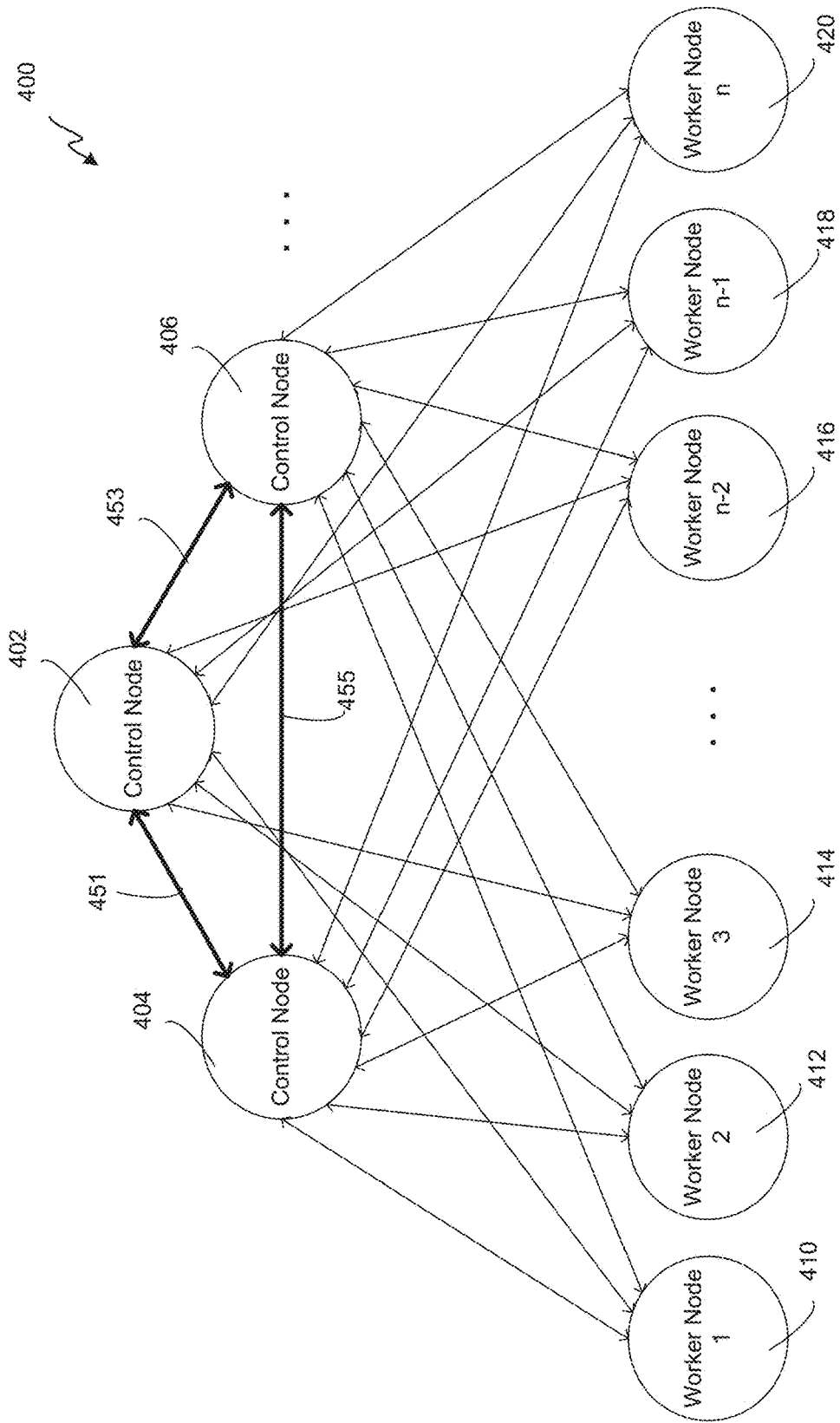
FIG. 4 illustrates a communications grid computing system including a variety of control and worker nodes, according to some embodiments of the present technology.

FIG. 4 illustrates a communications grid computing system 400 including a variety of control and worker nodes, according to embodiments of the present technology. Communications grid computing system 400 includes three control nodes and one or more worker nodes. Communications grid computing system 400 includes control nodes 402, 404, and 406. The control nodes are communicatively connected via communication paths 451, 453, and 455. Therefore, the control nodes may transmit information (e.g., related to the communications grid or notifications), to and receive information from each other. Although communications grid computing system 400 is shown in FIG. 4 as including three control nodes, the communications grid may include more or less than three control nodes.

Communications grid computing system (or just "communications grid") 400 also includes one or more worker nodes. Shown in FIG. 4 are six worker nodes 410-420. Although FIG. 4 shows six worker nodes, a communications grid according to embodiments of the present technology may include more or less than six worker nodes. The number of worker nodes included in a communications grid may be dependent upon how large the project or data set is being processed by the communications grid, the capacity of each worker node, the time designated for the communications grid to complete the project, among others. Each worker node within the communications grid 400 may be connected (wired or wirelessly, and directly or indirectly) to control nodes 402-406. Therefore, each worker node may receive information from the control nodes (e.g., an instruction to perform work on a project) and may transmit information to the control nodes (e.g., a result from work performed on a project). Furthermore, worker nodes may communicate with each other (either directly or indirectly). For example, worker nodes may transmit data between each other related to a job being performed or an individual task within a job being performed by that worker node. However, in certain embodiments, worker nodes may not, for example, be connected (communicatively or otherwise) to certain other worker nodes. In an embodiment, worker nodes may only be able to communicate with the control node that controls it, and may not be able to communicate with other worker nodes in the communications grid, whether they are other worker nodes controlled by the control node that controls the worker node, or worker nodes that are controlled by other control nodes in the communications grid.

A control node may connect with an external device with which the control node may communicate (e.g., a grid user, such as a server or computer, may connect to a controller of the grid). For example, a server or computer may connect to control nodes and may transmit a project or job to the node. The project may include a data set. The data set may be of any size. Once the control node receives such a project including a large data set, the control node may distribute the data set or projects related to the data set to be performed by worker nodes. Alternatively, for a project including a large data set, the data set may be received or stored by a machine other than a control node (e.g., a Hadoop data node employing Hadoop Distributed File System, or HDFS).

Control nodes may maintain knowledge of the status of the nodes in the grid (i.e., grid status information), accept work requests from clients, subdivide the work across worker nodes, coordinate the worker nodes, among other responsibilities. Worker nodes may accept work requests from a control node and provide the control node with results of the work performed by the worker node. A grid may be started from a single node (e.g., a machine, computer, server, etc.). This first node may be assigned or may start as the primary control node that will control any additional nodes that enter the grid.

When a project is submitted for execution (e.g., by a client or a controller of the grid) it may be assigned to a set of nodes. After the nodes are assigned to a project, a data structure (i.e., a communicator) may be created. The communicator may be used by the project for information to be shared between the project code running on each node. A communication handle may be created on each node. A handle, for example, is a reference to the communicator that is valid within a single process on a single node, and the handle may be used when requesting communications between nodes.

A control node, such as control node 402, may be designated as the primary control node. A server, computer or other external device may connect to the primary control node. Once the control node receives a project, the primary control node may distribute portions of the project to its worker nodes for execution. For example, when a project is initiated on communications grid 400, primary control node 402 controls the work to be performed for the project in order to complete the project as requested or instructed. The primary control node may distribute work to the worker nodes based on various factors, such as which subsets or portions of projects may be completed most efficiently and in the correct amount of time. For example, a worker node may perform analysis on a portion of data that is already local (e.g., stored on) the worker node. The primary control node also coordinates and processes the results of the work performed by each worker node after each worker node executes and completes its job. For example, the primary control node may receive a result from one or more worker nodes, and the control node may organize (e.g., collect and assemble) the results received and compile them to produce a complete result for the project received from the end user.

Any remaining control nodes, such as control nodes 404 and 406, may be assigned as backup control nodes for the project. In an embodiment, backup control nodes may not control any portion of the project. Instead, backup control nodes may serve as a backup for the primary control node and take over as primary control node if the primary control node were to fail. If a communications grid were to include only a single control node, and the control node were to fail (e.g., the control node is shut off or breaks) then the communications grid as a whole may fail and any project or job being run on the communications grid may fail and may not complete. While the project may be run again, such a failure may cause a delay (severe delay in some cases, such as overnight delay) in completion of the project. Therefore, a grid with multiple control nodes, including a backup control node, may be beneficial.

To add another node or machine to the grid, the primary control node may open a pair of listening sockets, for example. A socket may be used to accept work requests from clients, and the second socket may be used to accept connections from other grid nodes. The primary control node may be provided with a list of other nodes (e.g., other machines, computers, servers) that will participate in the grid, and the role that each node will fill in the grid. Upon startup of the primary control node (e.g., the first node on the grid), the primary control node may use a network protocol to start the server process on every other node in the grid. Command line parameters, for example, may inform each node of one or more pieces of information, such as: the role that the node will have in the grid, the host name of the primary control node, the port number on which the primary control node is accepting connections from peer nodes, among others. The information may also be provided in a configuration file, transmitted over a secure shell tunnel, recovered from a configuration server, among others. While the other machines in the grid may not initially know about the configuration of the grid, that information may also be sent to each other node by the primary control node. Updates of the grid information may also be subsequently sent to those nodes.

For any control node, other than the primary control node added to the grid, the control node may open three sockets. The first socket may accept work requests from clients, the second socket may accept connections from other grid members, and the third socket may connect (e.g., permanently) to the primary control node. When a control node (e.g., primary control node) receives a connection from another control node, it first checks to see if the peer node is in the list of configured nodes in the grid. If it is not on the list, the control node may clear the connection. If it is on the list, it may then attempt to authenticate the connection. If authentication is successful, the authenticating node may transmit information to its peer, such as the port number on which a node is listening for connections, the host name of the node, information about how to authenticate the node, among other information. When a node, such as the new control node, receives information about another active node, it will check to see if it already has a connection to that other node. If it does not have a connection to that node, it may then establish a connection to that control node.

Any worker node added to the grid may establish a connection to the primary control node and any other control nodes on the grid. After establishing the connection, it may authenticate itself to the grid (e.g., any control nodes, including both primary and backup, or a server or user controlling the grid). After successful authentication, the worker node may accept configuration information from the control node.

When a node joins a communications grid (e.g., when the node is powered on or connected to an existing node on the grid or both), the node is assigned (e.g., by an operating system of the grid) a universally unique identifier (UUID). This unique identifier may help other nodes and external entities (devices, users, etc.) to identify the node and distinguish it from other nodes. When a node is connected to the grid, the node may share its unique identifier with the other nodes in the grid. Since each node may share its unique identifier, each node may know the unique identifier of every other node on the grid. Unique identifiers may also designate a hierarchy of each of the nodes (e.g., backup control nodes) within the grid. For example, the unique identifiers of each of the backup control nodes may be stored in a list of backup control nodes to indicate an order in which the backup control nodes will take over for a failed primary control node to become a new primary control node. However, a hierarchy of nodes may also be determined using methods other than using the unique identifiers of the nodes. For example, the hierarchy may be predetermined, or may be assigned based on other predetermined factors.

The grid may add new machines at any time (e.g., initiated from any control node). Upon adding a new node to the grid, the control node may first add the new node to its table of grid nodes. The control node may also then notify every other control node about the new node. The nodes receiving the notification may acknowledge that they have updated their configuration information.

Primary control node 402 may, for example, transmit one or more communications to backup control nodes 404 and 406 (and, for example, to other control or worker nodes within the communications grid). Such communications may be sent periodically, at fixed time intervals, between known fixed stages of the project's execution, among other protocols. The communications transmitted by primary control node 402 may be of varied types and may include a variety of types of information. For example, primary control node 402 may transmit snapshots (e.g., status information) of the communications grid so that backup control node 404 always has a recent snapshot of the communications grid. The snapshot or grid status may include, for example, the structure of the grid (including, for example, the worker nodes in the grid, unique identifiers of the nodes, or their relationships with the primary control node) and the status of a project (including, for example, the status of each worker node's portion of the project). The snapshot may also include analysis or results received from worker nodes in the communications grid. The backup control nodes may receive and store the backup data received from the primary control node. The backup control nodes may transmit a request for such a snapshot (or other information) from the primary control node, or the primary control node may send such information periodically to the backup control nodes.

As noted, the backup data may allow the backup control node to take over as primary control node if the primary control node fails without requiring the grid to start the project over from scratch. If the primary control node fails, the backup control node that will take over as primary control node may retrieve the most recent version of the snapshot received from the primary control node and use the snapshot to continue the project from the stage of the project indicated by the backup data. This may prevent failure of the project as a whole.

A backup control node may use various methods to determine that the primary control node has failed. In one example of such a method, the primary control node may transmit (e.g., periodically) a communication to the backup control node that indicates that the primary control node is working and has not failed, such as a heartbeat communication. The backup control node may determine that the primary control node has failed if the backup control node has not received a heartbeat communication for a certain predetermined period of time. Alternatively, a backup control node may also receive a communication from the primary control node itself (before it failed) or from a worker node that the primary control node has failed, for example because the primary control node has failed to communicate with the worker node.

Different methods may be performed to determine which backup control node of a set of backup control nodes (e.g., backup control nodes 404 and 406) will take over for failed primary control node 402 and become the new primary control node. For example, the new primary control node may be chosen based on a ranking or "hierarchy" of backup control nodes based on their unique identifiers. In an alternative embodiment, a backup control node may be assigned to be the new primary control node by another device in the communications grid or from an external device (e.g., a system infrastructure or an end user, such as a server or computer, controlling the communications grid). In another alternative embodiment, the backup control node that takes over as the new primary control node may be designated based on bandwidth or other statistics about the communications grid.

A worker node within the communications grid may also fail. If a worker node fails, work being performed by the failed worker node may be redistributed amongst the operational worker nodes. In an alternative embodiment, the primary control node may transmit a communication to each of the operable worker nodes still on the communications grid that each of the worker nodes should purposefully fail also. After each of the worker nodes fail, they may each retrieve their most recent saved checkpoint of their status and re-start the project from that checkpoint to minimize lost progress on the project being executed.

Figure 5:
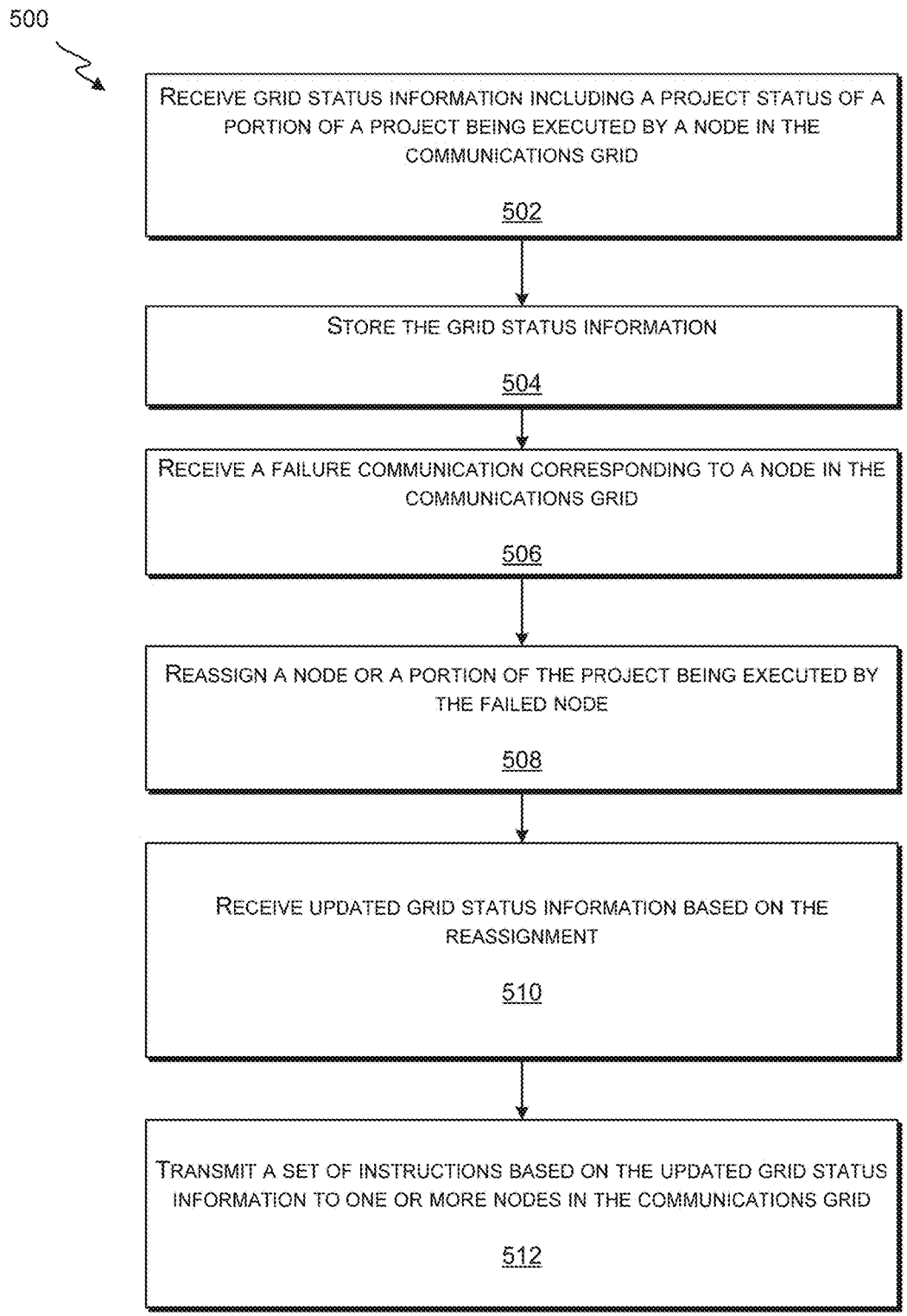
FIG. 5 illustrates a flow chart showing an example process for adjusting a communications grid or a work project in a communications grid after a failure of a node, according to some embodiments of the present technology.

FIG. 5 illustrates a flow chart showing an example process for adjusting a communications grid or a work project in a communications grid after a failure of a node, according to embodiments of the present technology. The process may include, for example, receiving grid status information including a project status of a portion of a project being executed by a node in the communications grid, as described in operation 502. For example, a control node (e.g., a backup control node connected to a primary control node and a worker node on a communications grid) may receive grid status information, where the grid status information includes a project status of the primary control node or a project status of the worker node. The project status of the primary control node and the project status of the worker node may include a status of one or more portions of a project being executed by the primary and worker nodes in the communications grid. The process may also include storing the grid status information, as described in operation 504. For example, a control node (e.g., a backup control node) may store the received grid status information locally within the control node. Alternatively, the grid status information may be sent to another device for storage where the control node may have access to the information.

The process may also include receiving a failure communication corresponding to a node in the communications grid in operation 506. For example, a node may receive a failure communication including an indication that the primary control node has failed, prompting a backup control node to take over for the primary control node. In an alternative embodiment, a node may receive a failure that a worker node has failed, prompting a control node to reassign the work being performed by the worker node. The process may also include reassigning a node or a portion of the project being executed by the failed node, as described in operation 508. For example, a control node may designate the backup control node as a new primary control node based on the failure communication upon receiving the failure communication. If the failed node is a worker node, a control node may identify a project status of the failed worker node using the snapshot of the communications grid, where the project status of the failed worker node includes a status of a portion of the project being executed by the failed worker node at the failure time.

The process may also include receiving updated grid status information based on the reassignment, as described in operation 510, and transmitting a set of instructions based on the updated grid status information to one or more nodes in the communications grid, as described in operation 512. The updated grid status information may include an updated project status of the primary control node or an updated project status of the worker node. The updated information may be transmitted to the other nodes in the grid to update their stale stored information.

Figure 6:
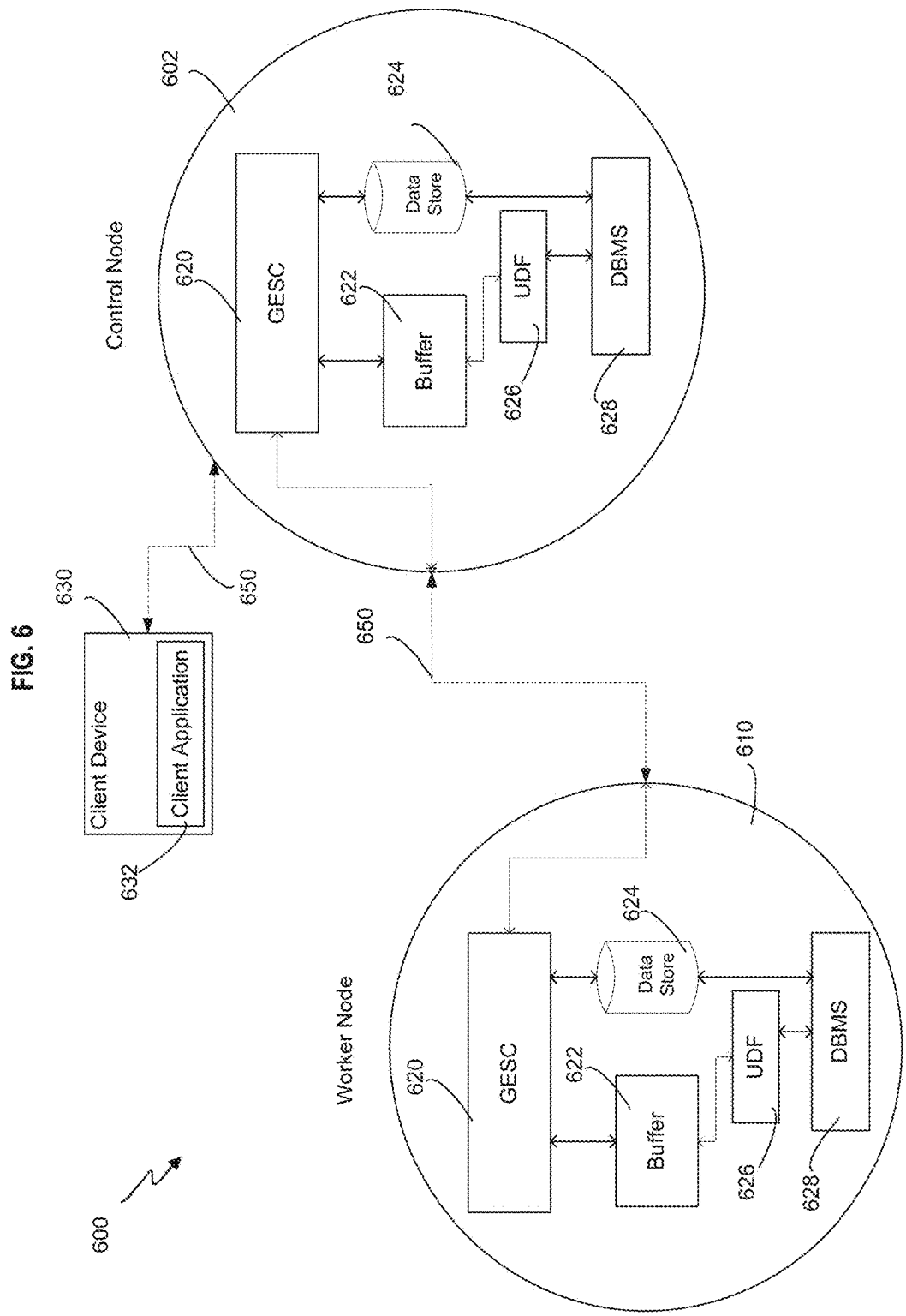
FIG. 6 illustrates a portion of a communications grid computing system including a control node and a worker node, according to some embodiments of the present technology.

FIG. 6 illustrates a portion of a communications grid computing system 600 including a control node and a worker node, according to embodiments of the present technology. Communications grid 600 computing system includes one control node (control node 602) and one worker node (worker node 610) for purposes of illustration, but may include more worker and/or control nodes. The control node 602 is communicatively connected to worker node 610 via communication path 650. Therefore, control node 602 may transmit information (e.g., related to the communications grid or notifications), to and receive information from worker node 610 via path 650.

Similar to in FIG. 4, communications grid computing system (or just "communications grid") 600 includes data processing nodes (control node 602 and worker node 610). Nodes 602 and 610 comprise multi-core data processors. Each node 602 and 610 includes a grid-enabled software component (GESC) 620 that executes on the data processor associated with that node and interfaces with buffer memory 622 also associated with that node. Each node 602 and 610 includes a database management software (DBMS) 628 that executes on a database server (not shown) at control node 602 and on a database server (not shown) at worker node 610.

Each node also includes a data store 624. Data stores 624, similar to network-attached data stores 110 in FIG. 1 and data stores 235 in FIG. 2, are used to store data to be processed by the nodes in the computing environment. Data stores 624 may also store any intermediate or final data generated by the computing system after being processed, for example in non-volatile memory. However, in certain embodiments, the configuration of the grid computing environment allows its operations to be performed such that intermediate and final data results can be stored solely in volatile memory (e.g., RAM), without a requirement that intermediate or final data results be stored to non-volatile types of memory. Storing such data in volatile memory may be useful in certain situations, such as when the grid receives queries (e.g., ad hoc) from a client and when responses, which are generated by processing large amounts of data, need to be generated quickly or on-the-fly. In such a situation, the grid may be configured to retain the data within memory so that responses can be generated at different levels of detail and so that a client may interactively query against this information.

Each node also includes a user-defined function (UDF) 626. The UDF provides a mechanism for the DMBS 628 to transfer data to or receive data from the database stored in the data stores 624 that are managed by the DBMS. For example, UDF 626 can be invoked by the DBMS to provide data to the GESC for processing. The UDF 626 may establish a socket connection (not shown) with the GESC to transfer the data. Alternatively, the UDF 626 can transfer data to the GESC by writing data to shared memory accessible by both the UDF and the GESC.

The GESC 620 at the nodes 602 and 620 may be connected via a network, such as network 108 shown in FIG. 1. Therefore, nodes 602 and 620 can communicate with each other via the network using a predetermined communication protocol such as, for example, the Message Passing Interface (MPI). Each GESC 620 can engage in point-to-point communication with the GESC at another node or in collective communication with multiple GESCs via the network. The GESC 620 at each node may contain identical (or nearly identical) software instructions. The GESC at the control node 602 can communicate, over a communication path 652, with a client device 630. More specifically, control node 602 may communicate with client application 632 hosted by the client device 630 to receive queries and to respond to those queries after processing large amounts of data.

DMBS 628 may control the creation, maintenance, and use of database or data structure (not shown) within a node 602 or 610. The database may organize data stored in data stores 624. The DMBS 628 at control node 602 may accept requests for data and transfer the appropriate data for the request. With such a process, collections of data may be distributed across multiple physical locations. In this example, each node 602 and 610 stores a portion of the total data managed by the management system in its associated data store 624.

Furthermore, the DBMS may be responsible for protecting against data loss using replication techniques. Replication includes providing a backup copy of data stored on one node on one or more other nodes. Therefore, if one node fails, the data from the failed node can be recovered from a replicated copy residing at another node. However, as described herein with respect to FIG. 4, data or status information for each node in the communications grid may also be shared with each node on the grid.

Figure 7:
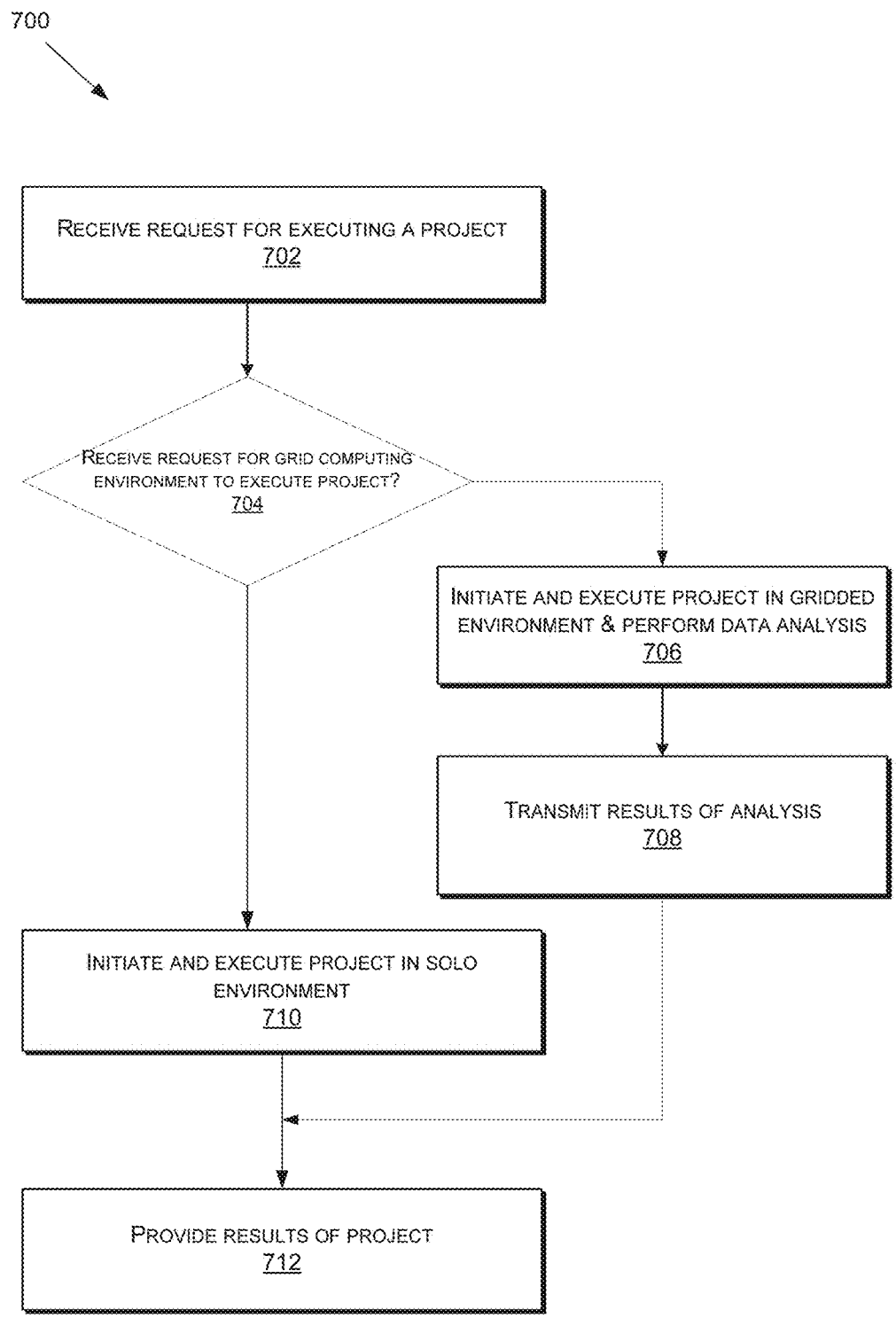
FIG. 7 illustrates a flow chart showing an example process for executing a data analysis or processing project, according to some embodiments of the present technology.

FIG. 7 illustrates a flow chart showing an example method for executing a project within a grid computing system, according to embodiments of the present technology. As described with respect to FIG. 6, the GESC at the control node may transmit data with a client device (e.g., client device 630) to receive queries for executing a project and to respond to those queries after large amounts of data have been processed. The query may be transmitted to the control node, where the query may include a request for executing a project, as described in operation 702. The query can contain instructions on the type of data analysis to be performed in the project and whether the project should be executed using the grid-based computing environment, as shown in operation 704.

To initiate the project, the control node may determine if the query requests use of the grid-based computing environment to execute the project. If the determination is no, then the control node initiates execution of the project in a solo environment (e.g., at the control node), as described in operation 710. If the determination is yes, the control node may initiate execution of the project in the grid-based computing environment, as described in operation 706. In such a situation, the request may include a requested configuration of the grid. For example, the request may include a number of control nodes and a number of worker nodes to be used in the grid when executing the project. After the project has been completed, the control node may transmit results of the analysis yielded by the grid, as described in operation 708. Whether the project is executed in a solo or grid-based environment, the control node provides the results of the project.

As noted with respect to FIG. 2, the computing environments described herein may collect data (e.g., as received from network devices, such as sensors, such as network devices 204-209 in FIG. 2, and client devices or other sources) to be processed as part of a data analytics project, and data may be received in real time as part of a streaming analytics environment (e.g., ESP). Data may be collected using a variety of sources as communicated via different kinds of networks or locally, such as on a real-time streaming basis. For example, network devices may receive data periodically from network device sensors as the sensors continuously sense, monitor and track changes in their environments. More specifically, an increasing number of distributed applications develop or produce continuously flowing data from distributed sources by applying queries to the data before distributing the data to geographically distributed recipients. An event stream processing engine (ESPE) may continuously apply the queries to the data as it is received and determines which entities should receive the data. Client or other devices may also subscribe to the ESPE or other devices processing ESP data so that they can receive data after processing, based on for example the entities determined by the processing engine. For example, client devices 230 in FIG. 2 may subscribe to the ESPE in computing environment 214. In another example, event subscription devices 874a-c, described further with respect to FIG. 10, may also subscribe to the ESPE. The ESPE may determine or define how input data or event streams from network devices or other publishers (e.g., network devices 204-209 in FIG. 2) are transformed into meaningful output data to be consumed by subscribers, such as for example client devices 230 in FIG. 2.

FIG. 8 illustrates a block diagram including components of an Event Stream Processing Engine (ESPE), according to embodiments of the present technology. ESPE 800 may include one or more projects 802. A project may be described as a second-level container in an engine model managed by ESPE 800 where a thread pool size for the project may be defined by a user. Each project of the one or more projects 802 may include one or more continuous queries 804 that contain data flows, which are data transformations of incoming event streams. The one or more continuous queries 804 may include one or more source windows 806 and one or more derived windows 808.

The ESPE may receive streaming data over a period of time related to certain events, such as events or other data sensed by one or more network devices. The ESPE may perform operations associated with processing data created by the one or more devices. For example, the ESPE may receive data from the one or more network devices 204-209 shown in FIG. 2. As noted, the network devices may include sensors that sense different aspects of their environments, and may collect data over time based on those sensed observations. For example, the ESPE may be implemented within one or more of machines 220 and 240 shown in FIG. 2. The ESPE may be implemented within such a machine by an ESP application. An ESP application may embed an ESPE with its own dedicated thread pool or pools into its application space where the main application thread can do application-specific work and the ESPE processes event streams at least by creating an instance of a model into processing objects.

The engine container is the top-level container in a model that manages the resources of the one or more projects 802. In an illustrative embodiment, for example, there may be only one ESPE 800 for each instance of the ESP application, and ESPE 800 may have a unique engine name. Additionally, the one or more projects 802 may each have unique project names, and each query may have a unique continuous query name and begin with a uniquely named source window of the one or more source windows 806. ESPE 800 may or may not be persistent.

Continuous query modeling involves defining directed graphs of windows for event stream manipulation and transformation. A window in the context of event stream manipulation and transformation is a processing node in an event stream processing model. A window in a continuous query can perform aggregations, computations, pattern-matching, and other operations on data flowing through the window. A continuous query may be described as a directed graph of source, relational, pattern matching, and procedural windows. The one or more source windows 806 and the one or more derived windows 808 represent continuously executing queries that generate updates to a query result set as new event blocks stream through ESPE 800. A directed graph, for example, is a set of nodes connected by edges, where the edges have a direction associated with them.

An event object may be described as a packet of data accessible as a collection of fields, with at least one of the fields defined as a key or unique identifier (ID). The event object may be created using a variety of formats including binary, alphanumeric, XML, etc. Each event object may include one or more fields designated as a primary identifier (ID) for the event so ESPE 800 can support operation codes (opcodes) for events including insert, update, upsert, and delete. Upsert opcodes update the event if the key field already exists; otherwise, the event is inserted. For illustration, an event object may be a packed binary representation of a set of field values and include both metadata and field data associated with an event. The metadata may include an opcode indicating if the event represents an insert, update, delete, or upsert, a set of flags indicating if the event is a normal, partial-update, or a retention generated event from retention policy management, and a set of microsecond timestamps that can be used for latency measurements.

An event block object may be described as a grouping or package of event objects. An event stream may be described as a flow of event block objects. A continuous query of the one or more continuous queries 804 transforms a source event stream made up of streaming event block objects published into ESPE 800 into one or more output event streams using the one or more source windows 806 and the one or more derived windows 808. A continuous query can also be thought of as data flow modeling.

The one or more source windows 806 are at the top of the directed graph and have no windows feeding into them. Event streams are published into the one or more source windows 806, and from there, the event streams may be directed to the next set of connected windows as defined by the directed graph. The one or more derived windows 808 are all instantiated windows that are not source windows and that have other windows streaming events into them. The one or more derived windows 808 may perform computations or transformations on the incoming event streams. The one or more derived windows 808 transform event streams based on the window type (that is operators such as join, filter, compute, aggregate, copy, pattern match, procedural, union, etc.) and window settings. As event streams are published into ESPE 800, they are continuously queried, and the resulting sets of derived windows in these queries are continuously updated.

FIG. 9 illustrates a flow chart showing an example process including operations performed by an event stream processing engine, according to some embodiments of the present technology. As noted, the ESPE 800 (or an associated ESP application) defines how input event streams are transformed into meaningful output event streams. More specifically, the ESP application may define how input event streams from publishers (e.g., network devices providing sensed data) are transformed into meaningful output event streams consumed by subscribers (e.g., a data analytics project being executed by a machine or set of machines).

Within the application, a user may interact with one or more user interface windows presented to the user in a display under control of the ESPE independently or through a browser application in an order selectable by the user. For example, a user may execute an ESP application, which causes presentation of a first user interface window, which may include a plurality of menus and selectors such as drop-down menus, buttons, text boxes, hyperlinks, etc. associated with the ESP application as understood by a person of skill in the art. As further understood by a person of skill in the art, various operations may be performed in parallel, for example, using a plurality of threads.

At operation 900, an ESP application may define and start an ESPE, thereby instantiating an ESPE at a device, such as machine 220 and/or 240. In an operation 902, the engine container is created. For illustration, ESPE 800 may be instantiated using a function call that specifies the engine container as a manager for the model.

In an operation 904, the one or more continuous queries 804 are instantiated by ESPE 800 as a model. The one or more continuous queries 804 may be instantiated with a dedicated thread pool or pools that generate updates as new events stream through ESPE 800. For illustration, the one or more continuous queries 804 may be created to model business processing logic within ESPE 800, to predict events within ESPE 800, to model a physical system within ESPE 800, to predict the physical system state within ESPE 800, etc. For example, as noted, ESPE 800 may be used to support sensor data monitoring and management (e.g., sensing may include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, or electrical current, etc.).

ESPE 800 may analyze and process events in motion or "event streams." Instead of storing data and running queries against the stored data, ESPE 800 may store queries and stream data through them to allow continuous analysis of data as it is received. The one or more source windows 806 and the one or more derived windows 808 may be created based on the relational, pattern matching, and procedural algorithms that transform the input event streams into the output event streams to model, simulate, score, test, predict, etc. based on the continuous query model defined and application to the streamed data.

In an operation 906, a publish/subscribe (pub/sub) capability is initialized for ESPE 800. In an illustrative embodiment, a pub/sub capability is initialized for each project of the one or more projects 802. To initialize and enable pub/sub capability for ESPE 800, a port number may be provided. Pub/sub clients can use a host name of an ESP device running the ESPE and the port number to establish pub/sub connections to ESPE 800.

FIG. 10 illustrates an ESP system 850 interfacing between publishing device 872 and event subscribing devices 874a-c, according to embodiments of the present technology. ESP system 850 may include ESP device or subsystem 851, event publishing device 872, an event subscribing device A 874a, an event subscribing device B 874b, and an event subscribing device C 874c. Input event streams are output to ESP device 851 by publishing device 872. In alternative embodiments, the input event streams may be created by a plurality of publishing devices. The plurality of publishing devices further may publish event streams to other ESP devices. The one or more continuous queries instantiated by ESPE 800 may analyze and process the input event streams to form output event streams output to event subscribing device A 874a, event subscribing device B 874b, and event subscribing device C 874c. ESP system 850 may include a greater or a fewer number of event subscribing devices of event subscribing devices.

Publish-subscribe is a message-oriented interaction paradigm based on indirect addressing. Processed data recipients specify their interest in receiving information from ESPE 800 by subscribing to specific classes of events, while information sources publish events to ESPE 800 without directly addressing the receiving parties. ESPE 800 coordinates the interactions and processes the data. In some cases, the data source receives confirmation that the published information has been received by a data recipient.

A publish/subscribe API may be described as a library that enables an event publisher, such as publishing device 872, to publish event streams into ESPE 800 or an event subscriber, such as event subscribing device A 874a, event subscribing device B 874b, and event subscribing device C 874c, to subscribe to event streams from ESPE 800. For illustration, one or more publish/subscribe APIs may be defined. Using the publish/subscribe API, an event publishing application may publish event streams into a running event stream processor project source window of ESPE 800, and the event subscription application may subscribe to an event stream processor project source window of ESPE 800.

The publish/subscribe API provides cross-platform connectivity and endianness compatibility between ESP application and other networked applications, such as event publishing applications instantiated at publishing device 872, and event subscription applications instantiated at one or more of event subscribing device A 874a, event subscribing device B 874b, and event subscribing device C 874c.

Referring back to FIG. 9, operation 906 initializes the publish/subscribe capability of ESPE 800. In an operation 908, the one or more projects 802 are started. The one or more started projects may run in the background on an ESP device. In an operation 910, an event block object is received from one or more computing device of the event publishing device 872.

ESP subsystem 800 may include a publishing client 852, ESPE 800, a subscribing client A 854, a subscribing client B 856, and a subscribing client C 858. Publishing client 852 may be started by an event publishing application executing at publishing device 872 using the publish/subscribe API. Subscribing client A 854 may be started by an event subscription application A, executing at event subscribing device A 874a using the publish/subscribe API. Subscribing client B 856 may be started by an event subscription application B executing at event subscribing device B 874b using the publish/subscribe API. Subscribing client C 858 may be started by an event subscription application C executing at event subscribing device C 874c using the publish/subscribe API.

An event block object containing one or more event objects is injected into a source window of the one or more source windows 806 from an instance of an event publishing application on event publishing device 872. The event block object may be generated, for example, by the event publishing application and may be received by publishing client 852. A unique ID may be maintained as the event block object is passed between the one or more source windows 806 and/or the one or more derived windows 808 of ESPE 800, and to subscribing client A 854, subscribing client B 806, and subscribing client C 808 and to event subscription device A 874a, event subscription device B 874b, and event subscription device C 874c. Publishing client 852 may further generate and include a unique embedded transaction ID in the event block object as the event block object is processed by a continuous query, as well as the unique ID that publishing device 872 assigned to the event block object.

In an operation 912, the event block object is processed through the one or more continuous queries 804. In an operation 914, the processed event block object is output to one or more computing devices of the event subscribing devices 874a-c. For example, subscribing client A 804, subscribing client B 806, and subscribing client C 808 may send the received event block object to event subscription device A 874a, event subscription device B 874b, and event subscription device C 874c, respectively.

ESPE 800 maintains the event block containership aspect of the received event blocks from when the event block is published into a source window and works its way through the directed graph defined by the one or more continuous queries 804 with the various event translations before being output to subscribers. Subscribers can correlate a group of subscribed events back to a group of published events by comparing the unique ID of the event block object that a publisher, such as publishing device 872, attached to the event block object with the event block ID received by the subscriber.

In an operation 916, a determination is made concerning whether or not processing is stopped. If processing is not stopped, processing continues in operation 910 to continue receiving the one or more event streams containing event block objects from the, for example, one or more network devices. If processing is stopped, processing continues in an operation 918. In operation 918, the started projects are stopped. In operation 920, the ESPE is shutdown.

As noted, in some embodiments, big data is processed for an analytics project after the data is received and stored. In other embodiments, distributed applications process continuously flowing data in real-time from distributed sources by applying queries to the data before distributing the data to geographically distributed recipients. As noted, an event stream processing engine (ESPE) may continuously apply the queries to the data as it is received and determines which entities receive the processed data. This allows for large amounts of data being received and/or collected in a variety of environments to be processed and distributed in real time. For example, as shown with respect to FIG. 2, data may be collected from network devices that may include devices within the internet of things, such as devices within a home automation network. However, such data may be collected from a variety of different resources in a variety of different environments. In any such situation, embodiments of the present technology allow for real-time processing of such data.

Aspects of the current disclosure provide technical solutions to technical problems, such as computing problems that arise when an ESP device fails which results in a complete service interruption and potentially significant data loss. The data loss can be catastrophic when the streamed data is supporting mission critical operations such as those in support of an ongoing manufacturing or drilling operation. An embodiment of an ESP system achieves a rapid and seamless failover of ESPE running at the plurality of ESP devices without service interruption or data loss, thus significantly improving the reliability of an operational system that relies on the live or real-time processing of the data streams. The event publishing systems, the event subscribing systems, and each ESPE not executing at a failed ESP device are not aware of or effected by the failed ESP device. The ESP system may include thousands of event publishing systems and event subscribing systems. The ESP system keeps the failover logic and awareness within the boundaries of out-messaging network connector and out-messaging network device.

In one example embodiment, a system is provided to support a failover when event stream processing (ESP) event blocks. The system includes, but is not limited to, an out-messaging network device and a computing device. The computing device includes, but is not limited to, a processor and a computer-readable medium operably coupled to the processor. The processor is configured to execute an ESP engine (ESPE). The computer-readable medium has instructions stored thereon that, when executed by the processor, cause the computing device to support the failover. An event block object is received from the ESPE that includes a unique identifier. A first status of the computing device as active or standby is determined. When the first status is active, a second status of the computing device as newly active or not newly active is determined. Newly active is determined when the computing device is switched from a standby status to an active status. When the second status is newly active, a last published event block object identifier that uniquely identifies a last published event block object is determined. A next event block object is selected from a non-transitory computer-readable medium accessible by the computing device. The next event block object has an event block object identifier that is greater than the determined last published event block object identifier. The selected next event block object is published to an out-messaging network device. When the second status of the computing device is not newly active, the received event block object is published to the out-messaging network device. When the first status of the computing device is standby, the received event block object is stored in the non-transitory computer-readable medium.

Figure 11:
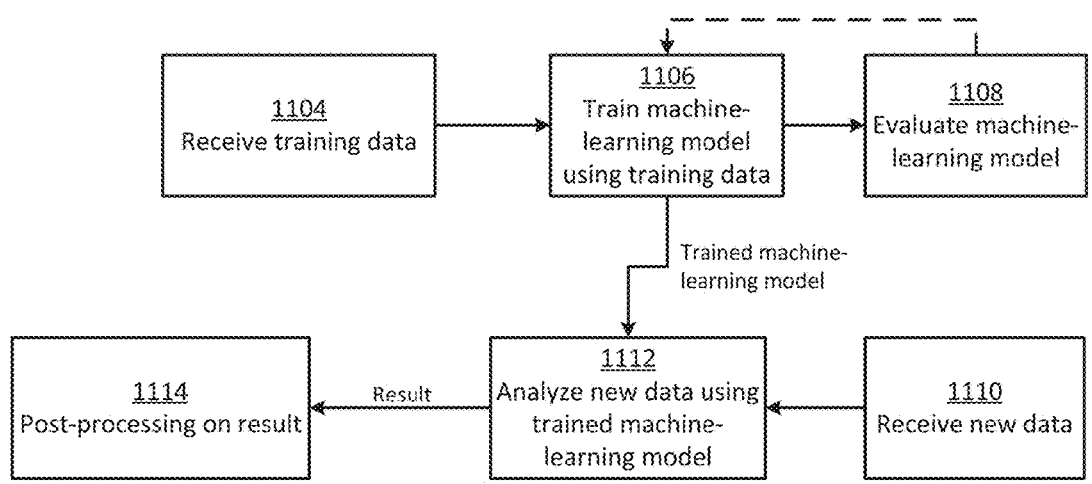
FIG. 11 illustrates a flow chart showing an example process for generating and using a machine-learning model, according to some embodiments of the present technology.

FIG. 11 is a flow chart of an example of a process for generating and using a machine-learning model according to some aspects. Machine learning is a branch of artificial intelligence that relates to mathematical models that can learn from, categorize, and make predictions about data. Such mathematical models, which can be referred to as machine-learning models, can classify input data among two or more classes; cluster input data among two or more groups; predict a result based on input data; identify patterns or trends in input data; identify a distribution of input data in a space; or any combination of these. Examples of machine-learning models can include (i) neural networks; (ii) decision trees, such as classification trees and regression trees; (iii) classifiers, such as Naïve bias classifiers, logistic regression classifiers, ridge regression classifiers, random forest classifiers, least absolute shrinkage and selector (LASSO) classifiers, and support vector machines; (iv) clusterers, such as k-means clusterers, mean-shift clusterers, and spectral clusterers; (v) factorizers, such as factorization machines, principal component analyzers and kernel principal component analyzers; and (vi) ensembles or other combinations of machine-learning models. In some examples, neural networks can include deep neural networks, feed-forward neural networks, recurrent neural networks, convolutional neural networks, radial basis function (RBF) neural networks, echo state neural networks, long short-term memory neural networks, bi-directional recurrent neural networks, gated neural networks, hierarchical recurrent neural networks, stochastic neural networks, modular neural networks, spiking neural networks, dynamic neural networks, cascading neural networks, neuro-fuzzy neural networks, or any combination of these.

Different machine-learning models may be used interchangeably to perform a task. Examples of tasks that can be performed at least partially using machine-learning models include various types of scoring; bioinformatics; cheminformatics; software engineering; fraud detection; customer segmentation; generating online recommendations; adaptive websites; determining customer lifetime value; search engines; placing advertisements in real time or near real time; classifying DNA sequences; affective computing; performing natural language processing and understanding; object recognition and computer vision; robotic locomotion; playing games; optimization and metaheuristics; detecting network intrusions; medical diagnosis and monitoring; or predicting when an asset, such as a machine, will need maintenance.

Any number and combination of tools can be used to create machine-learning models. Examples of tools for creating and managing machine-learning models can include SAS® Enterprise Miner, SAS® Rapid Predictive Modeler, and SAS® Model Manager, SAS Cloud Analytic Services (CAS)®, SAS Viya® of all which are by SAS Institute Inc. of Cary, N.C.

Machine-learning models can be constructed through an at least partially automated (e.g., with little or no human involvement) process called training. During training, input data can be iteratively supplied to a machine-learning model to enable the machine-learning model to identify patterns related to the input data or to identify relationships between the input data and output data. With training, the machine-learning model can be transformed from an untrained state to a trained state. Input data can be split into one or more training sets and one or more validation sets, and the training process may be repeated multiple times. The splitting may follow a k-fold cross-validation rule, a leave-one-out-rule, a leave-p-out rule, or a holdout rule. An overview of training and using a machine-learning model is described below with respect to the flow chart of FIG. 11.

In block 1104, training data is received. In some examples, the training data is received from a remote database or a local database, constructed from various subsets of data, or input by a user. The training data can be used in its raw form for training a machine-learning model or pre-processed into another form, which can then be used for training the machine-learning model. For example, the raw form of the training data can be smoothed, truncated, aggregated, clustered, or otherwise manipulated into another form, which can then be used for training the machine-learning model.

In block 1106, a machine-learning model is trained using the training data. The machine-learning model can be trained in a supervised, unsupervised, or semi-supervised manner. In supervised training, each input in the training data is correlated to a desired output. This desired output may be a scalar, a vector, or a different type of data structure such as text or an image. This may enable the machine-learning model to learn a mapping between the inputs and desired outputs. In unsupervised training, the training data includes inputs, but not desired outputs, so that the machine-learning model has to find structure in the inputs on its own. In semi-supervised training, only some of the inputs in the training data are correlated to desired outputs.

In block 1108, the machine-learning model is evaluated. For example, an evaluation dataset can be obtained, for example, via user input or from a database. The evaluation dataset can include inputs correlated to desired outputs. The inputs can be provided to the machine-learning model and the outputs from the machine-learning model can be compared to the desired outputs. If the outputs from the machine-learning model closely correspond with the desired outputs, the machine-learning model may have a high degree of accuracy. For example, if 90% or more of the outputs from the machine-learning model are the same as the desired outputs in the evaluation dataset, the machine-learning model may have a high degree of accuracy. Otherwise, the machine-learning model may have a low degree of accuracy. The 90% number is an example only. A realistic and desirable accuracy percentage is dependent on the problem and the data.

In some examples, if the machine-learning model has an inadequate degree of accuracy for a particular task, the process can return to block 1106, where the machine-learning model can be further trained using additional training data or otherwise modified to improve accuracy. If the machine-learning model has an adequate degree of accuracy for the particular task, the process can continue to block 1110.

In block 1110, new data is received. In some examples, the new data is received from a remote database or a local database, constructed from various subsets of data, or input by a user. The new data may be unknown to the machine-learning model. For example, the machine-learning model may not have previously processed or analyzed the new data.

In block 1112, the trained machine-learning model is used to analyze the new data and provide a result. For example, the new data can be provided as input to the trained machine-learning model. The trained machine-learning model can analyze the new data and provide a result that includes a classification of the new data into a particular class, a clustering of the new data into a particular group, a prediction based on the new data, or any combination of these.

In block 1114, the result is post-processed. For example, the result can be added to, multiplied with, or otherwise combined with other data as part of a job. As another example, the result can be transformed from a first format, such as a time series format, into another format, such as a count series format. Any number and combination of operations can be performed on the result during post-processing.

Figure 12:
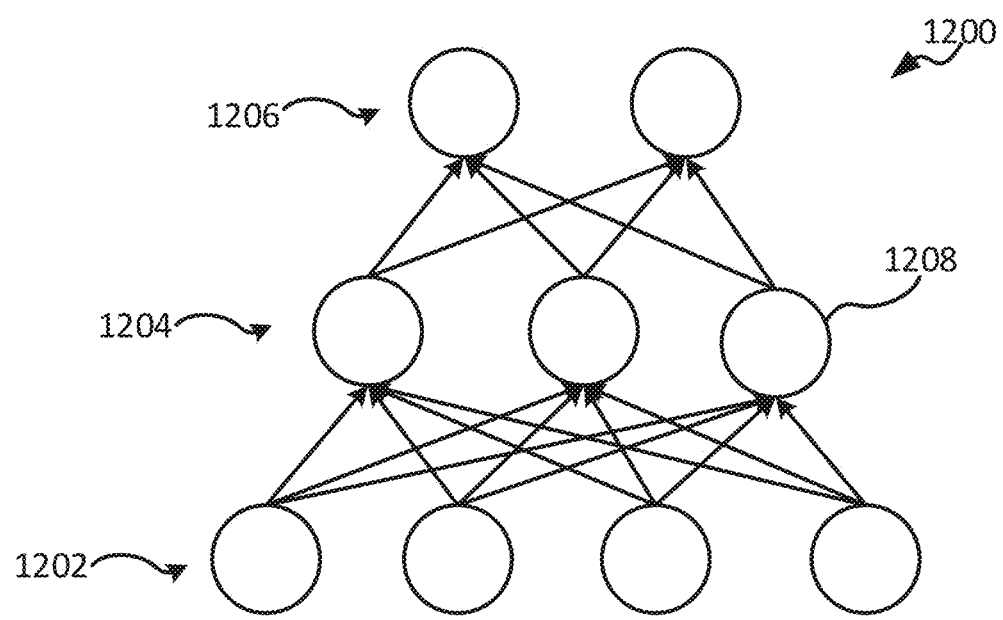
FIG. 12 illustrates a neural network including multiple layers of interconnected neurons, according to some embodiments of the present technology.

A more specific example of a machine-learning model is the neural network 1200 shown in FIG. 12. The neural network 1200 is represented as multiple layers of interconnected neurons, such as neuron 1208, that can exchange data between one another. The layers include an input layer 1202 for receiving input data, a hidden layer 1204, and an output layer 1206 for providing a result. The hidden layer 1204 is referred to as hidden because it may not be directly observable or have its input directly accessible during the normal functioning of the neural network 1200. Although the neural network 1200 is shown as having a specific number of layers and neurons for exemplary purposes, the neural network 1200 can have any number and combination of layers, and each layer can have any number and combination of neurons.

The neurons and connections between the neurons can have numeric weights, which can be tuned during training. For example, training data can be provided to the input layer 1202 of the neural network 1200, and the neural network 1200 can use the training data to tune one or more numeric weights of the neural network 1200. In some examples, the neural network 1200 can be trained using backpropagation. Backpropagation can include determining a gradient of a particular numeric weight based on a difference between an actual output of the neural network 1200 and a desired output of the neural network 1200. Based on the gradient, one or more numeric weights of the neural network 1200 can be updated to reduce the difference, thereby increasing the accuracy of the neural network 1200. This process can be repeated multiple times to train the neural network 1200. For example, this process can be repeated hundreds or thousands of times to train the neural network 1200.

In some examples, the neural network 1200 is a feed-forward neural network. In a feed-forward neural network, every neuron only propagates an output value to a subsequent layer of the neural network 1200. For example, data may only move one direction (forward) from one neuron to the next neuron in a feed-forward neural network.

In other examples, the neural network 1200 is a recurrent neural network. A recurrent neural network can include one or more feedback loops, allowing data to propagate in both forward and backward through the neural network 1200. This can allow for information to persist within the recurrent neural network. For example, a recurrent neural network can determine an output based at least partially on information that the recurrent neural network has seen before, giving the recurrent neural network the ability to use previous input to inform the output.

In some examples, the neural network 1200 operates by receiving a vector of numbers from one layer; transforming the vector of numbers into a new vector of numbers using a matrix of numeric weights, a nonlinearity, or both; and providing the new vector of numbers to a subsequent layer of the neural network 1200. Each subsequent layer of the neural network 1200 can repeat this process until the neural network 1200 outputs a final result at the output layer 1206. For example, the neural network 1200 can receive a vector of numbers as an input at the input layer 1202. The neural network 1200 can multiply the vector of numbers by a matrix of numeric weights to determine a weighted vector. The matrix of numeric weights can be tuned during the training of the neural network 1200. The neural network 1200 can transform the weighted vector using a nonlinearity, such as a sigmoid tangent or the hyperbolic tangent. In some examples, the nonlinearity can include a rectified linear unit, which can be expressed using the following equation:

$$y = \max(x, 0)$$

where y is the output and x is an input value from the weighted vector. The transformed output can be supplied to a subsequent layer, such as the hidden layer 1204, of the neural network 1200. The subsequent layer of the neural network 1200 can receive the transformed output, multiply the transformed output by a matrix of numeric weights and a nonlinearity, and provide the result to yet another layer of the neural network 1200. This process continues until the neural network 1200 outputs a final result at the output layer 1206.

Other examples of the present disclosure may include any number and combination of machine-learning models having any number and combination of characteristics. The machine-learning model(s) can be trained in a supervised, semi-supervised, or unsupervised manner, or any combination of these. The machine-learning model(s) can be implemented using a single computing device or multiple computing devices, such as the communications grid computing system 400 discussed above.

Implementing some examples of the present disclosure at least in part by using machine-learning models can reduce the total number of processing iterations, time, memory, electrical power, or any combination of these consumed by a computing device when analyzing data. For example, a neural network may more readily identify patterns in data than other approaches. This may enable the neural network to analyze the data using fewer processing cycles and less memory than other approaches, while obtaining a similar or greater level of accuracy.

According to embodiments discussed herein, the above-described computing devices and systems may be utilized to implement one or more aspects of a clustered data visualizer. One or more aspects of the clustered data visualizer described herein may be used to reveal valuable patterns in data, reduce network traffic for communicating data visualizations, and/or increase rendering speeds for presenting data visualizations, resulting in a computing device and/or system with exclusive and advantageous capabilities. For example, heat maps or a heat map matrix may be generated that utilizes colors and color gradients in conjunction with clustered datasets to enable useful patterns and/or correlations in data to be identified and interpreted.

In these and other ways the clustered data visualizer can enable the extraction of meaningful, actionable, and valuable information from clustered datasets in an intuitive, efficient, and on demand manner, resulting in several technical effects, advantages, and advances over conventional computer technology. In various embodiments, the clustered data visualizer may be implemented in a practical application via one or more computing devices, and thereby provide additional and useful functionality to the one or more computing devices, resulting in more capable, better functioning, and improved computing devices. In one or more embodiments, the clustered data visualizer may be implemented as a set of rules that improve computer-related technology by allowing a function not previously performable by a computer that enables an improved technological result to be achieved. In one or more such embodiments, the function may include encoding a collection of clustered datasets with colors and/or color gradients to realize insightful and intelligible data visualizations as an improved technological result. In some embodiments, the clustered data visualizer may enable a computing device to reduce network traffic and/or increase rendering speed by efficiently condensing data for transmission and/or presentation without unduly compromising the content of the data.

Figure 13:
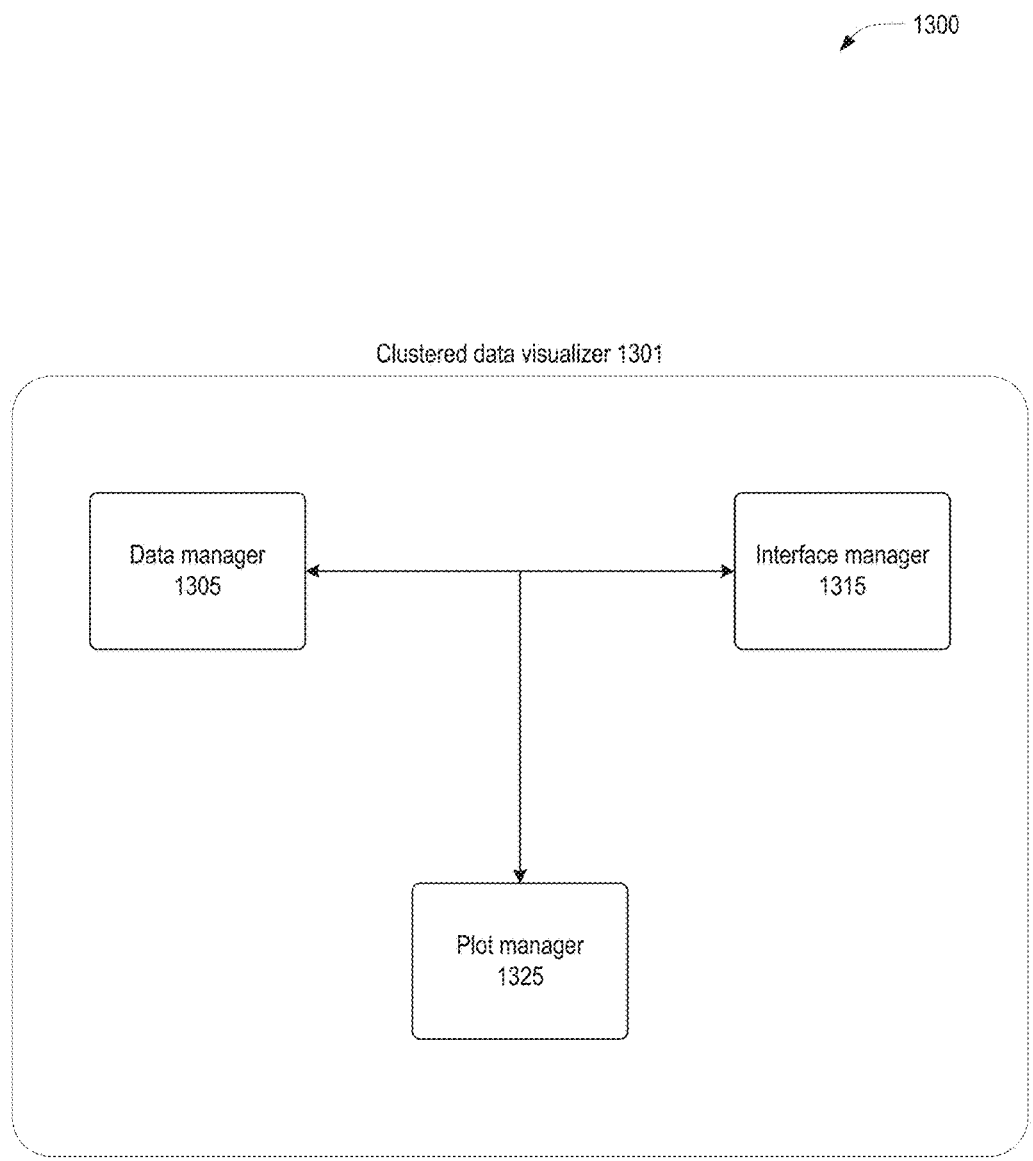
FIG. 13 illustrates various aspects of an exemplary clustered data visualizer, according to some embodiments of the present technology.

FIG. 13 illustrates an exemplary clustered data visualizer 1301 in environment 1300 that may be representative of various embodiments. In environment 1300, clustered data visualizer 1301 may include a data manager 1305, an interface manager 1315, and a plot manager 1325. In many embodiments, the components of clustered data visualizer may interoperate to enable identification of useful patterns and relationships among a collection of clustered datasets. In one or more embodiments described herein, clustered data visualizer 1301 may utilize a different color for each clustered dataset in a collection to visualize which cluster is dominant in each cell of a heat map. In one or more such embodiments, a color gradient may be used among different heat map cells of a common color that correspond to a common dominant cluster to visualize data concentrations/distributions within each cluster of data represented in the heat map. Embodiments are not limited in this context.

Figure 14A:
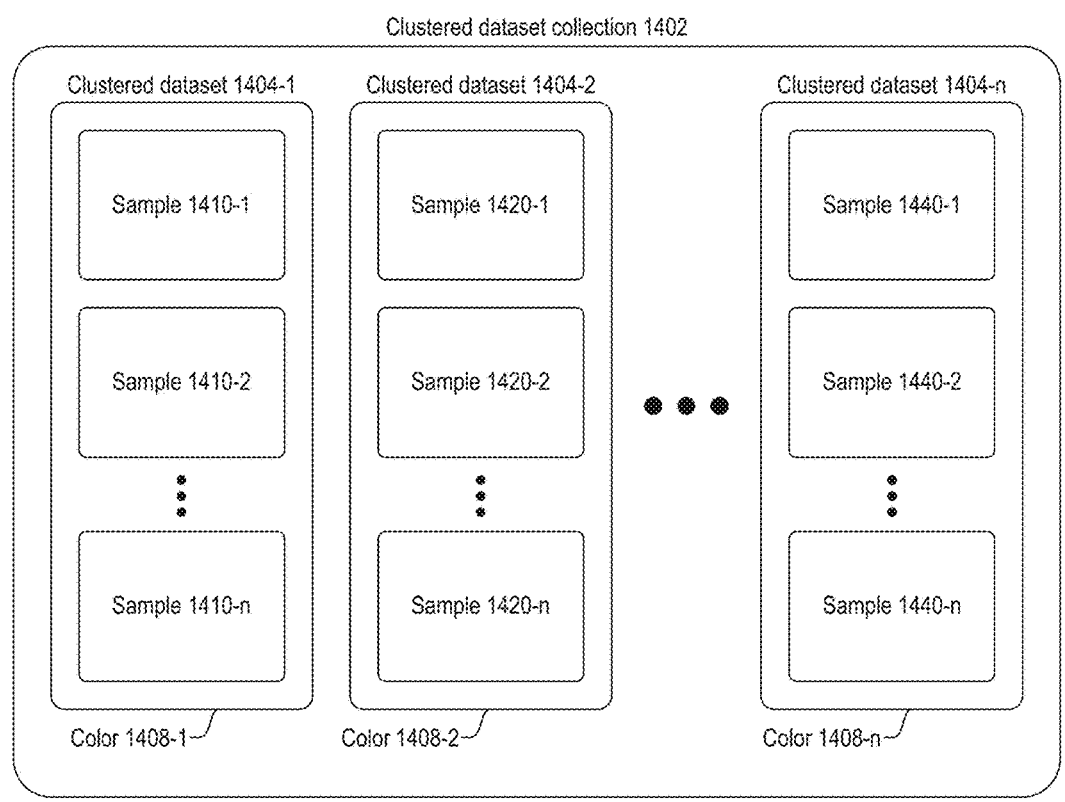
FIGS. 14A and 14B illustrate various aspects of an exemplary clustered dataset collection, according to some embodiments of the present technology.
Figure 14B:
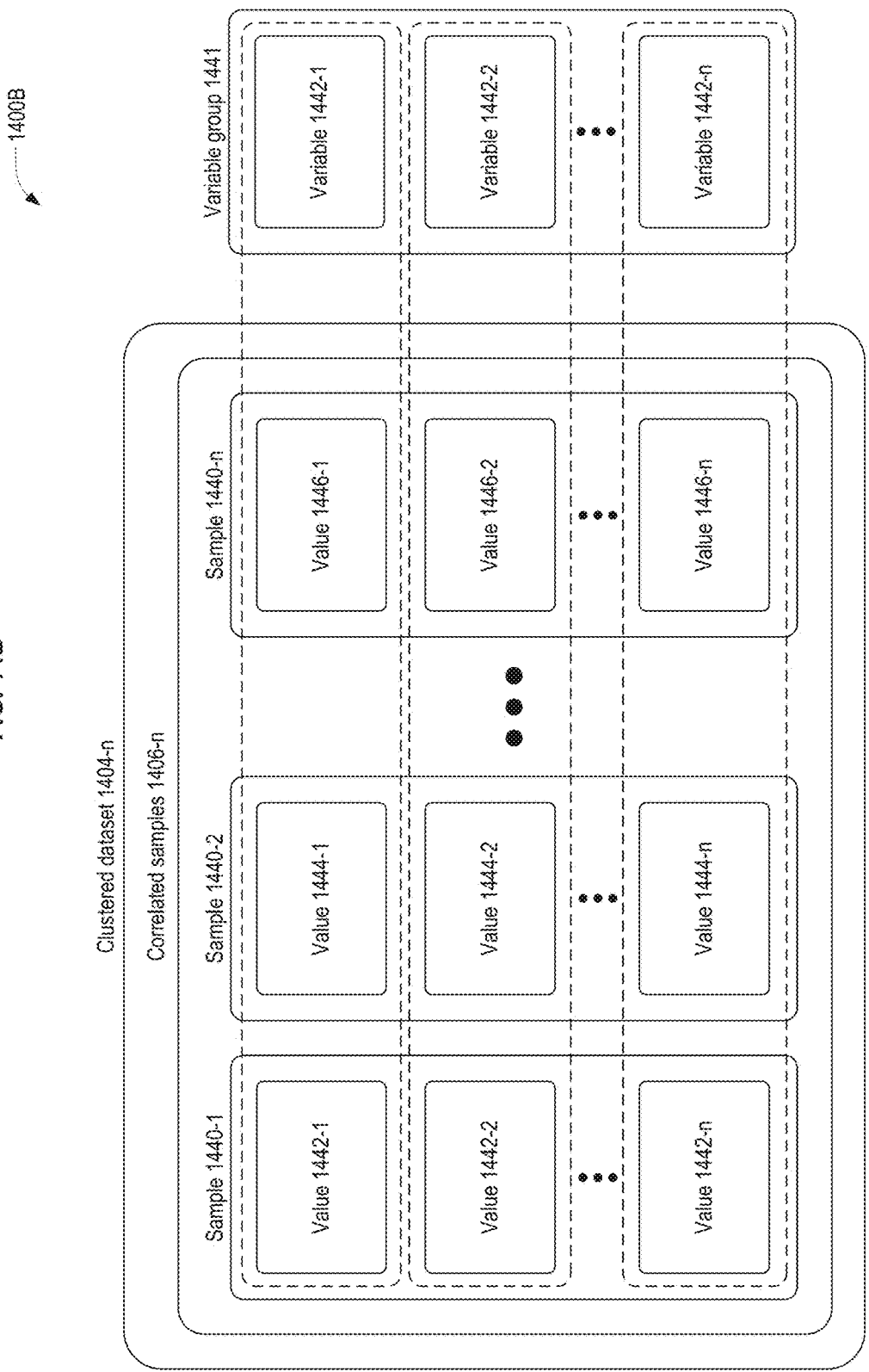

In various embodiments, the data manager 1305 may identify a collection of clustered datasets (see e.g., FIGS. 14A and 14B). For example, data manager 1305 may identify a collection of clustered datasets that is generated by a clustering algorithm. In several embodiments, data manager 1305 may arrange and/or format data for utilization by the plot manager and/or the interface manager 1315. In some embodiments, data manager 1305 may execute a clustering algorithm on a dataset to produce a collection of clustered datasets. In many embodiments, data manager 1305 may associated with clustered dataset in a collection with a different or unique color (see e.g., FIG. 14A). In various embodiments, associating each clustered dataset in a collection with a different color may enable visual data to readily be associated with a corresponding clustered dataset. In one or more embodiments, data manager 1305 may determine plotting data from a collection of clustered datasets (see e.g., FIG. 16).

In various embodiments, the plotting data may include data points for each clustered dataset that include values for a pair of variables. In various such embodiments, each variable in the pair may be represented on an axis of a heat map generated based on the plotting data. In some embodiments, plotting data may include data points for multiple pairs of variables, such as for the generation of a heat map matrix. In many embodiments, one or more settings or configurations associated with data manager 1305 may be set via interface manager 1315. For example, variable pairs or color assignments may be set and/or selected via interface manager 1315. In several embodiments, the plotting data may be provided to plot manager 1325 for generation of one or more visualizations corresponding to the collection of clustered datasets.

In many embodiments, plot manager 1325 may generate various types of plots and graphics for visualizing collections of clustered datasets based on plotting data. For instance, plot manager 1325 may produce one or more heat maps (see e.g., FIG. 18), heat map matrices (see e.g., FIGS. 19A-20C), parallel coordinates plots (see e.g., FIG. 21B), bubble plots (see e.g., FIG. 22), small data plots (see e.g., FIG. 23), detailed views (see e.g., FIGS. 24A and 24B), and tool tip views (see e.g., FIG. 26) based on plotting data. In some embodiments, plot manager 1325 may determine binning and/or plotting parameters for plotting data (see e.g., FIGS. 17A-17D). For example, plot manager 1325 may determine bin ranges along each axis of a heat map. In some such example, plot manager 1325 may determine bin crossings and then bin each data point in plotting data according to the bin crossings. In one or more embodiments described herein, a bin crossing may include the intersection of a first range of values along a first plot axis with a second range of values along a second plot axis. Typically, the first plot axis is orthogonal to the second plot axis.

In various embodiments plot manager 1325 may determine colors and/or color gradients for each bin crossing based on the data points binned therein and colors assigned to various clustered data sets. For instance, plot manager 1325 may identify a dominant clustered dataset for each bin crossing and utilize the color assigned to the clustered dataset identified as dominant to color the bin crossing in a generated heat map. Further, in many embodiments, a color gradient may be used among different heat map cells of a common color that correspond to a common dominant cluster to visualize data distributions within each cluster of data represented in the heat map. In some embodiments, one or more settings, views, or configurations associated with plot manager 1325 may be set and/or selected via interface manager 1315 (see e.g., FIG. 25). For example, variable ranges for bin crossings may be set via interface manager 1315.

More generally, interface manager 1315 may provide a UI via which may be utilized to control and/or customize how a collection of clustered datasets is visualized. In some embodiments, multiple visualization may be simultaneously presented to facilitate data interpretation. For instance, a heat map matrix may be presented in conjunction with a parallel coordinates plot. In various embodiments, interface manager 1315 may enable heat maps to be presented via a UI that enables the granularity of data presented to be readily adjusted. For instance, a heat map matrix may be used to clearly and efficiently present an overview of a collection of clustered datasets and selecting or identifying various portions or features of the heat map matrix via interface manager 1315 may cause finer grained data to be presented. In some embodiments, a tooltip view of data may be presented that provides numerical values for an identified portion of a heat map. In various embodiments, a detailed view of a selected portion of a heat map may be presented via the UI. In several embodiments, menu options may be accessed via the UI to customize data visualizations.

FIGS. 14A and 14B illustrate various aspects of a clustered dataset collection 1402 in environments 1400A, 1400B that may be representative of various embodiments. Referring to FIG. 14A, in environment 1400A clustered dataset collection 1402 may include one or more clustered datasets 1404-1, 1404-2, 1404-$n$ (or clustered datasets 1404) that are each associated with a color 1408-1, 1408-2, 1408-$n$ (or colors 1408). Further, clustered dataset 1404-1 may include one or more samples 1410-1, 1410-2, 1410-$n$ (or samples 1410), clustered dataset 1404-2 may include one or more samples 1420-1, 1420-2, 1420-$n$ (or samples 1420), and clustered dataset 1404-$n$ may include one or more samples 1440-1, 1440-2, 1440-$n$ (or samples 1440). Referring to FIG. 14B, environment 1400B illustrates clustered dataset 1404-$n$ in more detail. As will be appreciated, clustered dataset 1404-$n$ in environment 1400B may be representative of any of the one or more clustered datasets 1404-1, 1404-2, 1404-$n$ in clustered dataset collection 1402. In environment 1500, clustered dataset 1404-$n$ is shown in conjunction with a variable group 1441. In some embodiments, clustered dataset 1404-$n$ may include one or more correlated samples 1406-$n$, including samples 1440-1, 1440-2, 1440-$n$. In many embodiments, each of the samples may include one or more values that correspond to one or more variables in variable group 1441. For example, sample 1440-1 may include value 1442-1 that corresponds with variable 1442-1 of variable group 1441, value 1442-2 that corresponds with variable 1442-2 of variable group 1441, and value 1442-$n$ that corresponds with variable 1442-$n$ of variable group 1441. Similarly, sample 1440-2 may include value 1444-1 that corresponds with variable 1442-1 of variable group 1441, value 1444-2 that corresponds with variable 1442-2 of variable group 1441, and value 1444-$n$ that corresponds with variable 1442-$n$ of variable group 1441 and sample 1440-$n$ may include value 1446-1 that corresponds with variable 1442-1 of variable group 1441, value 1446-2 that corresponds with variable 1442-2 of variable group 1441, and value 1446-$n$ that corresponds with variable 1442-$n$ of variable group 1441. Embodiments are not limited in this context.

In one or more embodiments, clustered data visualizer 1301 may generated one or more data visualizations, plots, or graphics described herein based on dataset collection 1402. Referring to FIG. 14A, in various embodiments, clustered dataset collection 1402 may be produced by a clustering algorithm. Accordingly, in several embodiments, each of clustered datasets 1404 may include a unique subset of a dataset (e.g., a unique set of correlated samples). In several such embodiments, each sample in each clustered dataset may have been determined to be correlated in some manner by a clustering algorithm. In various embodiments, each clustered dataset may be associated with a unique or different color. For instance, clustered dataset 1404-1 may be associated with color 1408-1 (e.g., red), clustered dataset 1404-2 may be associated with color 1408-2 (e.g., green), and clustered dataset 1404-$n$ may be associated with color 1408-$n$ (e.g., blue). In many embodiments, associating each of clustered datasets 1404 with a color may enable data from different clustered datasets to readily be distinguished in any visualizations generated based thereon.

Referring now to FIG. 14B, clustered dataset 1404-$n$ will now be described in more detail as a representative example of a clustered dataset. In various embodiments, clustered dataset 1404-$n$ may include a set of correlated samples 1406-$n$. As previously mentioned, each of the one or more samples 1440 in correlated samples 1406-$n$ may be associated with each other according to a clustering algorithm. In some embodiments, intelligible reasoning behind the correlation among samples may not be explicitly determined or communicated by the clustering algorithm. Accordingly, one or more data visualizations, plots, or graphics described herein may be utilized to facilitate determining the correlation among samples in a clustered dataset, as well as relationships between different clustered datasets.

In many embodiments, each sample may include one or more values and each of the one or more values may be associated with a variable in variable group 1441. In one or more embodiments described herein, each variable 1442 in variable group 1441 may correspond to a common characteristic among samples in a dataset. In various embodiments, samples in a dataset comprised of a collection of clustered datasets may correspond to instances with the values corresponding to empirical data comprising characteristic observations of the instances. In various such embodiments, the characteristic observations may result in categorical and/or numerical data. In several embodiments, an instance may refer to anything that has observable/detectable characteristics. For example, an instance may include one or more of an occurrence, an entity, an issue, an object, a time, a location, a target, a state, a property, and a component.

For example, each of samples 1440 may correspond to an instance of a person in a population. In such examples, variable 1442-1 may correspond to a height observation of a person, variable 1442-2 may correspond to a weight observation of a person, and variable 1442-n may correspond to a number of daily cigarettes observation of a person. Accordingly, value 1442-1 may include the weight of the person that corresponds to sample 1440-1, value 1442-2 may include the height of the person that corresponds to sample 1440-1, and value 1442-n may include the number of daily cigarettes the person that corresponds to sample 1440-1 smokes. Further, values 1444-1, 1444-2, 1444-n may include similar characteristic observations of the person that corresponds to sample 1440-2 and values 1446-1, 1446-2, 1446-n may include similar characteristic observations of the person that corresponds to sample 1440-n. Continuing with this example, a clustering algorithm may have previously identified groups of people that are correlated in some way among a population of people. These groups of correlated people may correspond to the different clustered datasets with one or more correlated samples.

Figure 15:
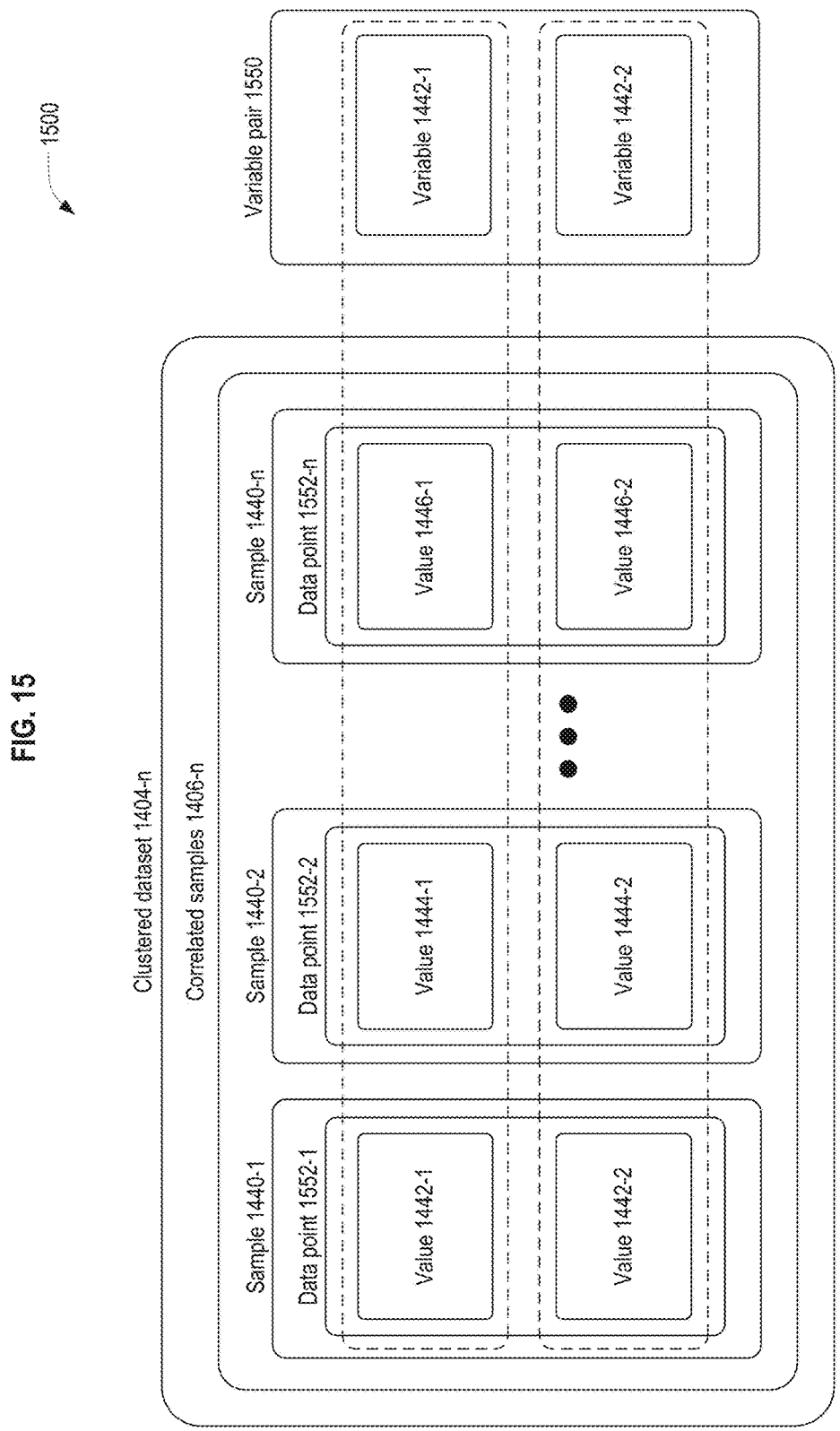
FIG. 15 illustrates various aspects of an exemplary clustered dataset, according to some embodiments of the present technology.

FIG. 15 illustrates various aspects of clustered dataset 1404-1 in environment 1500 that may be representative of various embodiments. In environment 1500, clustered dataset 1404-1 is shown in conjunction with a variable pair 1550. In various embodiments variable pair 1550 may be identified from the variable group 1441 for closer inspection. For instance, variable pair 1550 may be identified from variable group 1441 for closer inspection via a UI provided by interface manager 1315. In one or more embodiments described herein, each of variables 1442-1, 1442-2 may be represented on a separate axis of a graphic, such as a heat map, generated based thereon (see e.g., FIG. 18). In many embodiments, multiple variable pairs may be simultaneously presented for closer inspection, such as in a heat map matrix (see e.g., FIG. 19A). Embodiments are not limited in this context.

In some embodiments, different and/or multiple variable pairs may be presented in various graphics to discover relationships therebetween. In some such embodiments, discovering relationships between different variable pairs may enable the realization of correlations between/among one or more of samples in a clustered dataset, variables in a variable group, and/or clustered datasets in a collection. For example, a correlation between a clustered dataset and a variable may be realized. In several embodiments, characteristics of clustered datasets may be realized. For instance, concentrations of data points from a collection of clustered datasets may be realized.

Returning to the example involving samples relating to different people and variables in variable group 1441 relating to height, weight, and daily number of cigarettes, variable pair 1550 may include height observations for variable 1442-1 and weight observations for variable 1442-2. Accordingly, sample 1440-1 corresponds to a first person with value 1442-1 representing their height and value 1442-2 representing their weight, sample 1440-2 corresponds to a second person with value 1444-1 representing their height and value 1444-2 representing their weight, and sample 1440-1 corresponds to a third person with value 1442-1 representing their height and value 1442-2 representing their weight. Therefore, plotting of data points 1552-1, 1552-2, 1552-n (or data points 1552) may result in a chart of height vs. weight for the first, second, and third persons. In various embodiments, data manager 1305 may arrange and/or format input data to produce plotting data (see e.g., FIG. 16) comprising data points 1552 for generating a visualization, such as by plot manager 1325. In various such embodiments, the arranging and/or formatting of input data may be at least partially directed base on inputs received via interface manager 1315.

Figure 16:
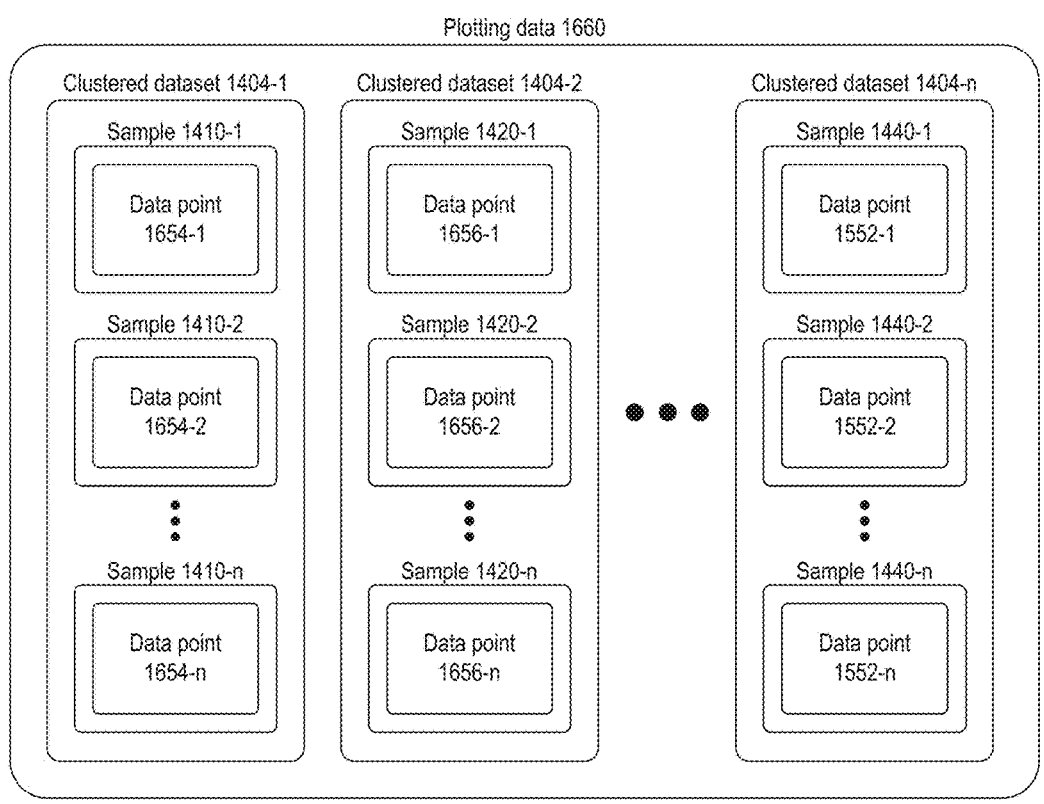
FIG. 16 illustrates various aspects of exemplary plotting data, according to some embodiments of the present technology.

FIG. 16 illustrates various aspects of plotting data 1660 in environment 1600 that may be representative of various embodiments. In environment 1600, plotting data 1660 may include data points for each sample in each clustered dataset in a collection. In some embodiments, the data points in plotting data 1660 may correspond to values for variable pair 1550 (see e.g., FIG. 15). In many embodiments, plotting data 1660 may include multiple data points for each sample that correspond to different variables pairs. In various embodiments, plotting data 1660 may include values for any combination of variables in variable group 1441 (see e.g., FIG. 14B). In one or more embodiments, plotting data 1660 may be utilized to produce one or more visualizations described herein. In several embodiments, data manager 1305 may arrange/format input data into plotting data 1660. In several such embodiments, plot manager 1325 may utilize plotting data 1660 to generate one or more visualizations described herein, such as a heat map or heat map matrix. Embodiments are not limited in this context.

In the illustrated embodiment, plotting data 1660 may include data points 1654-1, 1654-2, 1654-n that correspond, respectively, to samples 1410-1, 1410-2, 1410-n of clustered dataset 1404-1, data points 1656-1, 1656-2, 1656-n that correspond, respectively, to samples 1420-1, 1420-2, 1420-n of clustered dataset 1404-2, and data points 1552-1, 1552-2, 1552-n that correspond, respectively, to samples 1440-1, 1440-2, 1440-n of clustered dataset 1404-n. In several embodiments, each data point in plotting data 1660 may include values for one or more variables in variable group 1441. For instance, each data point in plotting data 1660 may include a value for variable 1442-1 and a value for variable 1442-2 of variable pair 1550. As will be described in more detail below, such as with respect to FIGS. 17A-17D, plotting data 1660 may be utilized to generate one or visualizations described herein.

FIGS. 17A-17D illustrate various aspects of heat map generation in environments 1700A, 1700B, 1700C, 1700D that may be representative of various embodiments. Environment 1700A may illustrate binning parameters, such as bin crossings, for producing a heat map. Environment 1700B may illustrate the binning of data points for producing a heat map according to the binning parameters of environment 1700A. In some embodiments, binning data points may refer to assigning them to the bin crossing that encompasses the value of the data point. Environment 1700C may illustrate determining dominant clustered datasets for bin crossings in a heat map. Environment 1700D may illustrate determining colors and color intensities for bin crossings in a heat map. It will be appreciated that the same or similar procedures described with respect to FIGS. 17A-17D may be utilized in the production of one or more other visualizations described herein. Embodiments are not limited in this context.

Referring to FIG. 17A, binning parameters for a heat map may be determined or identified. In the illustrated embodiment, binning parameters may include one or more of variable range 1762-Y, variable range 1762-X, bin range 1764-X, bin range 1764-Y, bin 1766-X, bin 1766-Y, and bin crossing 1768-1. In some embodiments, variable range 1762-Y may correspond to a range of values for a first variable plotted along the y-axis of a heat map and variable range 1762-X may correspond to a range of values for a second variable plotted along the x-axis of a heat map. In various embodiments, variable range 1762-Y may be subdivided into bins (e.g., bin 1766-Y) of an equal size (e.g., bin range 1764-Y) and variable range 1762-X may be subdivided into bins (e.g., bin 1766-X) of an equal size (e.g., bin range 1764-X). In other embodiments, the size of each bin may be independent of other bins. In many embodiments, a bin crossing (e.g., bin crossing 1768-1) may include where a first bin on the first axis and a second bin on the second axis overlap. Accordingly, the illustrated embodiment of environment 1700A may include a bin crossing set 1767 with 25 bin crossings.

Figure 17B:
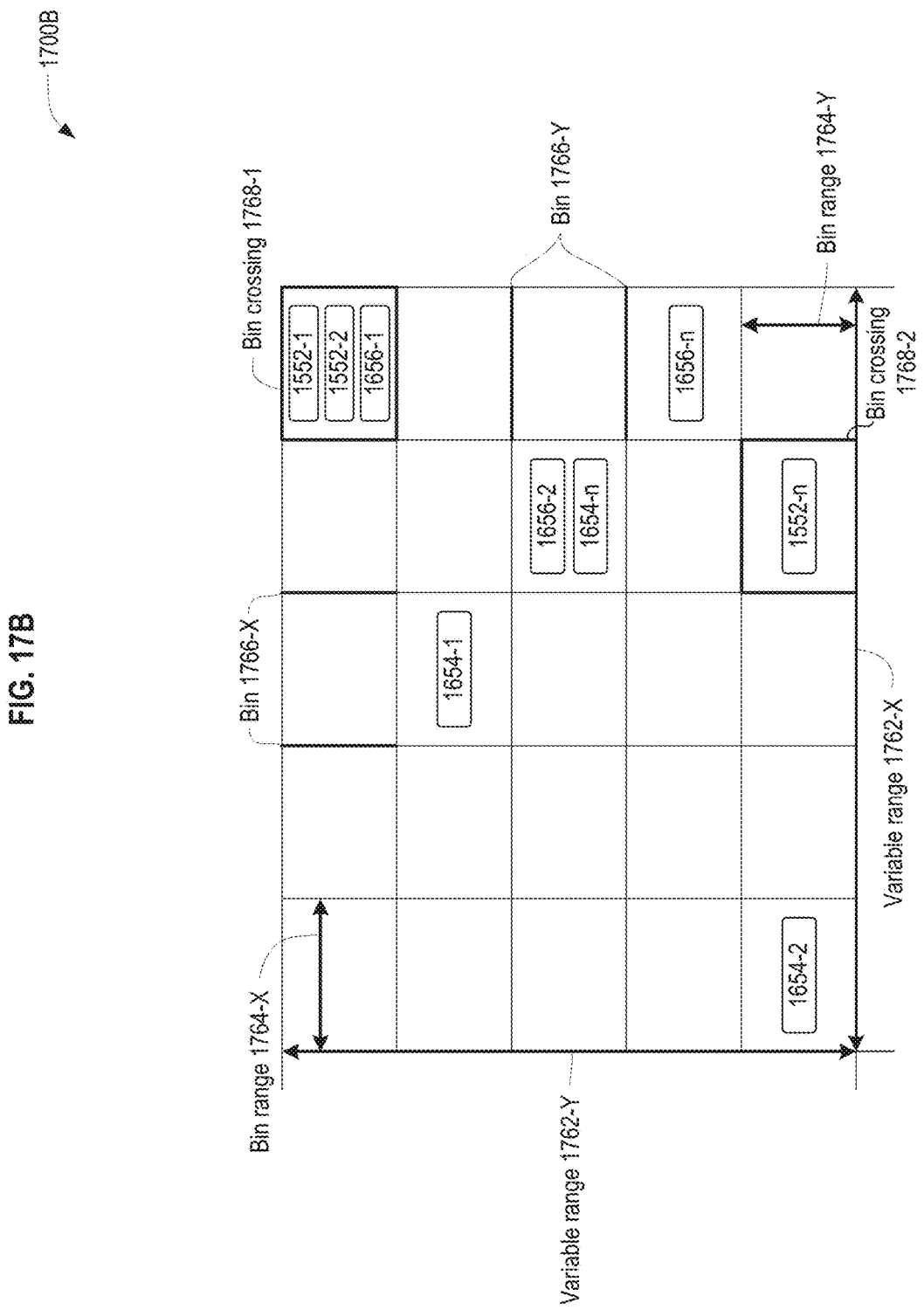

Referring to FIG. 17B, once the appropriate binning parameters have been determined (e.g., the location/size of each bin crossing, data points in plotting data may be binned accordingly. For example, each data point in plotting data may be placed in or associated with the appropriate bin crossing. In the illustrated embodiment of environment 1700B, data points 1552-1, 1552-2, 1552-n, 1654-1, 1654-2, 1654-n, 1656-1, 1656-2, 1656-n may be binned into the appropriate bin crossings. For clarity, only bin crossing 1768-1 with data points 1552-1, 1552-2, 1656-1 and bin crossing 1768-2 with data point 1552-n are explicitly identified in environment 1700B. These bin crossings will be utilized to describe an exemplary process for determining color and color intensity for bin crossings in bin crossing set 1767 with respect to FIGS. 15C and 15D.

Referring to FIG. 17C, once the data points are all binned, a dominant clustered dataset may be determined for each bin crossing in the bin crossing set 1767. As previously mentioned, determination of the dominant clustered dataset is only illustrated for bin crossing 1768-1 and bin crossing 1768-2 of bin crossing set 1767. In various embodiments, the dominant clustered dataset for each bin crossing may correspond to the clustered dataset with the highest number of data points binned in the respective bin crossing. As shown in environment 1700C, bin crossing 1768-1 may include two data points from clustered dataset 1404-1, zero data points from clustered dataset 1404-2, and one data point from clustered dataset 1404-n. Accordingly, clustered dataset 1404-1 may be identified as dominant clustered dataset 1769-1 for bin crossing 1768-1 because it has the highest count of data points binned therein. Similarly, bin crossing 1768-2 may include one data point from clustered dataset 1404-n, zero data points from clustered dataset 1404-2, and zero data points from clustered data set 1404-n. Accordingly, clustered dataset 1404-1 may be identified as dominant clustered dataset 1769-2. It follows, that a clustered dataset from the collection of clustered datasets may be identified as the dominant clustered dataset for each crossing. In many embodiments, the color for each bin crossing in the bin crossing set 1767 may be determined based on the color assigned/associated with the clustered dataset identified as the dominant clustered dataset for the respective bin crossing (see e.g., FIG. 14A).

Figure 17D:
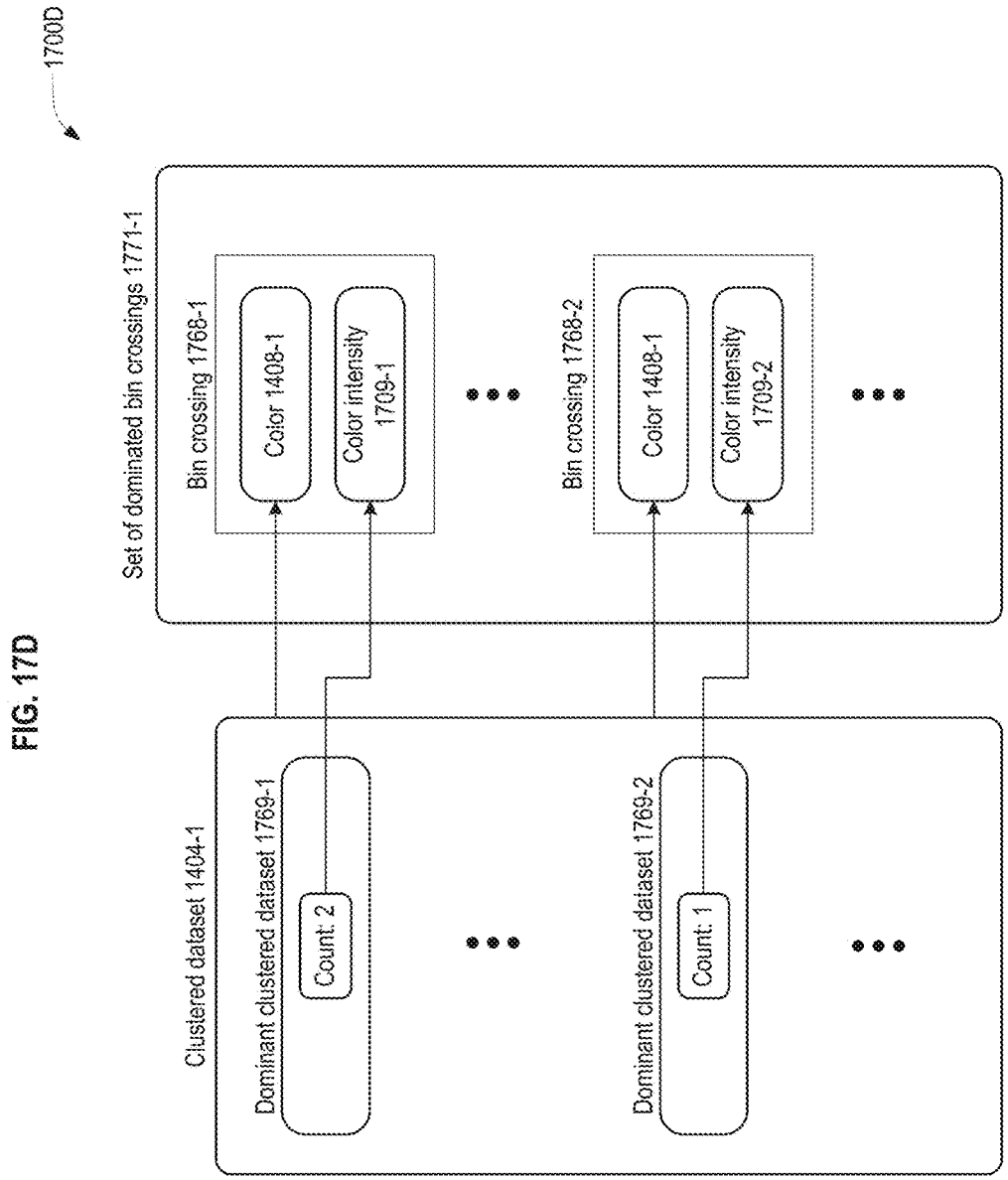

Referring to FIG. 17D, a set of dominated bin crossings may be determined for each clustered dataset. In various embodiments, the set of dominated bin crossings for a respective clustered dataset may include each bin crossing the respective bin crossing was identified as dominant for. In the illustrated embodiment, clustered dataset 1404-1 was identified as dominant clustered dataset 1769-1, which corresponds to bin crossing 1768-1, and clustered dataset 1404-1 was identified as dominant clustered dataset 1769-2, which corresponds to bin crossing 1768-2. Accordingly, the set of dominated bin crossing 1771-1 for clustered dataset 1404-1 may include bin crossing 1768-1 and bin crossing 1768-2. In various embodiments, each bin crossing in a set of dominated bin crossings may be assigned the color associated with the corresponding clustered dataset. Therefore, bin crossing 1768-1 and bin crossing 1768-2 may both be assigned color 1408-1, which is associated with clustered dataset 1404-1 (see e.g., FIG. 14A).

In various embodiments, the color intensity of the color of each bin crossing in a set of dominated bin crossings may be based on a comparison of all the dominant clustered datasets associated with a common clustered dataset. For example, in the illustrated embodiment, bin crossing 1768-1 may be assigned color intensity 1709-1 because dominant clustered dataset 1769-1 is associated with a count of two and bin crossing 1768-1 may be assigned color intensity 1709-2 because dominant clustered dataset 1769-2 is associated with a count of one. In some embodiments, color intensity 1709-1 may be higher on a color gradient or color ramp than color intensity 1709-2 because the count of two associated with color intensity 1709-1 is higher than the count of one associated with color intensity 1709-2. Colors and color ramps/gradients related to color intensities of various bin crossing in a heat map will be described in more detail below, such as with respect to FIG. 18.

Figure 18:
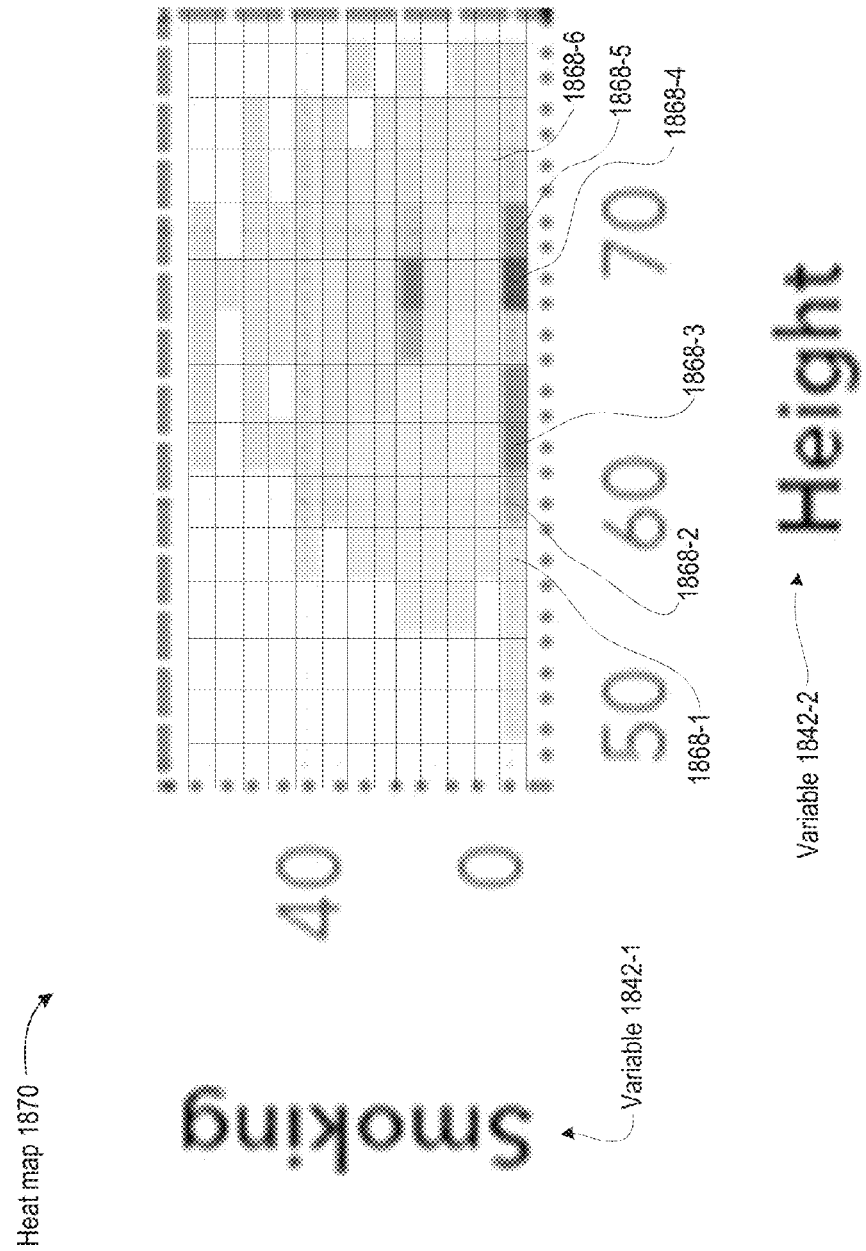
FIG. 18 illustrates various aspects of an exemplary heat map, according to some embodiments of the present disclosure.

FIG. 18 illustrates an exemplary heat map 1870 in environment 1800 that may be representative of various embodiments. In several embodiments, heat map 1870 may enable rapid, simple, and intuitive access to relevant data without obfuscating the visualization, thereby improving the efficient functioning of computers. In environment 1800, heat map 1870 may include variable 1842-1 along the vertical or y-axis and variable 1842-2 along the horizontal or x-axis. In the illustrated embodiment, variable 1842-1, 'Smoking', may relate to a number of daily cigarettes smoked by a person and variable 1842-2, 'Height', may relate to a height of a person. Accordingly, the variable pair represented in heat map 1870 is height and number of daily cigarettes smoked. Each of the bin crossings in heat map 1870 is either not colored, colored based on an orange color ramp/gradient, or colored based on a blue color ramp/gradient. In various embodiments, the uncolored bin crossings may include bin crossings without data points, bin crossings colored based on the orange color ramp may include bin crossings for which a first clustered dataset was determined to be dominant for, and bin crossings colored based on the blue color ramp may include bin crossings for which a second clustered dataset was determined to be dominant for. Embodiments are not limited in this context.

In various embodiments, the dominant clustered dataset for each bin crossing may determine the discrete color to use for the cell. In many embodiments, the count for the dominant group in a respective bin crossing may provide the value, or a scaled value, to use within the color ramp for the respective bin crossing. In one or more embodiments, a color ramp may include a gradient of a single color. For example, the Hue-Saturation-Luminosity (HSL) color model may be used in some implementations of a color ramp. In such examples, the group (or clustered dataset) color may correspond to hue while the luminosity may be the value associated with color intensity. Accordingly, the hue may stay constant throughout a color ramp while the luminosity changes along the color ramp. In some embodiments, different colors may refer to different color hues. In many embodiments described herein, the use of a common color for a clustered dataset and adjusting the intensity of the common color among different dominant bin crossings of the clustered dataset can enable patterns and relationships among or within a collection of clustered datasets to be identified.

In environment 1800, heatmap 1870 includes six bin crossings that are explicitly labeled to provide further explanation and illustration of colors and color ramps utilized in one or more visualizations described herein. In the illustrated embodiment, bin crossings 1868-1, 1868-2, 1868-3 are colored based on the orange color ramp and correspond to a first clustered dataset and bin crossings 1868-4, 1868-5, 1868-6 are colored based on the blue color ramp and correspond to a second clustered dataset. In various embodiments of heat map 1870, the first clustered dataset was previously identified as the dominant clustered dataset for each of bin crossings 1868-1, 1868-2, 1868-3 and the second clustered dataset was previously identified as the dominant clustered dataset for each of bin crossings 1868-4, 1868-5, 1868-6 (see e.g., FIG. 17C). In various such embodiments, bin crossing 1868-3 was assigned a high color intensity, bin crossing 1868-2 was assigned a middle color intensity, and bin crossing 1868-3 was assigned the low color intensity based on a comparison of all the underlying values (e.g., plotting data) for bin crossings that the first clustered dataset was identified as dominant for. For example, bin crossing 1868-3 may include a count of ten data points from the first clustered dataset, bin crossing 1868-2 may include a count of six data points from the first clustered dataset, and bin crossing 1868-1 may include a count of three data points from the first clustered dataset. Therefore, in such examples, bin crossing 1868-3 was assigned a color intensity higher than bin crossing 1868-1 and bin crossing 1868-2, bin crossing 1868-2 was assigned a color intensity between bin crossing 1868-1 and bin crossing 1868-3, and bin crossing 1868-1 was assigned a color intensity below bin crossing 1868-2 and bin crossing 1868-3.

As previously mentioned, in many embodiments of heat map 1870, the second clustered dataset was previously identified as the dominant clustered dataset for each of bin crossings 1868-4, 1868-5, 1868-6. In many such embodiments, bin crossing 1868-4 was assigned a high color intensity, bin crossing 1868-5 was assigned a middle color intensity, and bin crossing 1868-6 was assigned a low color intensity based on a comparison of all the underlying values for bin crossings that the first clustered dataset was identified as dominant for. For example, bin crossing 1868-4 may include a count of twelve data points from the second clustered dataset, bin crossing 1868-5 may include a count of nine data points from the second clustered dataset, and bin crossing 1868-6 may include a count of two data points from the second clustered dataset. Therefore, in such examples, bin crossing 1868-4 was assigned a color intensity higher than bin crossing 1868-5 and bin crossing 1868-6, bin crossing 1868-5 was assigned a color intensity between bin crossing 1868-4 and bin crossing 1868-6, and bin crossing 1868-6 was assigned a color intensity below bin crossing 1868-5 and bin crossing 1868-4. In various embodiments, visualizations, such as heat map 1870, may enable patterns or correlations between variables in a variable group and/or clustered datasets in a collection to be identified.

FIGS. 19A-19C illustrate various aspects of heat map matrices 1975A, 1975B, 1975C in environments 1900A, 1900B, 1900C that may be representative of various embodiments. In environment 1900A, a heat map matrix 1975A with data from a collection of two clustered datasets is illustrated. In environment 1900B, a heat map matrix 1975B with data from a collection of three clustered datasets is illustrated. In environment 1900C, a heat map matrix 1975C with data from a collection of five clustered dataset is illustrated. Each of the heat map matrices 1975A, 1975B, 1975C may include first, second, and third heat maps and all of the data represented may have underlying continuous or numerical values. The first heat map may correspond to the variable pair of weight and height, the second heat map may correspond to the variable pair of smoking (e.g., number of daily cigarettes) and height, and the third heat map may correspond to the variable pair of smoking (e.g., number of daily cigarettes). In many embodiments, a heat map matrix may include a heat map for every potential variable pair in a group of variables. In many such embodiments, this may enable patterns or correlations between variables in a variable group and/or clustered datasets in a collection to be identified. Embodiments are not limited in this context.

Figure 20A:
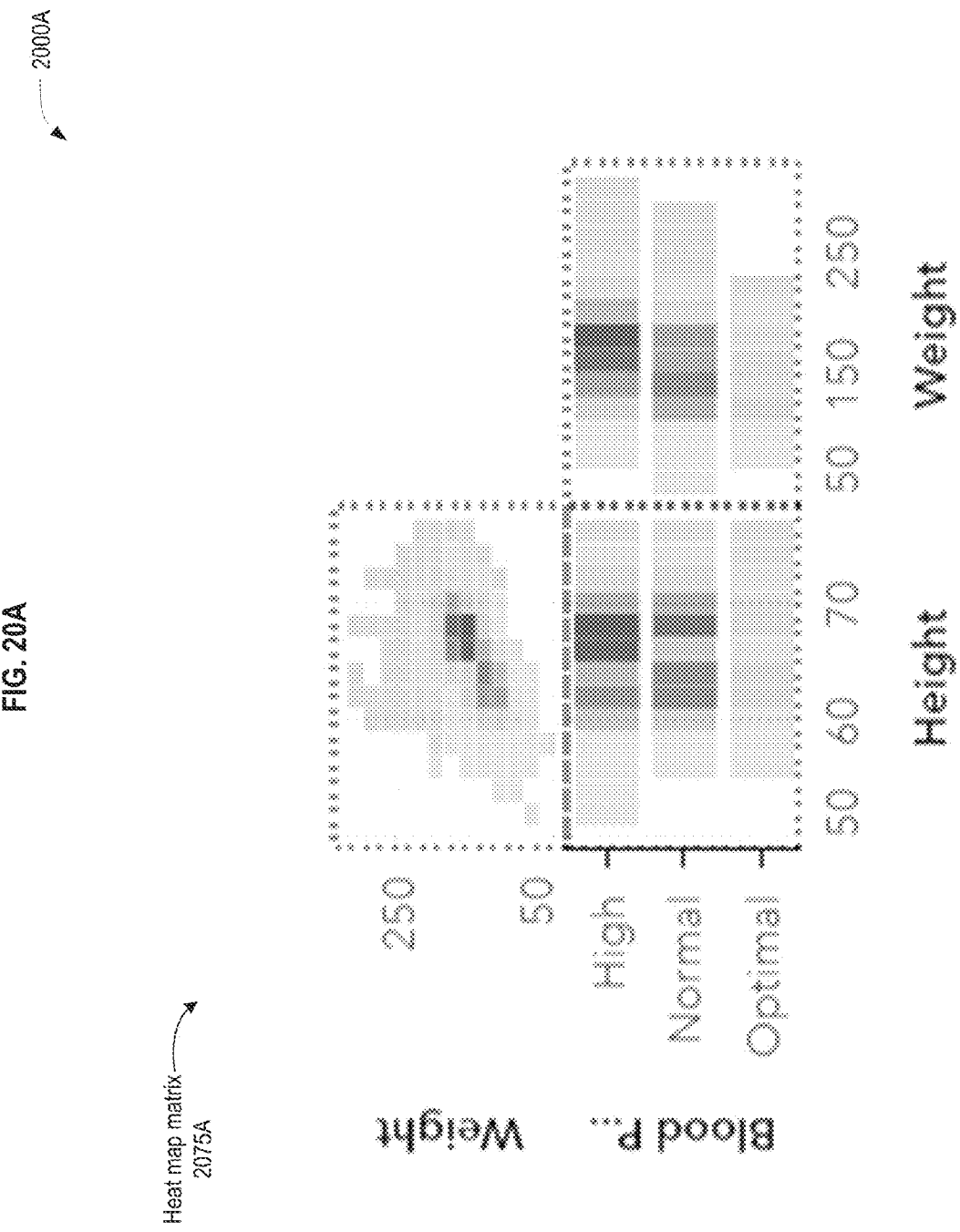
FIGS. 20A-20C illustrate various aspects of exemplary heat map matrices, according to some embodiments of the present disclosure.
Figure 20B:
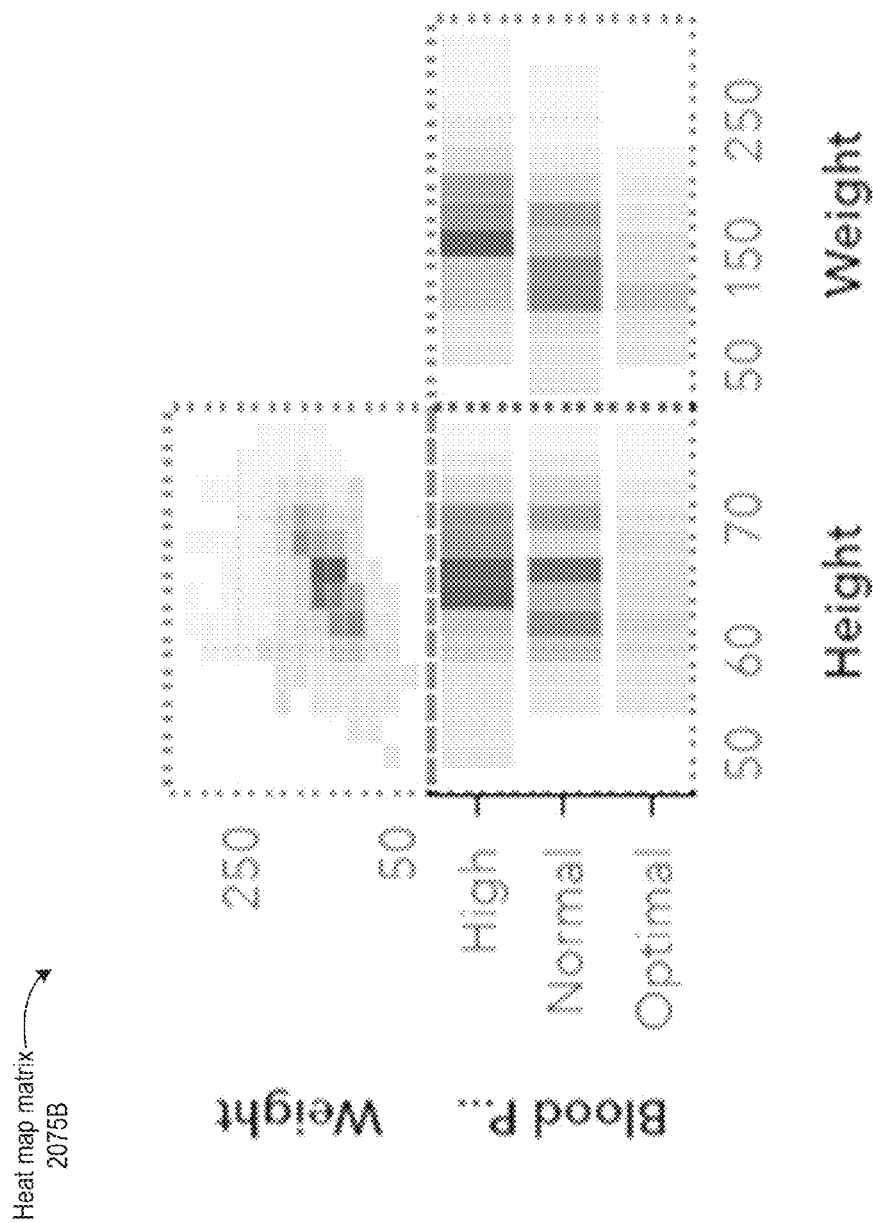
Figure 20C:
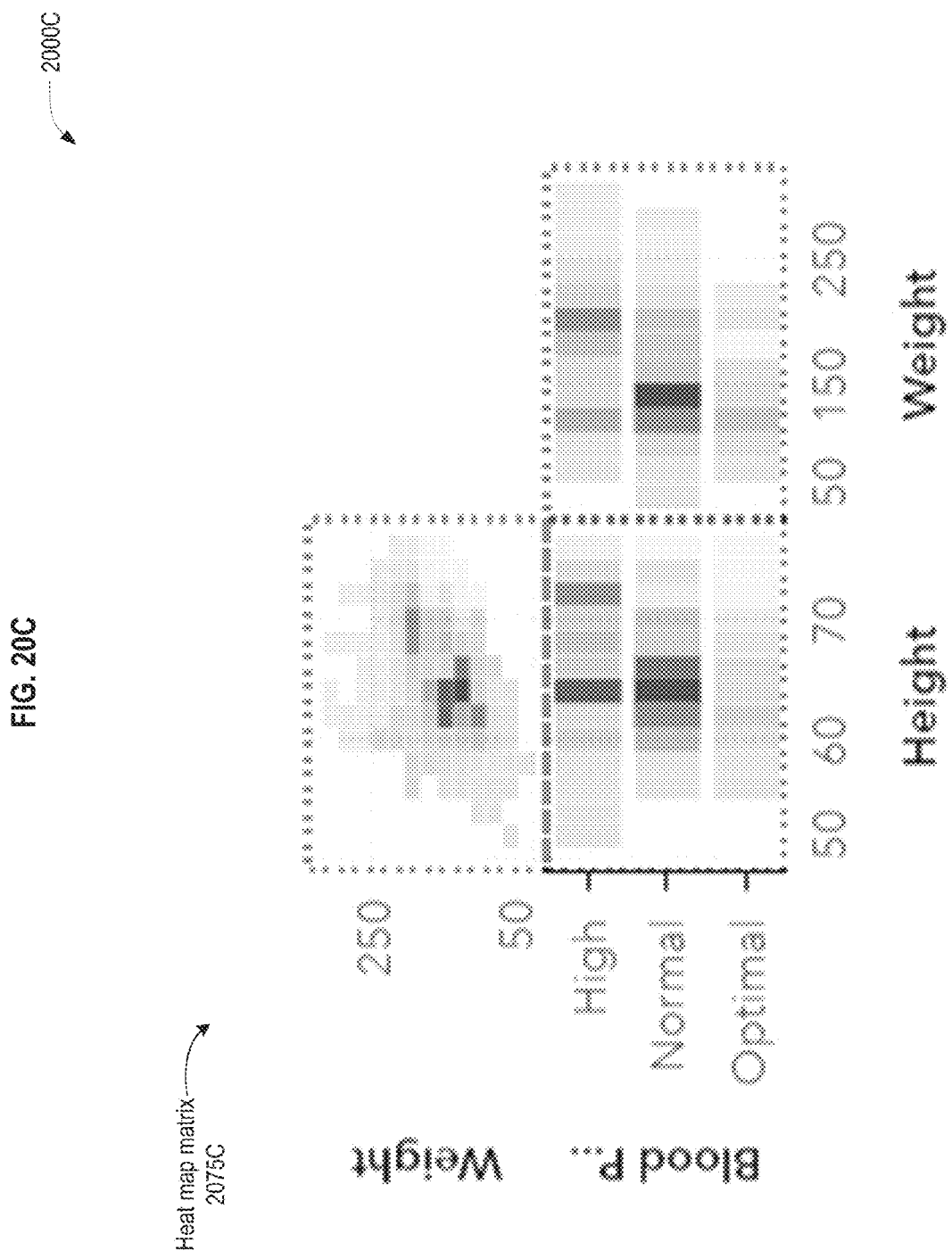

FIGS. 20A-20C illustrate various aspects of heat map matrices 2075A, 2075B, 2075C in environments 2000A, 2000B, 2000C that may be representative of various embodiments. In environment 2000A, a heat map matrix 2075A with data from a collection of two clustered datasets is illustrated. In environment 2000B, a heat map matrix 2075B with data from a collection of three clustered datasets is illustrated. In environment 2000C, a heat map matrix 2075C with data from a collection of five clustered dataset is illustrated. Each of the heat map matrices 2075A, 2075B, 2075C may include first, second, and third heat maps and the data represented may have an underlying mix of discrete or non-numerical and continuous or numerical values. The first heat map may correspond to the variable pair of weight and height, the second heat map may correspond to the variable pair of blood pressure and height, and the third heat map may correspond to the variable pair of blood pressure and weight. In these embodiments, blood pressure may represent a variable with discrete or non-numerical values. In the illustrated embodiments, blood pressure may be represented as either high, normal, or optimal. In several embodiments, a heat map matrix may include a heat map for every potential variable pair in a group of variables. In several such embodiments, this may enable patterns or correlations between variables in a variable group and/or clustered datasets in a collection to be identified. Embodiments are not limited in this context.

Figure 21A:
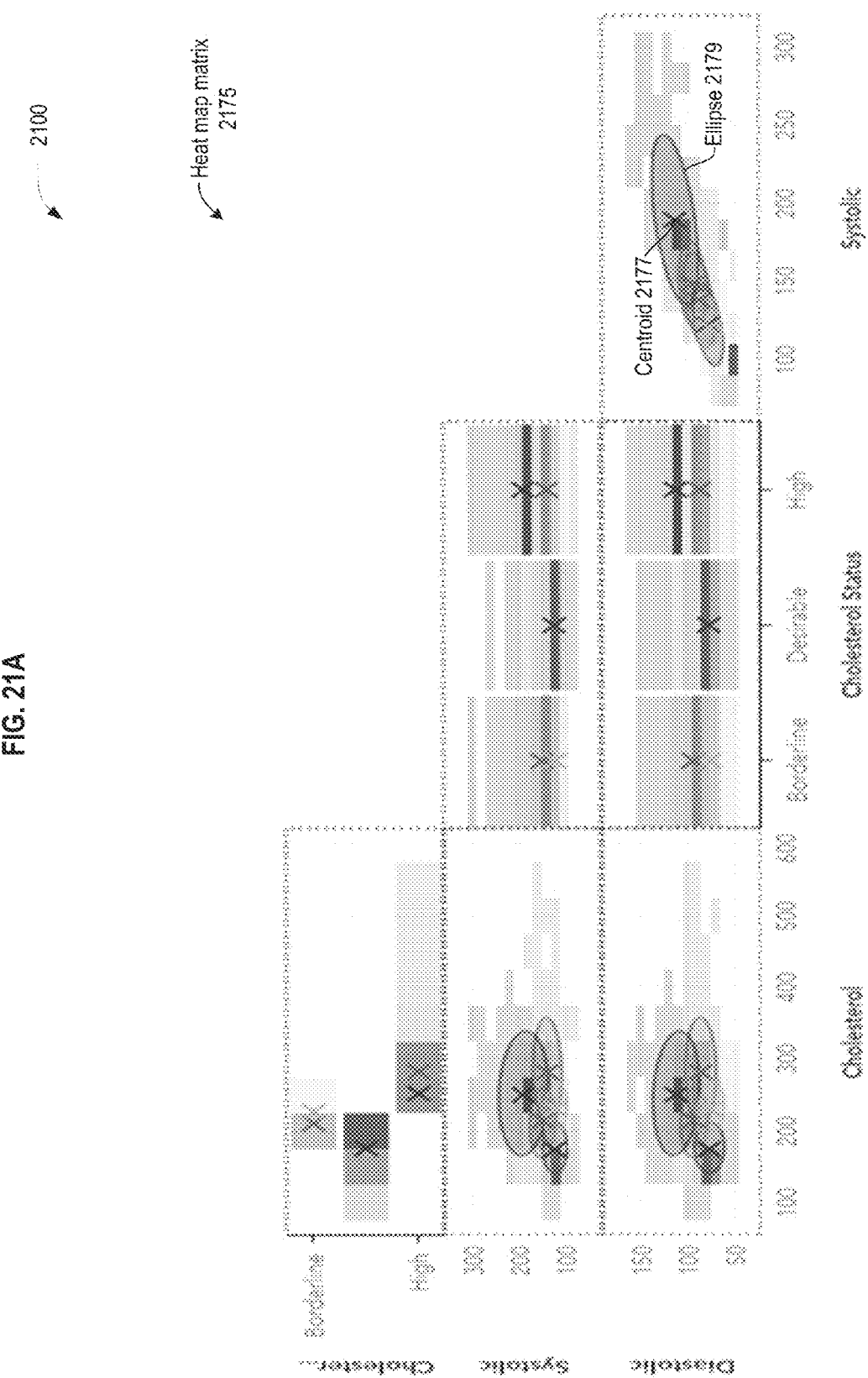
FIGS. 21A and 21B illustrate an exemplary heat map matrix in conjunction with a parallel coordinates plot, according to some embodiments of the present disclosure.
Figure 21B:
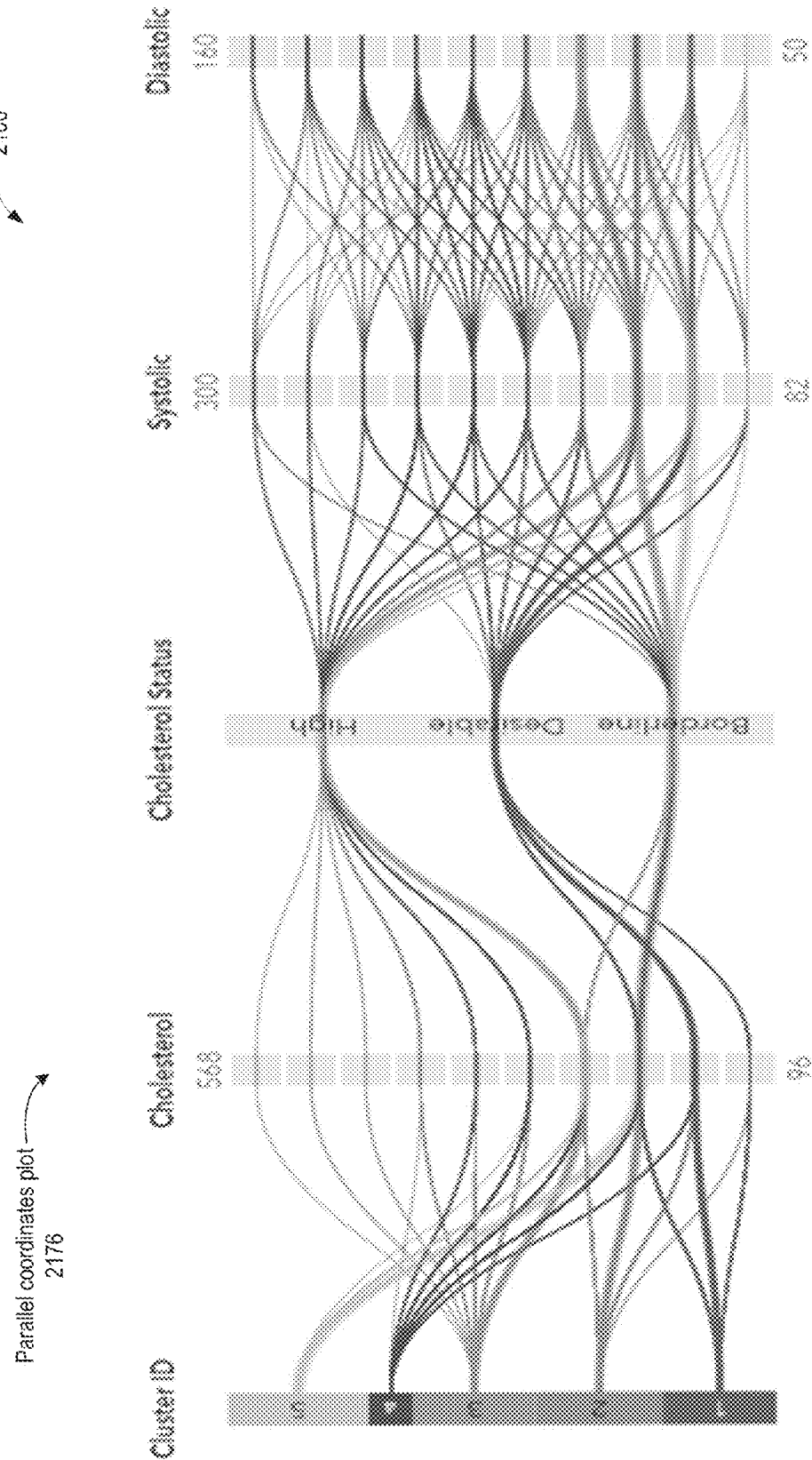

FIGS. 21A and 21B illustrate a heat map matrix 2175 in conjunction with a parallel coordinates plot 2176 in environment 2100 that may be representative of various embodiments. In one or more embodiments, environment 2100 may include a combined view of heat map matrix 2175 and parallel coordinates plot 2176. In some embodiments, environment 2100 may represent a UI view. In many embodiments described herein, presenting a visualization, such as shown in environment 2100, may enable patterns or correlations between variables in a variable group and/or clustered datasets in a collection to be identified. In one or more embodiments, environment 2100 may include a visualization of a collection of five clustered datasets with a variable group that includes cholesterol, cholesterol status, systolic blood pressure, and diastolic blood pressure. Embodiments are not limited in this context.

In various embodiments, heat map matrix 2175 may include six heat maps with each of the six heat maps relating to a unique variable pair from the variable group. For example, in the illustrated embodiment, a first heat map may correspond to cholesterol versus cholesterol status, a second heat map may correspond to systolic blood pressure versus cholesterol, a third heat map may correspond to diastolic blood pressure versus cholesterol, a fourth heat map may correspond to systolic blood pressure versus cholesterol status, a fifth heat map may correspond to diastolic blood pressure versus cholesterol status, and a six heat map may correspond to diastolic blood pressure versus systolic blood pressure. In heat map matrix 2175, centroids (e.g., centroid 2177) and ellipses (e.g., ellipse 2179) may be illustrated for each clustered dataset in a collection. In one or more embodiments, centroids and ellipses may facilitate illustrating concentrations and/or distributions in data. In several embodiments, the color of the centroid and/or ellipse may correspond to the color assigned to the associated clustered dataset. In various embodiments, including centroids and/or ellipses in visualizations may facilitate determining patterns and correlations.

In some embodiments, parallel coordinates plot may include a set of one or more lines associated with each clustered dataset. In many embodiments, each line may correspond to an instance that is observed. For example, each line in parallel coordinates plot 2176 may refer to a person for which observations regarding their cholesterol, cholesterol status, systolic blood pressure, and diastolic blood pressure were made. In such an example, each line in parallel coordinates plot 2176 may pass through the values observed with respect to the person that the line corresponds to.

Figure 22:
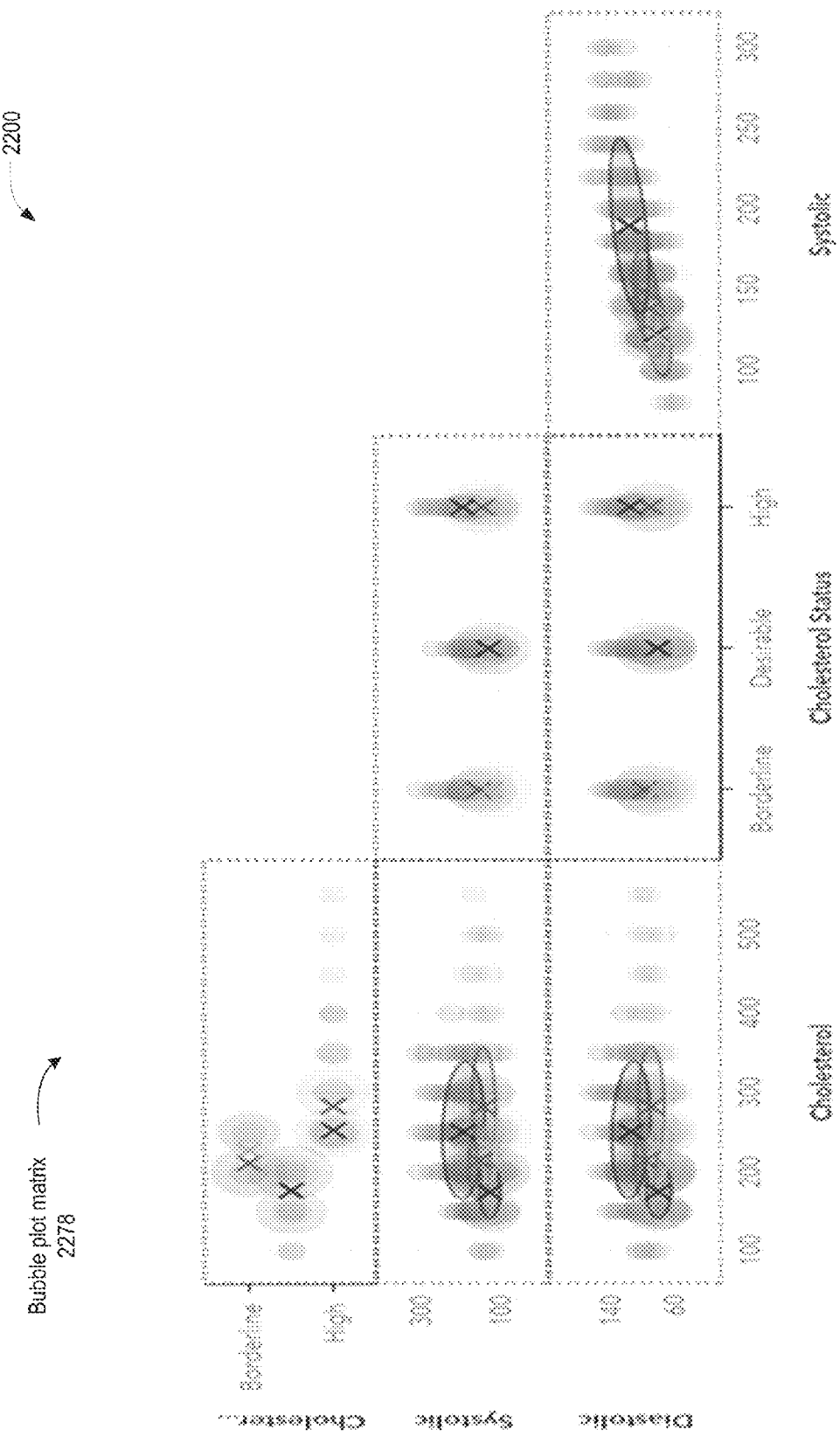
FIG. 22 illustrates various aspects of an exemplary bubble plot matrix, according to some embodiments of the present disclosure.

FIG. 22 illustrates an exemplary bubble plot matrix 2278 in environment 2200 that may be representative of various embodiments. In various embodiments, a bubble plot matrix may include an alternative visualization to a heat map matrix. For example, in one or more embodiments, bubble plot matrix 2278 and heat map matrix 2175 may be generated based on the same underlying data (e.g., plotting data). In some embodiments, the bubble plot matrix 2278 may use overlaid bubbles for different clustered datasets. In many embodiments, the color of a bubble may indicate the group or clustered dataset that the bubble represents, and the size of the bubble may provide an indication of the concentration. In several embodiments, the size of a bubble may be an analog to color intensity described with respect to heat maps. In one or more embodiments, bubble plot matrix 2278 may include centroids and/or ellipses that are the same or similar to the centroids and/or ellipses of heat map matrix 2175 in FIG. 21A. Embodiments are not limited in this context.

Figure 23:
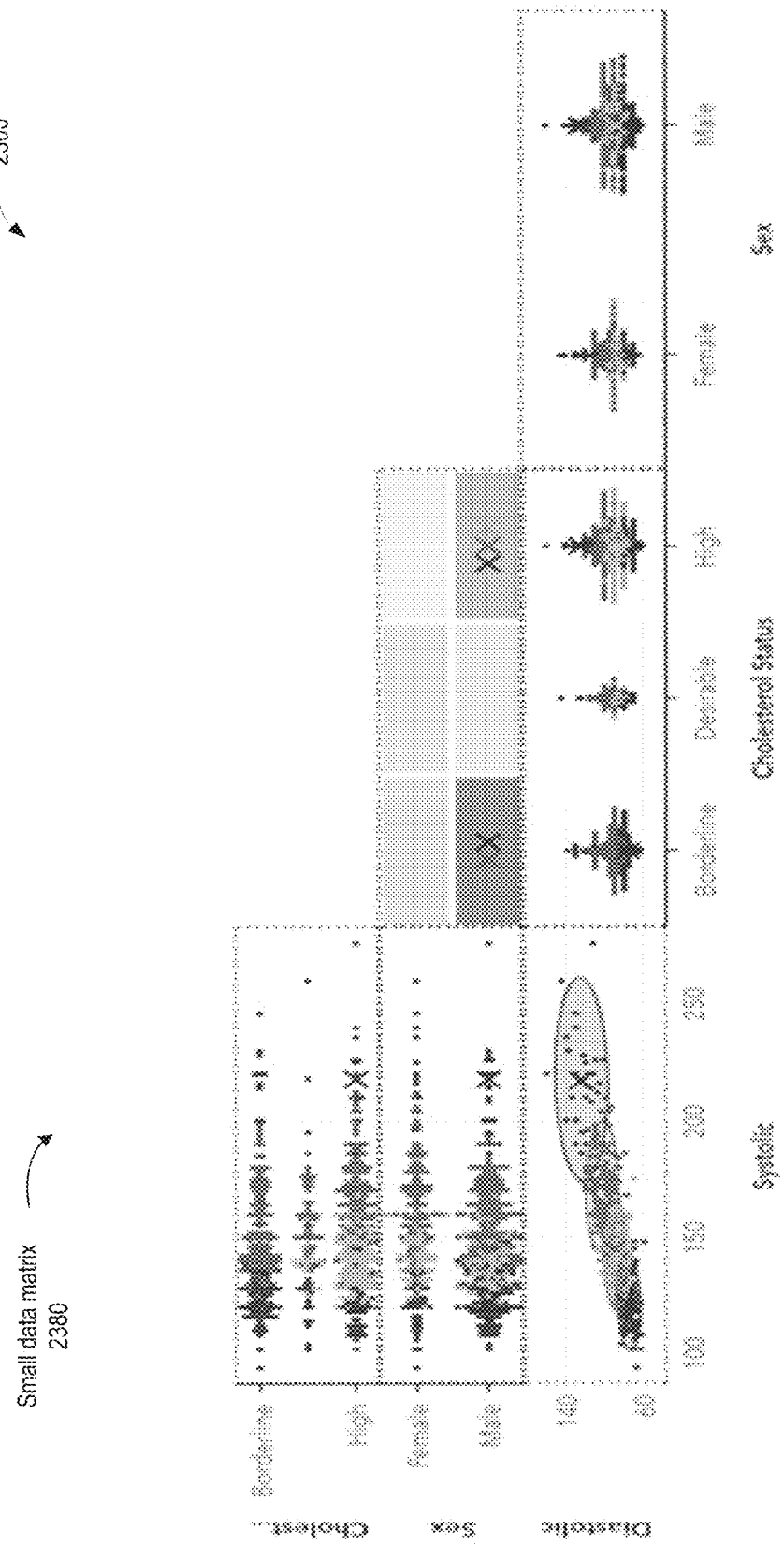
FIG. 23 illustrates various aspects of an exemplary small data matrix, according to some embodiments of the present disclosure.

FIG. 23 illustrates an exemplary small data matrix 2380 in environment 2300 that may be representative of various embodiments. In one or more embodiments, small data matrix 2380 may be used to represent plotting data that does not include a threshold number of data points or samples. In one or more such embodiments, the threshold number may be user defined. For instance, if plotting data include data points that correspond to 5000 or fewer instances, the format of small data matrix 2380 may be utilized. In many embodiments, small data matrix 2380 may use a scatter plot to draw every data point when the observations result in numeric data (see e.g., diastolic versus systolic in small data matrix 2380). In embodiments for which the observations of one of the variables in the variable pair results in non-numeric data, a visual representation for each data point may still be used, however jittering may also be used as an indication of concentration and/or distribution (see e.g., sex versus diastolic in small data matrix 2380). In embodiments for which the observations of both of the variables in a variable pair result in non-numeric data, color ramps may be used (see e.g., sex versus cholesterol status in small data matrix 2380). Additionally, centroids and/or ellipses may be used in small data matrix 2380.

Figure 24A:
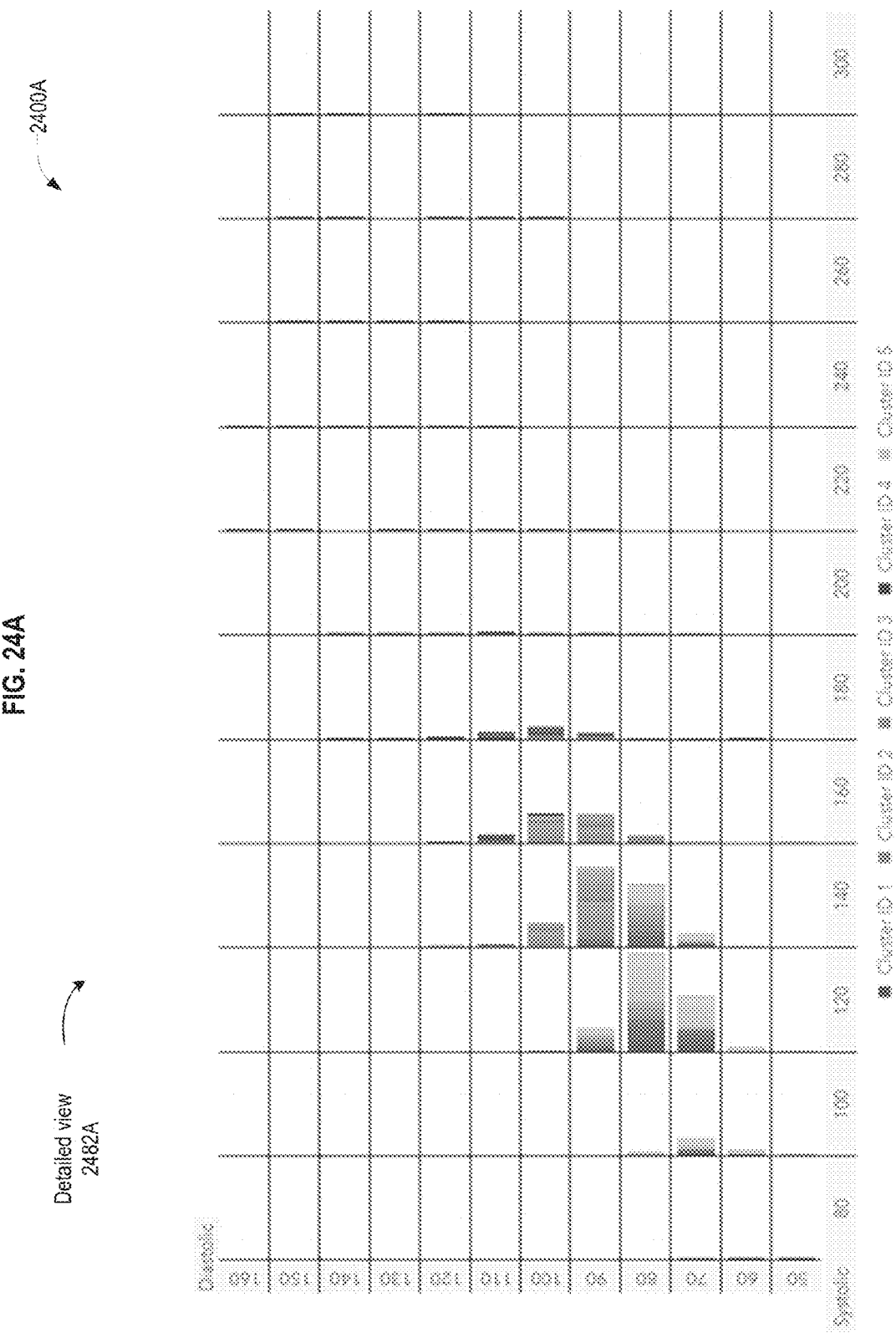
FIGS. 24A and 24B illustrate various aspects of exemplary detailed views, according to some embodiments of the present disclosure.
Figure 24B:
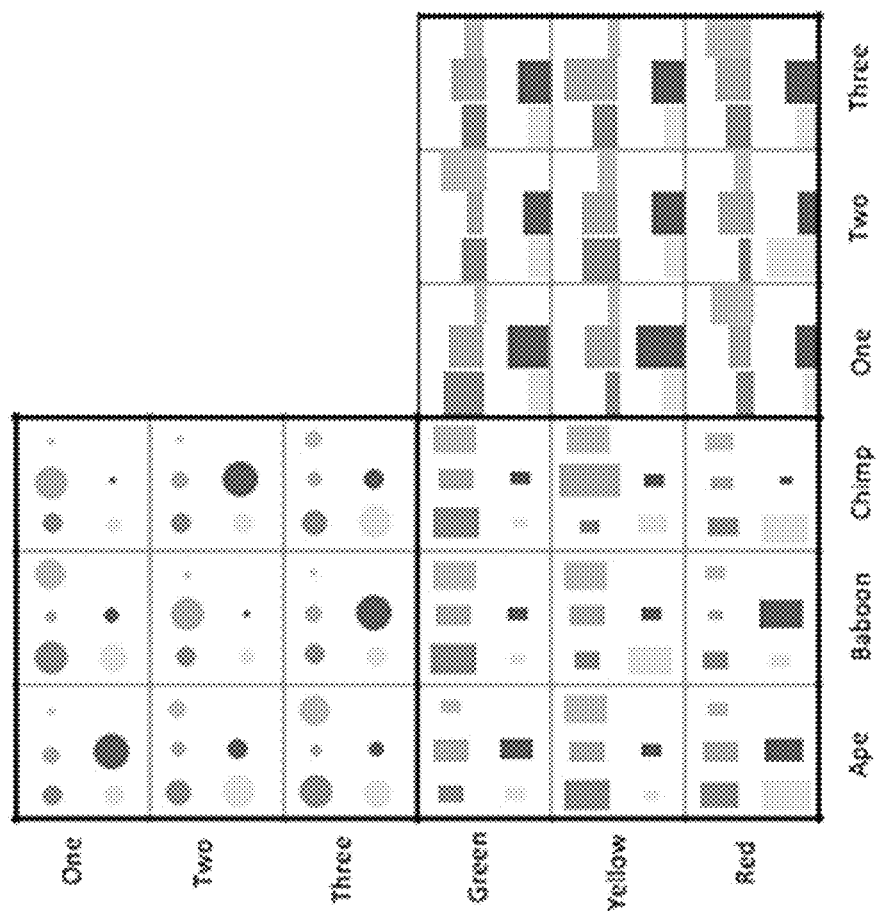

FIGS. 24A and 24B illustrate various aspects of exemplary detailed views 2482A, 2482B in environments 2400A, 2400B that may be representative of various embodiments. In one or more embodiments, a detailed view may be generated in response to a selection of a specific bin crossing or cell in another visualization. In the illustrated embodiments, detailed view 2482A may include a stacked bar chart and detailed view 2482B may include an alternative to the stack bar chart of detailed view 2482A. In many embodiments, detailed views may provide information hidden in other views. For example, in detailed view 2482A, visual indications for every clustered dataset may be provided in each cell instead of only providing a visual indication for a dominant clustered dataset in each cell. In several embodiments, detailed views may enable rapid, simple, and intuitive access to data that could not be displayed for the entire visualization without obfuscating the visualization, thereby improving the efficient functioning of computers. In some embodiments, detailed views 2482A, 2482B may enable a user to determine how dominant a clustered dataset is for a specific bin crossing (or concentrations of other clustered datasets in the specific bin crossing). In various embodiments, the detailed view may enable a user to readily access potentially valuable details that are summarized or not represented in another visualization, such as a heat map matrix. In some embodiments, a detailed view may be shown directly for each matrix cell when possible (see e.g., FIG. 24B). Embodiments are not limited in this context.

FIG. 25 illustrates various aspects of a tooltip view 2586 in environment 2500 that may be representative of various embodiments. In many embodiments, tooltip view 2586 may provide numerical data that corresponds to an identified portion of a visualization (e.g., a bin crossing). For example, when a mouse cursor hovers over a place on the visualization, tooltip view 2586 may appear. In one or more embodiments described herein, tooltip view 2586 may provide underlying information that is hidden in a visualization. In some embodiments, the data provided in the tooltip view 2586 may be customizable, such as via a UI. Embodiments are not limited in this context.

In several embodiments, tooltip view 2586 may enable rapid, simple, and intuitive access to data that could not be displayed for the entire visualization without obfuscating the visualization, thereby improving the efficient functioning of computers. In many embodiments, the tooltip view 2586 may provide one or more of numerical representations of plotting data and/or statistical values determined from plotting data. In the illustrated embodiment, tooltip view 2586 may provide average values for an identified bin crossing, the dominant clustered dataset for the identified bin crossing, and counts for each clustered dataset with data points in the identified bin crossing. Accordingly, the average value for cholesterol within the identified bin crossing is 250, the average value for diastolic blood pressure within the identified bin crossing is 80, the dominant clustered dataset for the identified bin crossing is clustered dataset number 5, the count of data points within the identified bin crossing for clustered dataset number 2 is 26, the count of data points within the identified bin crossing for clustered dataset number 3 is 201, and the count of data points within the identified bin crossing for clustered dataset number 5 is 331. In some embodiments, tooltip view 2586 may present one or more binning parameters. For instance, tooltip view 2586 may present a horizontal and/or vertical range for an identified bin crossing.

FIG. 26 illustrates exemplary menu options 2684 in environment 2600 that may be representative of various embodiments. In one or more embodiments, menu options 2684 may enable a user to customize one or more aspects of visualizations and/or the UI used to view and interact with the visualizations. For example, menu options 2684 may enable a user to select the color to assign to each clustered dataset. In another example, menu options 2684 may enable a user to define bin crossings. In many embodiments, menu options 2684 may enable rapid, simple, and intuitive access to one or more commands, settings, or visualizations, such as those described herein, thereby improving the efficient functioning of computers. As shown in the illustrated embodiment, menu options 2684 may enable selection between different visualizations, such as a clustered heat map, a heat map, and a bubble plot. Further, menu options 2684 may enable isolation of various aspects of a visualization, such as a variable pair or a heat map from a heat map matrix. Embodiments are not limited in this context.

Figure 27A:
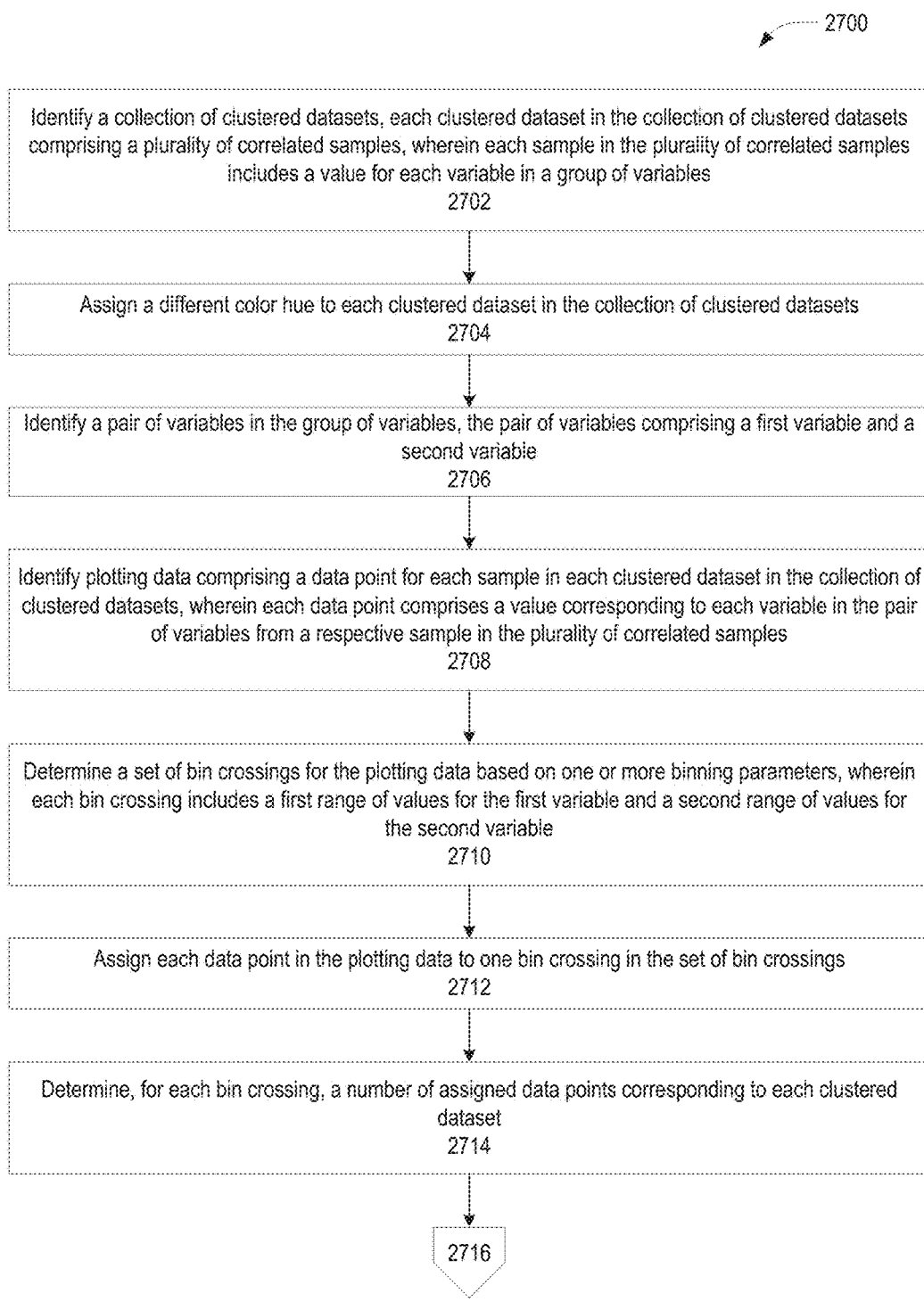

FIGS. 27A and 27B illustrate an embodiment of a logic flow 2700. The logic flow 2700 may be representative of some or all of the operations executed by one or more embodiments described herein. More specifically, the logic flow 2700 may illustrate operations performed by processing or logic circuitry used to implement one or more components and/or functionalities described herein, such as clustered data visualizer 1301. In one or more embodiments, these operations may be performed in conjunction with generating and/or manipulating one or more visualizations described herein. Embodiments are not limited in this context.

In the illustrated embodiment shown in FIG. 27, the logic flow 2700 may begin at block 2702. At block 2702, "identify a collection of clustered datasets, each clustered dataset in the collection of clustered datasets comprising a plurality of correlated samples, wherein each sample in the plurality of correlated samples includes a value for each variable in a group of variables" a collection of clustered datasets, each comprising a plurality of correlated samples with a value for each variable in a group of variables may be identified. For example, data manager 1305 may identify clustered dataset collection 1402. In some such examples, data manager 1305 may identify the clustered dataset collection 1402 based on input received via interface manager 1315. Continuing to block 2704 "assign a different color hue to each clustered dataset in the collection of clustered datasets" a different color hue may be assigned to each clustered dataset in the collection of clustered datasets. In various embodiments, data manager 1305 or plot manager 1325 may assign color 1408-1 to clustered dataset 1404-1, color 1408-2 to clustered dataset 1404-2, and color 1408-$n$ to clustered dataset 1404-$n$. In various such embodiments, data manager 1305 may assign the different color hues based on input received via interface manager 1315.

Proceeding to block 2706 "identify a pair of variables in the group of variables, the pair of variables comprising a first variable and a second variable" a pair of variables comprising a first and second variable may be identified in the group of variables. In some embodiments, variable pair 1550 including variable 1442-1, 1442-2 may be identified from variable group 1441, such as by interface manager 1315. At block 2708 "identify plotting data comprising a data point for each sample in each clustered dataset in the collection of clustered datasets, wherein each data point comprises a value corresponding to each variable in the pair of variables from a respective sample in the plurality of correlated samples" plotting data including a data point for each sample for each clustered dataset in the collection may be identified. In various embodiments, plotting data 1660 may be identified, such as by plotting manager 1325.

Continuing to block 2710 "determine a set of bin crossings for the plotting data based on one or more binning parameters, wherein each bin crossing includes a first range of values for the first variable and a second range of values for the second variable" a set of bin crossing for the plotting data may be determined based on one or more binning parameters. For instance, bin crossing 1768-1 may be identified based on one or more binning parameters. Proceeding to block 2712 "assign each data point in the plotting data to one bin crossing in the set of bin crossings" each data point in the plotting data may be assigned to one bin crossing in the set of bin crossings. In some embodiments, plot manager 1325 may assign each data point to a bin crossing. For example, data points 1552-1, 1552-2, 1656-1 may be assigned to bin crossing 1768-1.

At block 2714 "determine, for each bin crossing, a number of assigned data points corresponding to each clustered dataset" a number of assigned data points corresponding to each clustered dataset may be determined for each bin crossing. For instance, bin crossing 1768-1 may be determined to include a count of two for clustered dataset 1404-1, a count of one for clustered dataset 1404-$n$, and a count of zero for clustered dataset 1404-2. At block 2716, the logic flow 2700 may proceed to block 2718. At block 2718, "identify a dominant clustered dataset from the collection of clustered datasets for each bin crossing in the set of bin crossings, the dominant clustered dataset for a bin crossing comprising a clustered dataset in the collection of clustered datasets with a highest number of assigned data points in the bin crossing" a dominant clustered dataset may be identified for each bin crossing in the set of bin crossings. For example, clustered dataset 1404-1 may be identified as dominant clustered dataset 1769-1 for bin crossing 1768-1.

Continuing to block 2720 "assign a color hue to each bin crossing in the set of bin crossings based on the color hue assigned to the clustered dataset identified as the dominant clustered dataset for each bin crossing" a color hue may be assigned to each bin crossing in the set of bin crossings based on the color hue assigned to the clustered dataset identified as dominant. For instance, bin crossing 1768-1 may be assigned color 1408-1 because clustered dataset 1404-1 was identified as the dominant clustered dataset for bin crossing 1768-1. Proceeding to block 2722 "determine a set of dominated bin crossings for each clustered dataset, the set of dominated bin crossings for a respective clustered dataset comprising each bin crossing in the set of bin crossings that the respective clustered dataset is identified as the dominant clustered dataset for" a set of dominated bin crossings for each clustered dataset may be identified. For instance, set of dominated bin crossings 1771-1 may be identified for clustered dataset 1404-1.

At block 2724 "compare each number of assigned data points for each bin crossing in each set of dominated bin crossings to determine a scheme of color intensities to apply to each set of dominated bin crossings" the number of assigned data points for each bin crossing in each set of dominated bin crossings may be compared to determine a scheme of color intensities to apply to each set of dominated bin crossings. For example, a scheme of color intensities to apply to the set of dominated bin crossings 1771-1 for clustered dataset 1404-1 may be determined based on a comparison of the counts for dominant clustered datasets 1769-1, 1769-2. Continuing to block 2726 "assign a color intensity to each bin crossing in the set of bin crossings based on the scheme of color intensities determined for each set of dominated bin crossings" a color intensity may be assigned to each bin crossing in the set of bin crossings based on the scheme of color intensities determined for each set of dominated bin crossings. For instance, color intensity 1709-1 may be assigned to bin crossing 1768-1 and color intensity 1709-2 may be assigned to bin crossing 1768-2.

Continuing to block 2728 "generate a heat map comprising each bin crossing in the set of bin crossings, wherein each bin crossing in the set of bin crossings is colored based on the color and the color intensity assigned to each bin crossing in the set of bin crossings" a heat map comprising each bin crossing in the set of bin crossings colored based on the color hue and color intensities assigned to each bin crossing in the set of bin crossings. For example, heat map 1870 may be generated. Proceeding to block 2730 "present the heat map via a user interface (UI)" the heat map may be presented via a UI. For instance, heat map 1870 may be presented by interface manager 1315 via graphical UI.

In various embodiments, one or more functionalities or components described herein may be implemented, although not necessarily explicitly shown, with processing circuitry, logic circuitry, or other processors which may include any of a wide variety of commercially available processors. Further, one or more of these processors may include multiple processors, a multi-threaded processor, a multi-core processor (whether the multiple cores coexist on the same or separate dies), and/or a multi-processor architecture of some other variety by which multiple physically separate processors are linked.

However, in a specific embodiment, one or more of the processing circuitry and logic circuitry may be selected to efficiently implement one or more techniques or features described herein. Alternatively, or additionally, the processors of one or more node devices may be selected to efficiently perform one or more operations described herein. In some embodiments, one or more operations described herein may be performed at least partially in parallel. By way of example, one or more of processing circuitries, logic circuitries, and other processors may incorporate a single-instruction multiple-data (SIMD) architecture, may incorporate multiple processing pipelines, and/or may incorporate the ability to support multiple simultaneous threads of execution per processing pipeline.

In various embodiments, one or more portions of the processing or logic flows described herein, including the components of which each is composed, may be selected to be operative on whatever type of processor or processors that are selected to implement one or more components, techniques, or embodiments described herein. In various embodiments, each of these one or more portions of the processing or logic flows described herein may include one or more of an operating system, device drivers and/or application-level routines (e.g., so-called "software suites" provided on disc media, "applets" obtained from a remote server, etc.). Where an operating system is included, the operating system may be any of a variety of available operating systems appropriate for one or more processing circuitry, logic circuitry, or other processors utilized. Where one or more device drivers are included, those device drivers may provide support for any of a variety of other components, whether hardware or software components, described herein.

In various embodiments, each of the computer-readable storages or memory required (although not necessarily explicitly shown) for processing circuitry, logic circuitry, or other processors to implement functionalities described herein may be based on any of a wide variety of information storage technologies, including volatile technologies requiring the uninterrupted provision of electric power, and/or including technologies entailing the use of machine-readable storage media that may or may not be removable. In many embodiments, these storages may include one or more non-transitory computer-readable mediums. Thus, each of these storages may include any of a wide variety of types (or combination of types) of storage device, including without limitation, read-only memory (ROM), random-access memory (RAM), dynamic RAM (DRAM), Double-Data-Rate DRAM (DDR-DRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), ovonic memory, phase change or ferroelectric memory, silicon-oxide-nitride-oxide-silicon (SONOS) memory, magnetic or optical cards, one or more individual ferromagnetic disk drives, non-volatile storage class memory, or a plurality of storage devices organized into one or more arrays (e.g., multiple ferromagnetic disk drives organized into a Redundant Array of Independent Disks array, or RAID array). It should be noted that although each of these storages is depicted as a single block, one or more of these may include multiple storage devices that may be based on differing storage technologies. Thus, for example, one or more of each of these depicted storages may represent a combination of an optical drive or flash memory card reader by which programs and/or data may be stored and conveyed on some form of machine-readable storage media, a ferromagnetic disk drive to store programs and/or data locally for a relatively extended period, and one or more volatile solid-state memory devices enabling relatively quick access to programs and/or data (e.g., SRAM or DRAM). It should also be noted that each of these storages may be made up of multiple storage components based on identical storage technology, but which may be maintained separately as a result of specialization in use (e.g., some DRAM devices employed as a main storage while other DRAM devices employed as a distinct frame buffer of a graphics controller). However, in a specific embodiment, the data may be stored with a redundant array of independent discs (RAID) of a RAID level selected to provide fault tolerance to prevent loss of one or more of these datasets and/or to provide increased speed in accessing one or more of these datasets.

In various embodiments, one or more interfaces (e.g., a graphical user interface (GUI)) may be used in conjunction with carrying out techniques or features described herein. In various such embodiments, the one or more interfaces may each be any of a variety of types of input device that may each employ any of a wide variety of input detection and/or reception technologies. Examples of such input devices include, and are not limited to, microphones, remote controls, stylus pens, card readers, finger print readers, virtual reality interaction gloves, graphical input tablets, joysticks, keyboards, retina scanners, the touch input components of touch screens, trackballs, environmental sensors, and/or either cameras or camera arrays to monitor movement of persons to accept commands and/or data provided by those persons via gestures and/or facial expressions. In various embodiments, displays, such as for displaying a GUI, may be any of a variety of types of display device that may each employ any of a wide variety of visual presentation technologies. Examples of such a display device includes, and is not limited to, a cathode-ray tube (CRT), an electroluminescent (EL) panel, a liquid crystal display (LCD), a gas plasma display, etc. In some embodiments, one or more of the interfaces may be a touchscreen display.

In various embodiments, one or more interfaces described or included herein may include one or more network interfaces that employ any of a wide variety of communications technologies enabling these devices to be coupled to other devices as has been described. Each of these interfaces includes circuitry providing at least some of the requisite functionality to enable such coupling. However, each of these interfaces may also be at least partially implemented with sequences of instructions executed by corresponding ones of the processors (e.g., to implement a protocol stack or other features). Where electrically and/or optically conductive cabling is employed, these interfaces may employ timings and/or protocols conforming to any of a variety of industry standards, including without limitation, RS-232C, RS-422, USB, Ethernet (IEEE-802.3) or IEEE-1394. Where the use of wireless transmissions is entailed, these interfaces may employ timings and/or protocols conforming to any of a variety of industry standards, including without limitation, IEEE 802.11a, 802.11ad, 802.11ah, 802.11ax, 802.11b, 802.11g, 802.16, 802.20 (commonly referred to as "Mobile Broadband Wireless Access"); Bluetooth; ZigBee; or a cellular radiotelephone service such as GSM with General Packet Radio Service (GSM/GPRS), CDMA/1xRTT, Enhanced Data Rates for Global Evolution (EDGE), Evolution Data Only/Optimized (EV-DO), Evolution For Data and Voice (EV-DV), High Speed Downlink Packet Access (HSDPA), High Speed Uplink Packet Access (HSUPA), 4G LTE, etc. However, in a specific embodiment, one or more interfaces may be implemented with multiple copper-based or fiber-optic based network interface ports to provide redundant and/or parallel pathways in exchanging data.

In various embodiments, the processing and/or storage resources of one or more components described herein, may be divided among the multiple systems. In various such embodiments, one or more API architectures may support communications among the multiple systems. The one or more API architectures may be configured to and/or selected to conform to any of a variety of standards for distributed processing, including without limitation, IEEE P2413, AllJoyn, IoTivity, etc. By way of example, a subset of API and/or other architectural features of one or more of such standards may be employed to implement the relatively minimal degree of coordination described herein to provide greater efficiency in parallelizing processing of data, while minimizing exchanges of coordinating information that may lead to undesired instances of serialization among processes. However, it should be noted that the parallelization of storage, retrieval and/or processing of data among multiple systems is not dependent on, nor constrained by, existing API architectures and/or supporting communications protocols. More broadly, there is nothing in the manner in which the data may be organized in storage, transmission and/or distribution via one or more interfaces described herein that is bound to existing API architectures or protocols.

Some systems may use Hadoop®, an open-source framework for storing and analyzing big data in a distributed computing environment. Some systems may use cloud computing, which can enable ubiquitous, convenient, on-demand network access to a shared pool of configurable computing resources (e.g., networks, servers, storage, applications and services) that can be rapidly provisioned and released with minimal management effort or service provider interaction. Some grid systems may be implemented as a multi-node Hadoop® cluster, as understood by a person of skill in the art. Apache™ Hadoop® is an open-source software framework for distributed computing.

The invention claimed is:

1. An apparatus comprising a processor and a storage to store instructions that, when executed by the processor, cause the processor to perform operations comprising:
   identify a collection of clustered datasets, each clustered dataset in the collection of clustered datasets comprising a plurality of correlated samples, wherein each sample in the plurality of correlated samples includes a value for each variable in a group of variables;
   assign a different color hue to each clustered dataset in the collection of clustered datasets;
   identify a pair of variables in the group of variables, the pair of variables comprising a first variable and a second variable;
   identify plotting data comprising a data point for each sample in each clustered dataset in the collection of clustered datasets, wherein each data point comprises a value corresponding to each variable in the pair of variables from a respective sample in the plurality of correlated samples;
   determine a set of bin crossings for the plotting data based on one or more binning parameters, wherein each bin crossing includes a first range of values for the first variable and a second range of values for the second variable;
   assign each data point in the plotting data to one bin crossing in the set of bin crossings;
   determine, for each bin crossing, a number of assigned data points corresponding to each clustered dataset;
   identify a dominant clustered dataset from the collection of clustered datasets for each bin crossing in the set of bin crossings, the dominant clustered dataset for a bin crossing comprising a clustered dataset in the collection of clustered datasets with a highest number of assigned data points in the bin crossing;
   assign a color hue to each bin crossing in the set of bin crossings based on the color hue assigned to the clustered dataset identified as the dominant clustered dataset for each bin crossing;
   determine a set of dominated bin crossings for each clustered dataset, the set of dominated bin crossings for a respective clustered dataset comprising each bin crossing in the set of bin crossings that the respective clustered dataset is identified as the dominant clustered dataset for;
   compare each number of assigned data points for each bin crossing in each set of dominated bin crossings to determine a scheme of color intensities to apply to each set of dominated bin crossings;

assign a color intensity to each bin crossing in the set of bin crossings based on the scheme of color intensities determined for each set of dominated bin crossings;

generate a heat map comprising each bin crossing in the set of bin crossings, wherein each bin crossing in the set of bin crossings is colored based on the color hue and the color intensity assigned to each bin crossing in the set of bin crossings; and present the heat map via a user interface (UI).

2. The apparatus of claim 1, wherein the processor is caused to perform operations comprising determine the scheme of color intensities to apply to each set of dominated bin crossings to cause a highest number of assigned data points among a respective set of dominated bin crossings is assigned a highest color intensity among the respective set of dominated bin crossings.

3. The apparatus of claim 2, wherein the processor is caused to perform operations comprising determine the scheme of color intensities to apply to each set of dominated bin crossings to cause a lowest number of assigned data points among the respective set of dominated bin crossings is assigned a lowest color intensity among the respective set of dominated bin crossings.

4. The apparatus of claim 1, wherein each color intensity corresponds to luminosity in a Hue-Saturation-Luminosity (HSL) color model and the different color hue assigned to each clustered dataset in the collection of clustered datasets corresponds to a different hue in the HSL color model.

5. The apparatus of claim 1, wherein the processor is caused to perform operations comprising generate a heat map matrix comprising the heat map, a second heat map generated based on a second pair of variables from the group of variables, and a third heat map generated based on a third pair of variables, wherein the second pair of variables comprises the first variable and a third variable and the third pair of variables comprises the second variable and a fourth variable.

6. The apparatus of claim 5, wherein the processor is caused to perform operations comprising present the heat map matrix via the UI.

7. The apparatus of claim 6, wherein the processor is caused to perform operations comprising present a detailed view of the heat map when the heat map is selected via the UI, wherein the detailed view of the heat map includes a representation of each color hue assigned to each clustered dataset that includes one or more assigned data points in each bin crossing in the set of bin crossings.

8. The apparatus of claim 6, wherein the processor is caused to perform operations comprising present a tooltip view of a first bin crossing in the heat map when the first bin crossing is identified via the UI, wherein the tooltip view of the first bin crossing in the heat map includes numerical values for the first and second variables.

9. The apparatus of claim 8, wherein the tooltip view of the first bin crossing in the heat map includes numerical values for two or more clustered datasets in the collection of clustered datasets.

10. The apparatus of claim 1, wherein the processor is caused to perform operations comprising generate a parallel coordinates plot based on the collection of clustered datasets and the group of variables, the parallel coordinates plot to include a line for each clustered data set that passes through a set of values for each variable in the group of variables, wherein each line is colored according to the different color hue assigned to the corresponding clustered data set.

11. A computer-implemented method, comprising:
identifying a collection of clustered datasets, each clustered dataset in the collection of clustered datasets comprising a plurality of correlated samples, wherein each sample in the plurality of correlated samples includes a value for each variable in a group of variables;

assigning a different color hue to each clustered dataset in the collection of clustered datasets;

identifying a pair of variables in the group of variables, the pair of variables comprising a first variable and a second variable;

identifying plotting data comprising a data point for each sample in each clustered dataset in the collection of clustered datasets, wherein each data point comprises a value corresponding to each variable in the pair of variables from a respective sample in the plurality of correlated samples;

determining a set of bin crossings for the plotting data based on one or more binning parameters, wherein each bin crossing includes a first range of values for the first variable and a second range of values for the second variable;

assign each data point in the plotting data to one bin crossing in the set of bin crossings;

determining, for each bin crossing, a number of assigned data points corresponding to each clustered dataset;

identifying a dominant clustered dataset from the collection of clustered datasets for each bin crossing in the set of bin crossings, the dominant clustered dataset for a bin crossing comprising a clustered dataset in the collection of clustered datasets with a highest number of assigned data points in the bin crossing;

assigning a color hue to each bin crossing in the set of bin crossings based on the color hue assigned to the clustered dataset identified as the dominant clustered dataset for each bin crossing;

determining a set of dominated bin crossings for each clustered dataset, the set of dominated bin crossings for a respective clustered dataset comprising each bin crossing in the set of bin crossings that the respective clustered dataset is identified as the dominant clustered dataset for;

comparing each number of assigned data points for each bin crossing in each set of dominated bin crossings to determine a scheme of color intensities to apply to each set of dominated bin crossings;

assigning a color intensity to each bin crossing in the set of bin crossings based on the scheme of color intensities determined for each set of dominated bin crossings;

generating a heat map comprising each bin crossing in the set of bin crossings, wherein each bin crossing in the set of bin crossings is colored based on the color hue and the color intensity assigned to each bin crossing in the set of bin crossings; and presenting the heat map via a user interface (UI).

12. The computer-implemented method of claim 11, comprising determining the scheme of color intensities to apply to each set of dominated bin crossings to cause a highest number of assigned data points among a respective set of dominated bin crossings is assigned a highest color intensity among the respective set of dominated bin crossings.

13. The computer-implemented method of claim 12, comprising determining the scheme of color intensities to apply to each set of dominated bin crossings to cause a lowest number of assigned data points among the respective set of dominated bin crossings is assigned a lowest color intensity among the respective set of dominated bin crossings.

14. The computer-implemented method of claim 11, wherein each color intensity corresponds to luminosity in a Hue-Saturation-Luminosity (HSL) color model and the different color hue assigned to each clustered dataset in the collection of clustered datasets corresponds to a different hue in the HSL color model.

15. The computer-implemented method of claim 11, comprising generating a heat map matrix comprising the heat map, a second heat map generated based on a second pair of variables from the group of variables, and a third heat map generated based on a third pair of variables, wherein the second pair of variables comprises the first variable and a third variable and the third pair of variables comprises the second variable and a fourth variable.

16. The computer-implemented method of claim 15, comprising presenting the heat map matrix via the UI.

17. The computer-implemented method of claim 16, comprising presenting a detailed view of the heat map when the heat map is selected via the UI, wherein the detailed view of the heat map includes a representation of each color hue assigned to each clustered dataset that includes one or more assigned data points in each bin crossing in the set of bin crossings.

18. The computer-implemented method of claim 16, comprising presenting a tooltip view of a first bin crossing in the heat map when the first bin crossing is identified via the UI, wherein the tooltip view of the first bin crossing in the heat map includes numerical values for the first and second variables.

19. The computer-implemented method of claim 18, wherein the tooltip view of the first bin crossing in the heat map includes numerical values for two or more clustered datasets in the collection of clustered datasets.

20. The computer-implemented method of claim 11, comprising generating a parallel coordinates plot based on the collection of clustered datasets and the group of variables, the parallel coordinates plot to include a line for each clustered data set that passes through a set of values for each variable in the group of variables, wherein each line is colored according to the different color hue assigned to the corresponding clustered data set.

21. A non-transitory machine-readable storage medium, storing a computer-program product including instructions operable to cause a processor to perform operations comprising: identify a collection of clustered datasets, each clustered dataset in the collection of clustered datasets comprising a plurality of correlated samples, wherein each sample in the plurality of correlated samples includes a value for each variable in a group of variables; assign a different color hue to each clustered dataset in the collection of clustered datasets; identify a pair of variables in the group of variables, the pair of variables comprising a first variable and a second variable; identify plotting data comprising a data point for each sample in each clustered dataset in the collection of clustered datasets, wherein each data point comprises a value corresponding to each variable in the pair of variables from a respective sample in the plurality of correlated samples; determine a set of bin crossings for the plotting data based on one or more binning parameters, wherein each bin crossing includes a first range of values for the first variable and a second range of values for the second variable; assign each data point in the plotting data to one bin crossing in the set of bin crossings; determine, for each bin crossing, a number of assigned data points corresponding to each clustered dataset; identify a dominant clustered dataset from the collection of clustered datasets for each bin crossing in the set of bin crossings, the dominant clustered dataset for a bin crossing comprising a clustered dataset in the collection of clustered datasets with a highest number of assigned data points in the bin crossing; assign a color hue to each bin crossing in the set of bin crossings based on the color hue assigned to the clustered dataset identified as the dominant clustered dataset for each bin crossing; determine a set of dominated bin crossings for each clustered dataset, the set of dominated bin crossings for a respective clustered dataset comprising each bin crossing in the set of bin crossings that the respective clustered dataset is identified as the dominant clustered dataset for; compare each number of assigned data points for each bin crossing in each set of dominated bin crossings to determine a scheme of color intensities to apply to each set of dominated bin crossings; assign a color intensity to each bin crossing in the set of bin crossings based on the scheme of color intensities determined for each set of dominated bin crossings; generate a heat map comprising each bin crossing in the set of bin crossings, wherein each bin crossing in the set of bin crossings is colored based on the color hue and the color intensity assigned to each bin crossing in the set of bin crossings; and present the heat map via a user interface (UI).

22. The non-transitory machine-readable storage medium of claim 21, including instructions operable to cause the processor to perform operations comprising determine the scheme of color intensities to apply to each set of dominated bin crossings to cause a highest number of assigned data points among a respective set of dominated bin crossings is assigned a highest color intensity among the respective set of dominated bin crossings.

23. The non-transitory machine-readable storage medium of claim 22, including instructions operable to cause the processor to perform operations comprising determine the scheme of color intensities to apply to each set of dominated bin crossings to cause a lowest number of assigned data points among the respective set of dominated bin crossings is assigned a lowest color intensity among the respective set of dominated bin crossings.

24. The non-transitory machine-readable storage medium of claim 21, wherein each color intensity corresponds to luminosity in a Hue-Saturation-Luminosity (HSL) color model and the different color hue assigned to each clustered dataset in the collection of clustered datasets corresponds to a different hue in the HSL color model.

25. The non-transitory machine-readable storage medium of claim 21, including instructions operable to cause the processor to perform operations comprising generate a heat map matrix comprising the heat map, a second heat map generated based on a second pair of variables from the group of variables, and a third heat map generated based on a third pair of variables, wherein the second pair of variables comprises the first variable and a third variable and the third pair of variables comprises the second variable and a fourth variable.

26. The non-transitory machine-readable storage medium of claim 25, including instructions operable to cause the processor to perform operations comprising present the heat map matrix via the UI.

27. The non-transitory machine-readable storage medium of claim 26, including instructions operable to cause the processor to perform operations comprising present a detailed view of the heat map when the heat map is selected via the UI, wherein the detailed view of the heat map includes a representation of each color hue assigned to each clustered dataset that includes one or more assigned data points in each bin crossing in the set of bin crossings.

28. The non-transitory machine-readable storage medium of claim 26, including instructions operable to cause the processor to perform operations comprising present a tooltip view of a first bin crossing in the heat map when the first bin crossing is identified via the UI, wherein the tooltip view of the first bin crossing in the heat map includes numerical values for the first and second variables.

29. The non-transitory machine-readable storage medium of claim 28, wherein the tooltip view of the first bin crossing in the heat map includes numerical values for two or more clustered datasets in the collection of clustered datasets.

30. The non-transitory machine-readable storage medium of claim 21, including instructions operable to cause the processor to perform operations comprising generate a parallel coordinates plot based on the collection of clustered datasets and the group of variables, the parallel coordinates plot to include a line for each clustered data set that passes through a set of values for each variable in the group of variables, wherein each line is colored according to the different color hue assigned to the corresponding clustered data set.

* * * * *